United States Patent
Chun et al.

(10) Patent No.: US 10,231,215 B2
(45) Date of Patent: Mar. 12, 2019

(54) MULTI-USER TRANSMISSION METHOD IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 15/500,466

(22) PCT Filed: Jun. 26, 2015

(86) PCT No.: PCT/KR2015/006558
§ 371 (c)(1),
(2) Date: Jan. 30, 2017

(87) PCT Pub. No.: WO2016/021831
PCT Pub. Date: Feb. 11, 2016

(65) Prior Publication Data
US 2017/0223665 A1    Aug. 3, 2017

Related U.S. Application Data

(60) Provisional application No. 62/036,122, filed on Aug. 12, 2014, provisional application No. 62/034,755, filed on Aug. 7, 2014.

(51) Int. Cl.
*H04W 72/04*    (2009.01)
*H04L 27/26*    (2006.01)
(Continued)

(52) U.S. Cl.
CPC .......... *H04W 72/04* (2013.01); *H04B 7/0456* (2013.01); *H04B 7/063* (2013.01);
(Continued)

(58) Field of Classification Search
CPC ........... H04L 29/0619; H04L 29/08954; H04L 65/4076; H04L 65/80; H04W 72/005; H04W 72/1236
(Continued)

(56) References Cited

U.S. PATENT DOCUMENTS 9,893,906 B2 *  2/2018  Cariou ................. H04L 12/189
2008/0031191 A1  2/2008  Kashima et al.
(Continued)

FOREIGN PATENT DOCUMENTS

KR          101128926      4/2012
KR       1020140054428     5/2014

OTHER PUBLICATIONS

PCT International Application No. PCT/KR2015/006558, International Search Report dated Oct. 8, 2015, 2 pages.
(Continued)

*Primary Examiner* — Stephen J Clawson
(74) *Attorney, Agent, or Firm* — Lee, Hong, Degerman, Kang & Waimey

(57) ABSTRACT

Disclosed in the present invention are a multi-user (MU) transmission method in a wireless communication system and a device therefor. Specifically, the MU transmission method in a wireless communication system comprises a step in which a station (STA) receives, from an access point (AP), an allocation frame comprising resource allocation information for the MU transmission, wherein the allocation frame may comprise indication information for indicating whether the resource allocation information indicates a frequency resource for orthogonal frequency division mul-
(Continued)

tiple access (OFDMA) transmission, or indicates a spatial resource for MU multi-input multi-output (MIMO) transmission.

20 Claims, 40 Drawing Sheets

(51) Int. Cl.
    *H04B 7/0456*     (2017.01)
    *H04B 7/06*     (2006.01)
    *H04W 72/12*     (2009.01)
    *H04L 5/00*     (2006.01)
    *H04W 84/12*     (2009.01)
    *H04B 7/0452*     (2017.01)

(52) U.S. Cl.
    CPC ......... *H04B 7/0695* (2013.01); *H04L 5/0092* (2013.01); *H04L 27/26* (2013.01); *H04W 72/121* (2013.01); *H04B 7/0452* (2013.01); *H04W 84/12* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2009/0190687 A1* | 7/2009 | Moon ................. | H04B 7/0417 375/267 |
| 2011/0002219 A1* | 1/2011 | Kim ................... | H04B 7/0417 370/203 |
| 2013/0121234 A1 | 5/2013 | Shrivastava et al. | |
| 2015/0163028 A1* | 6/2015 | Tandra ................ | H04L 5/0037 370/203 |
| 2016/0014763 A1* | 1/2016 | Jauh .................... | H04B 7/0452 370/329 |
| 2017/0063562 A1* | 3/2017 | Cariou ................. | H04L 12/189 |
| 2017/0134138 A1* | 5/2017 | Madhavan ............ | H04L 5/0055 |
| 2017/0223665 A1* | 8/2017 | Chun ................... | H04W 72/005 |

OTHER PUBLICATIONS

Cuiru, et al., "Resource Allocation for OFDMA-MIMO Relay Systems with Proportional Fairness Constraints", Sep. 2013, 5 pages.

* cited by examiner

[Fig. 1]
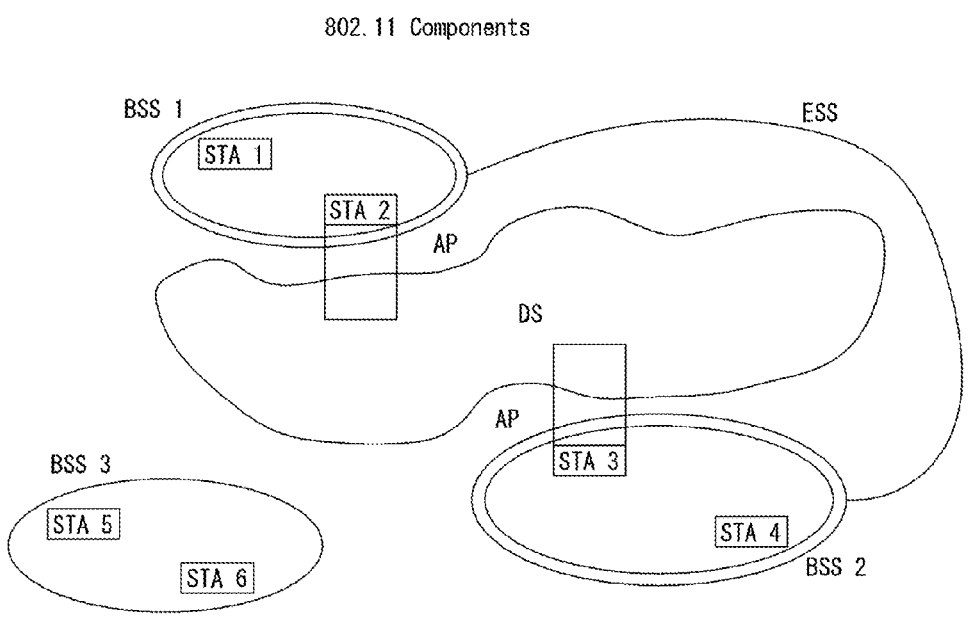

[Fig. 2]
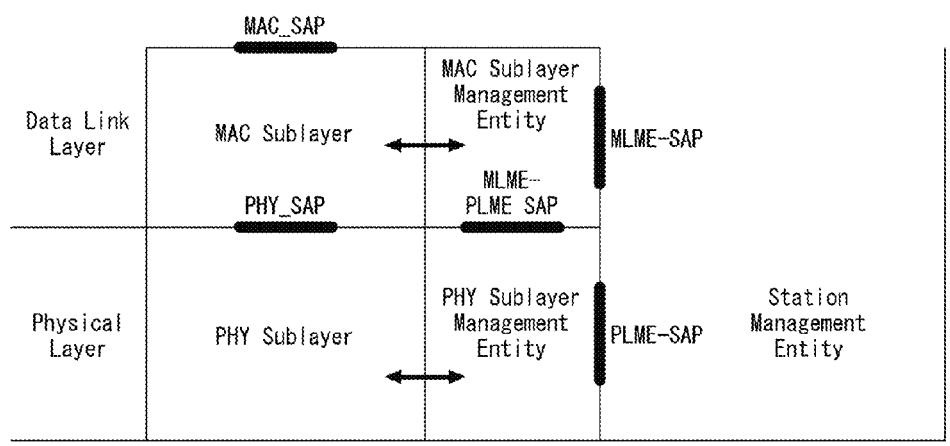

[Fig. 3]
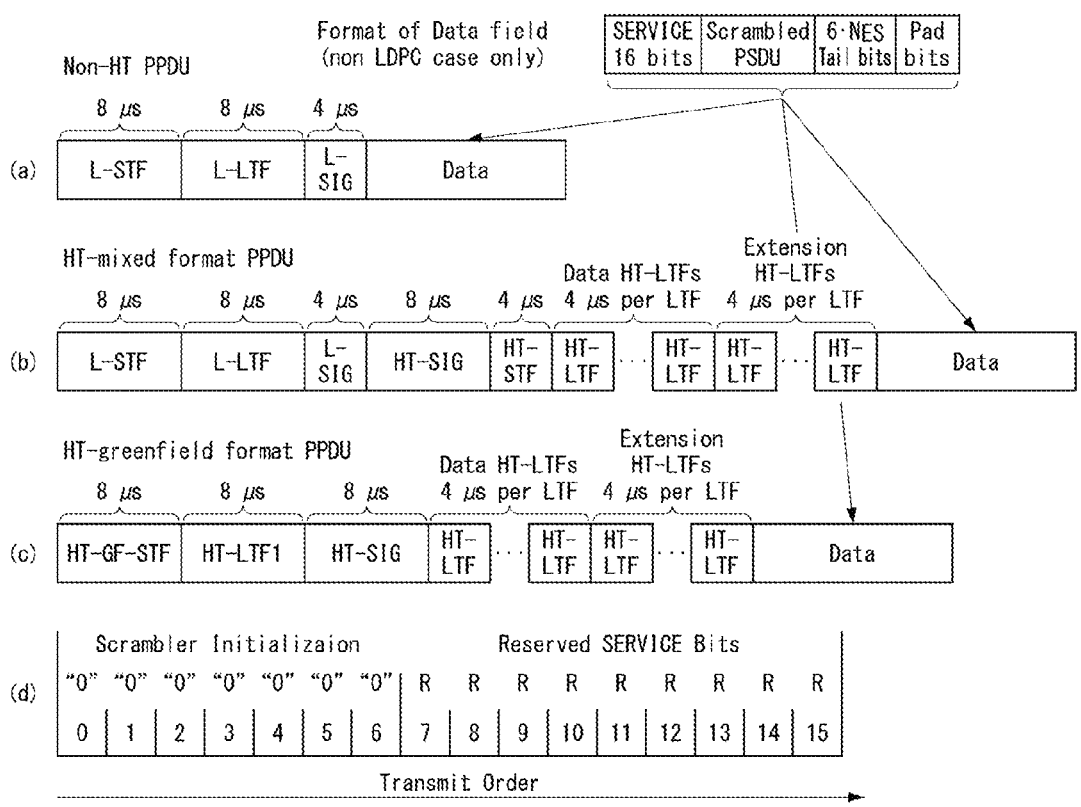

【Fig. 4】
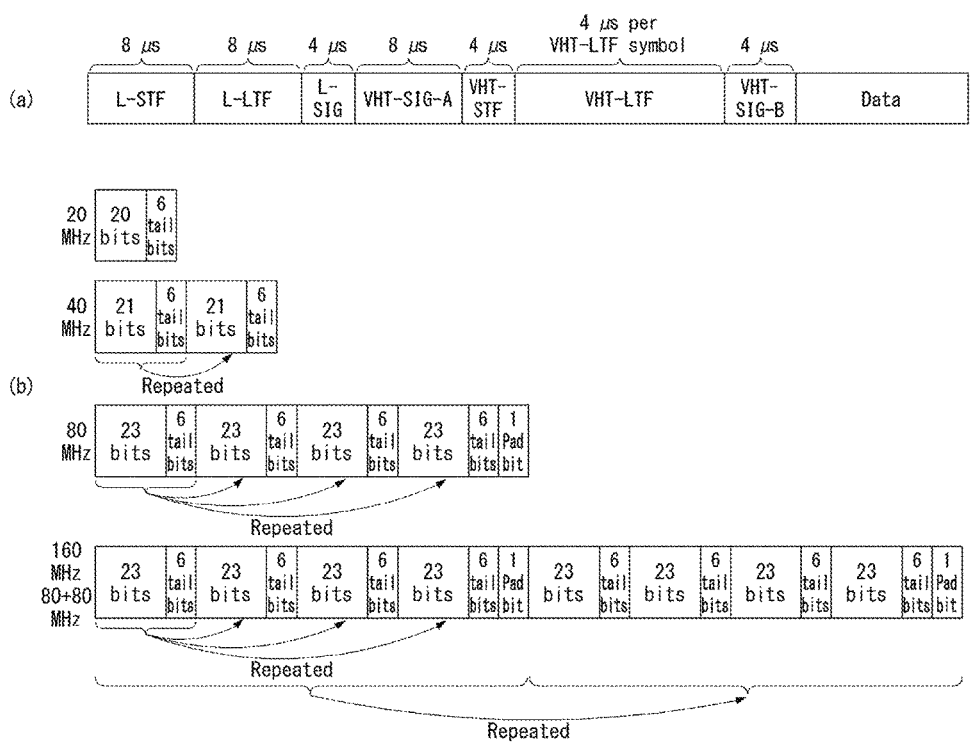

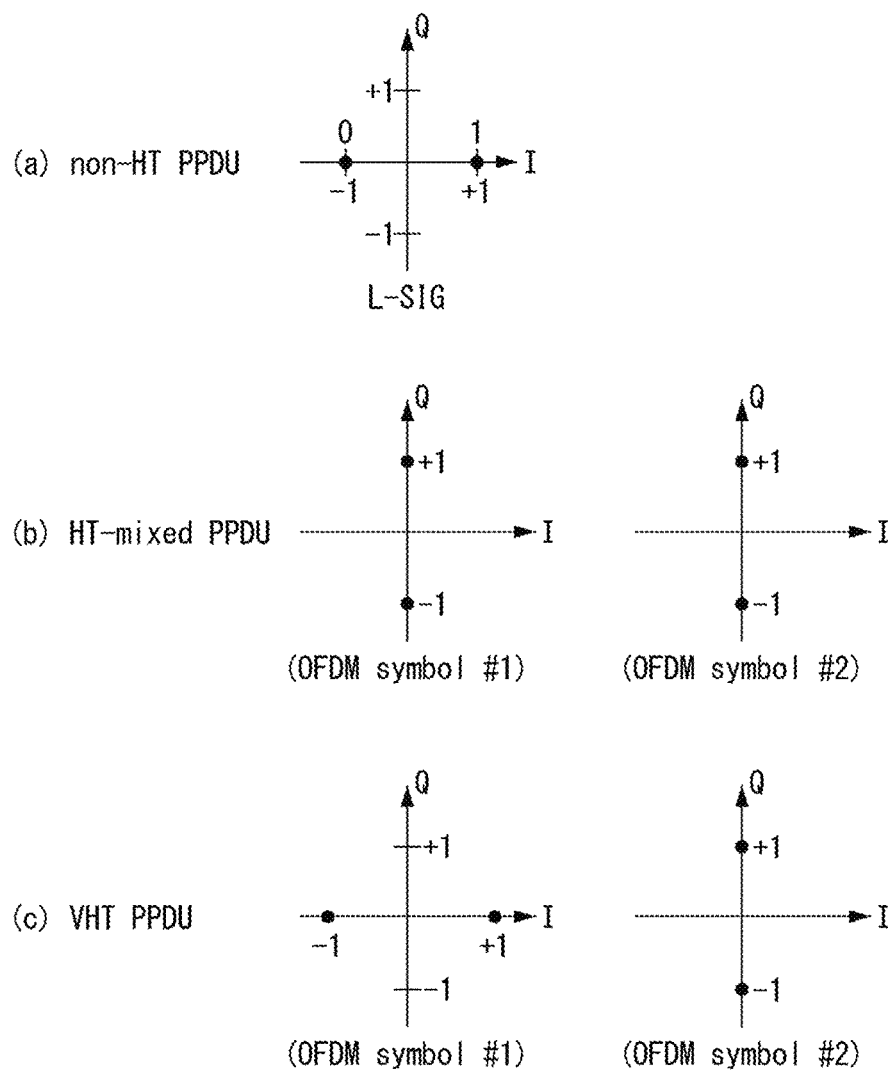
[Fig. 5]

[Fig. 6]
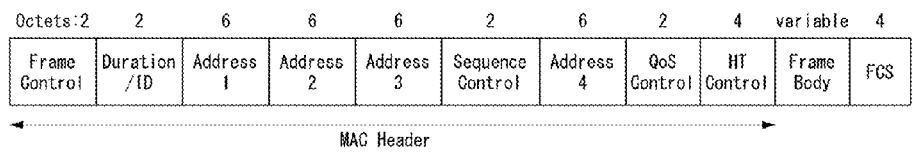
[Fig. 7]
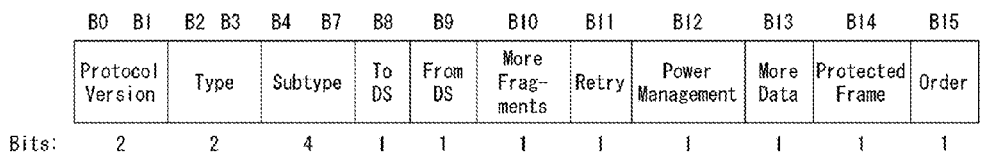

[Fig. 8]
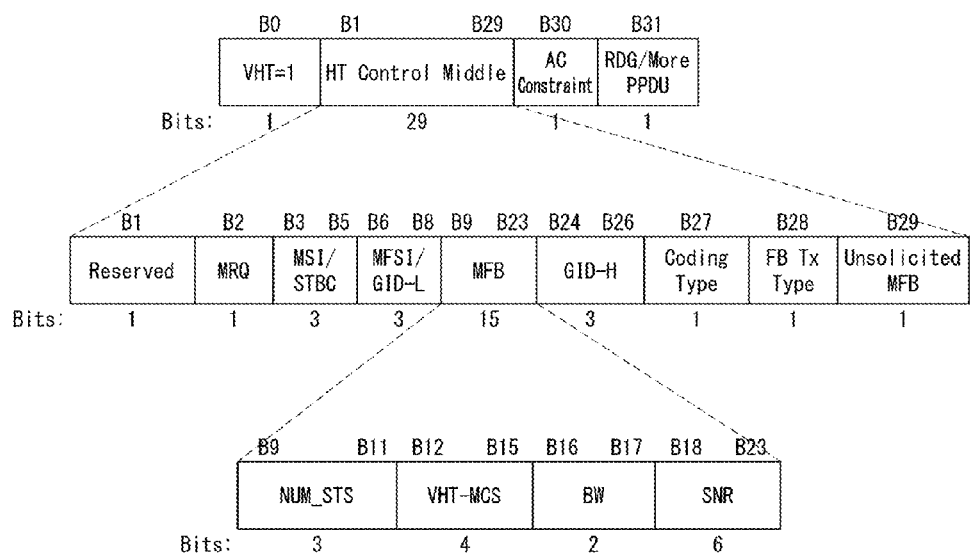

[Fig. 9]
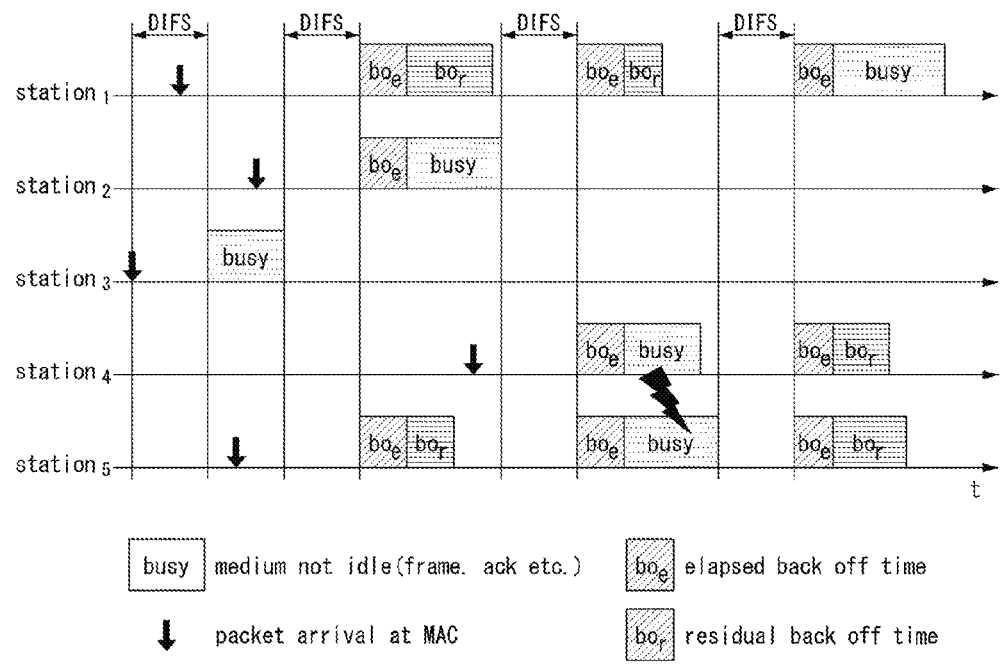

[Fig. 10]
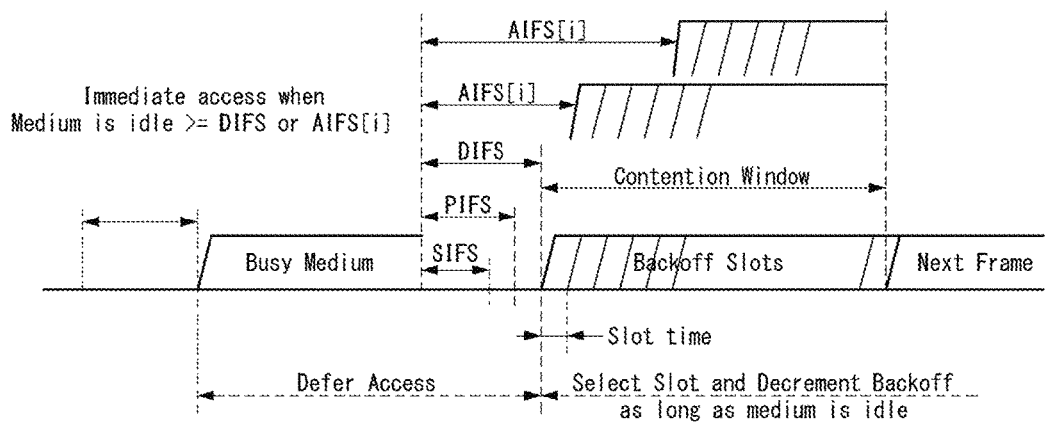

[Fig. 11]
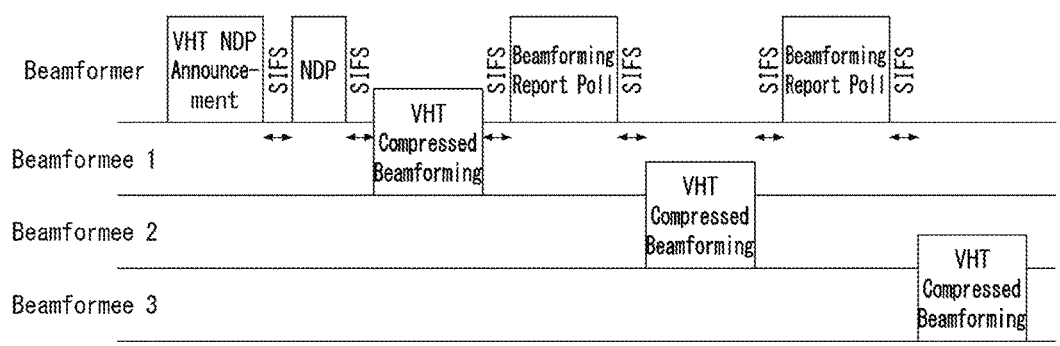

[Fig. 12]
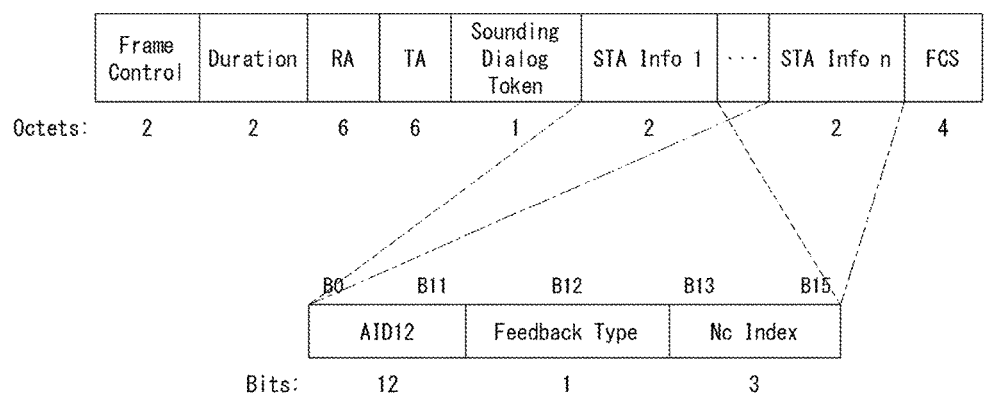

[Fig. 13]
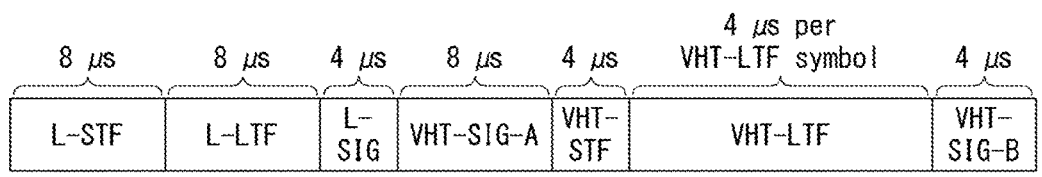

[Fig. 14]
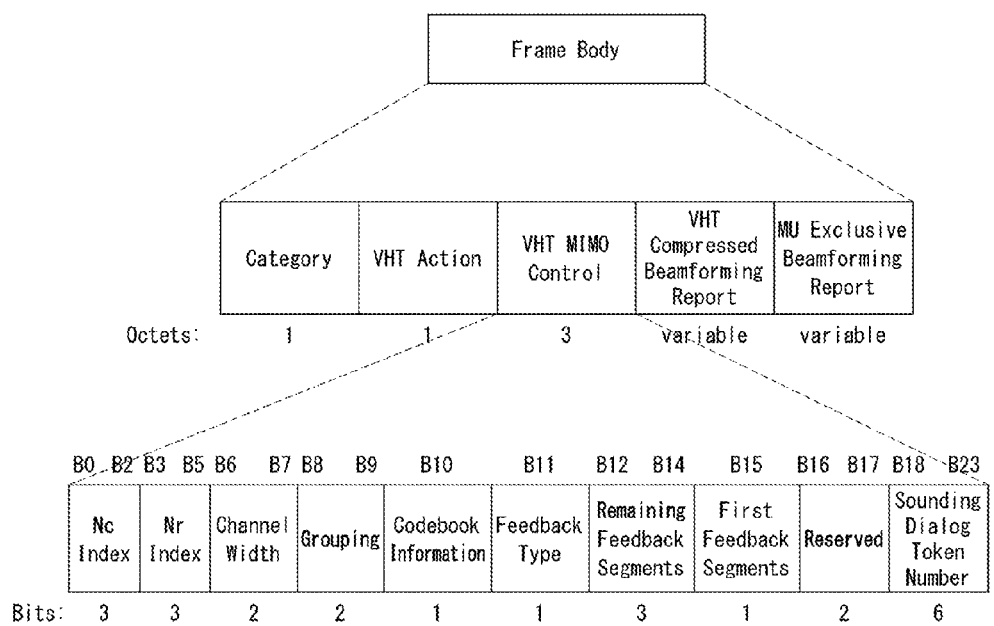

[Fig. 15]
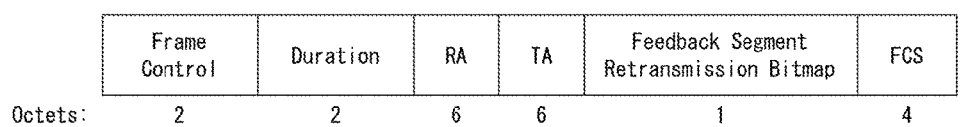
[Fig. 16]
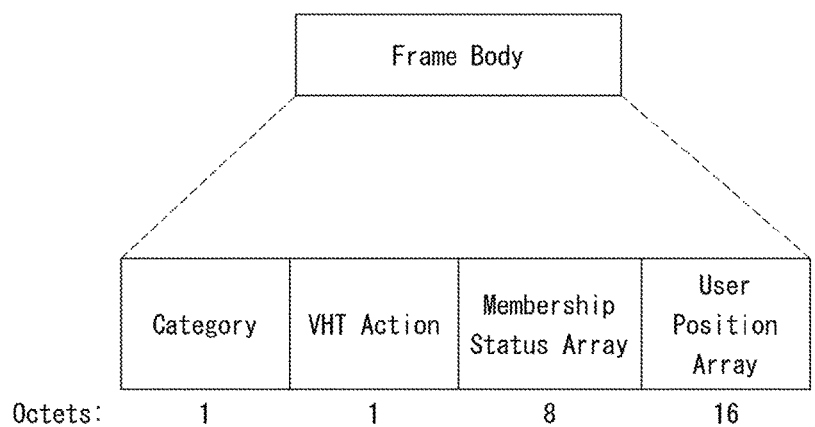

[Fig. 17]
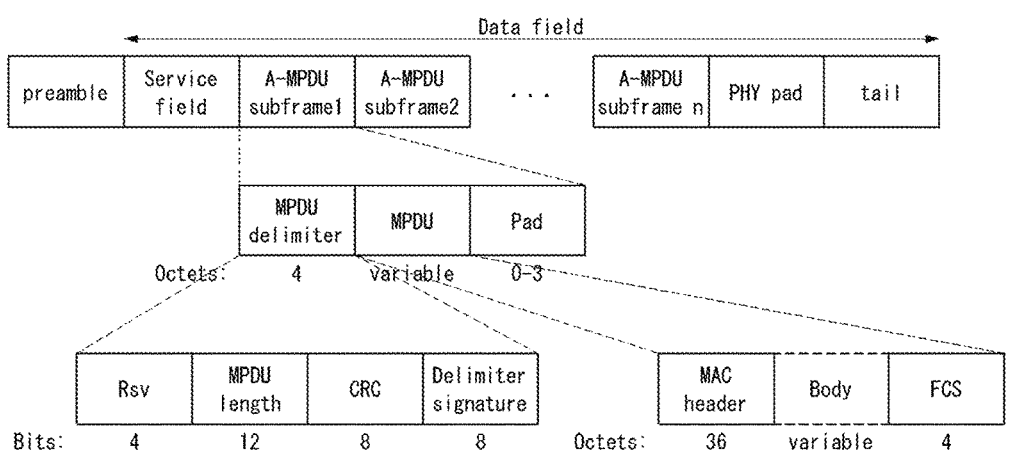

【Fig. 18】
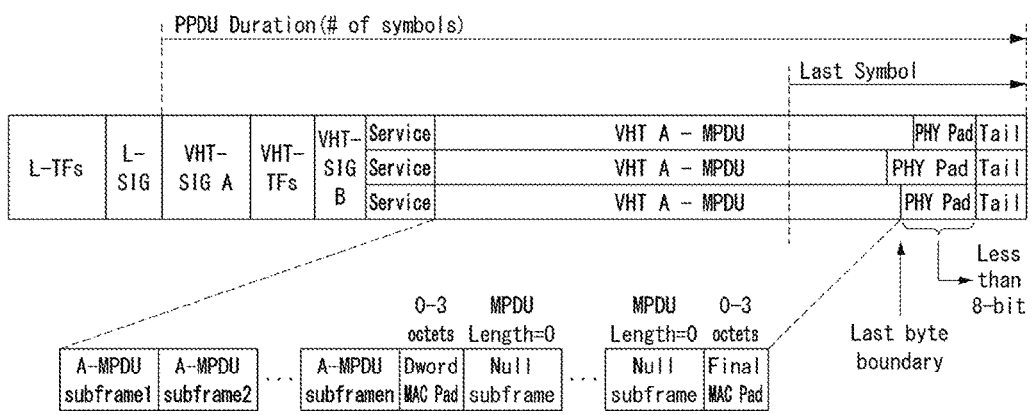

[Fig. 19]
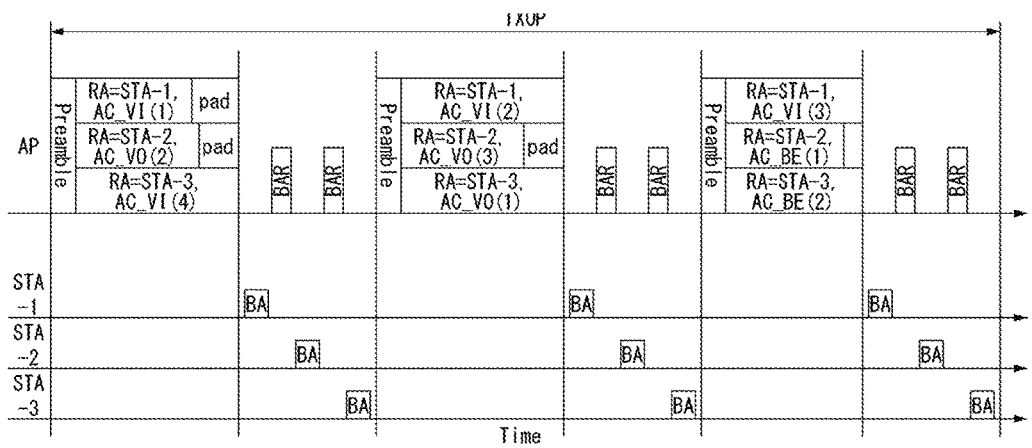

[Fig. 20]
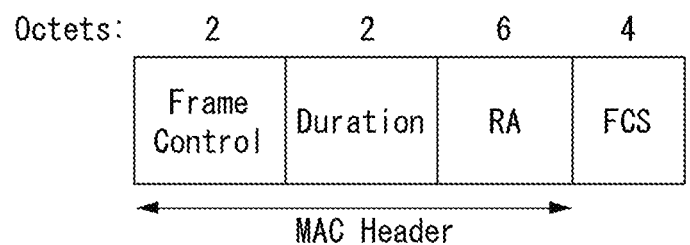

[Fig. 21]
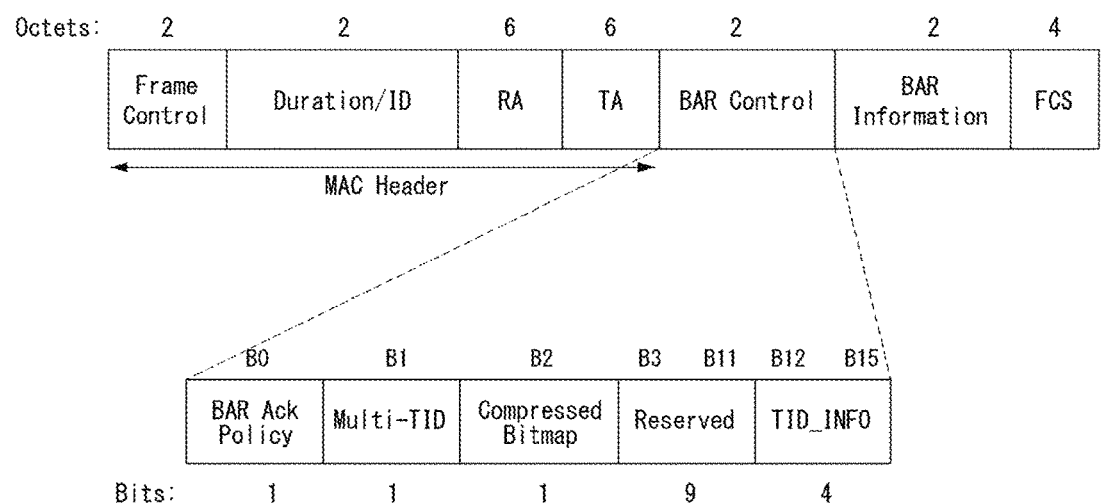

[Fig. 22]
(a)
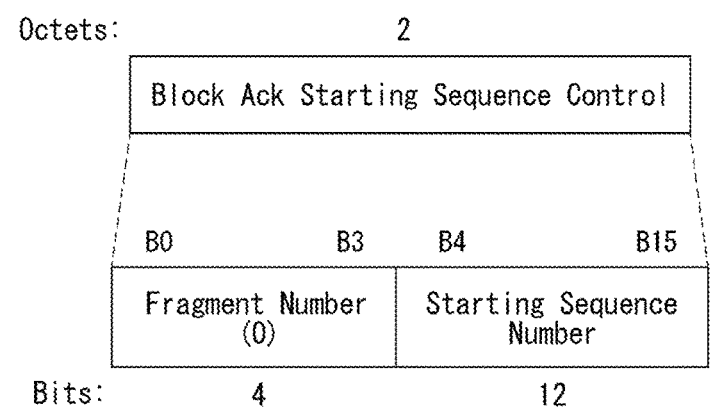
(b)
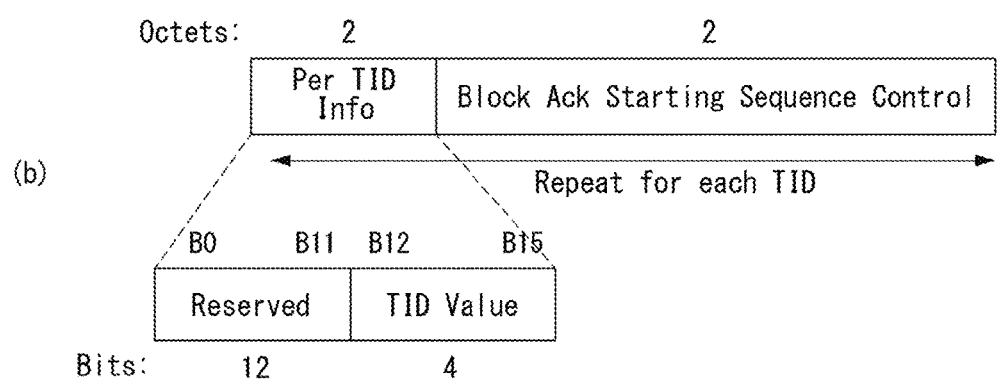

【Fig. 23】
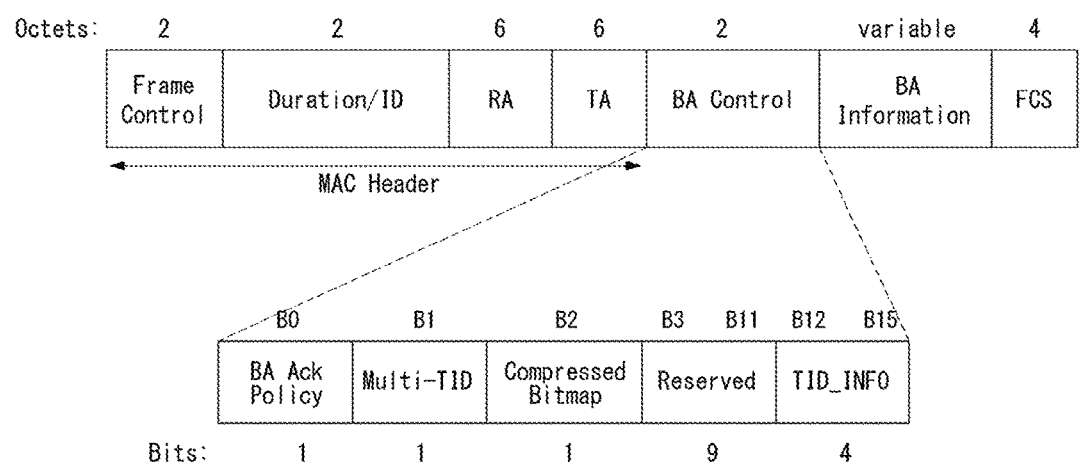

[Fig. 24]
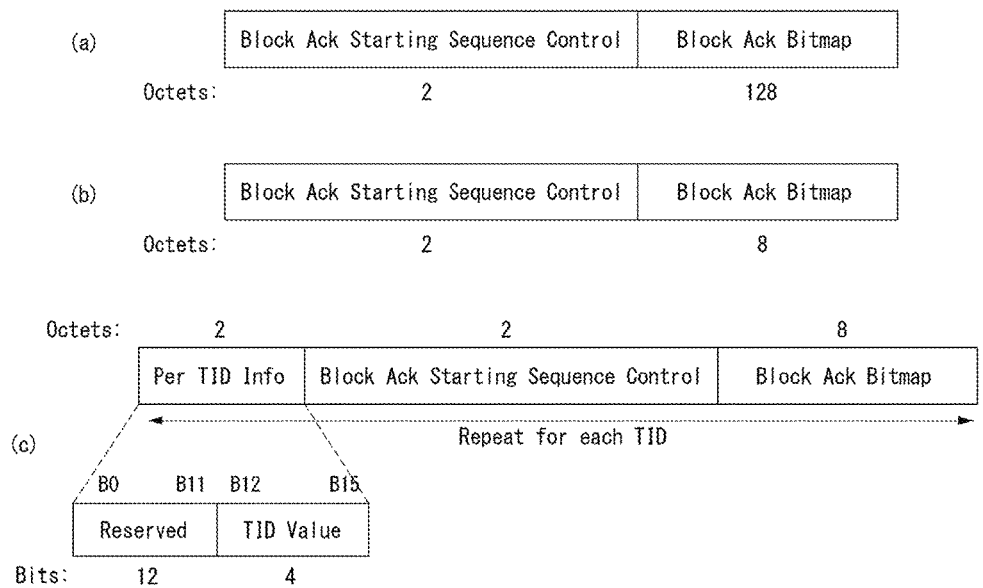

【Fig. 25】
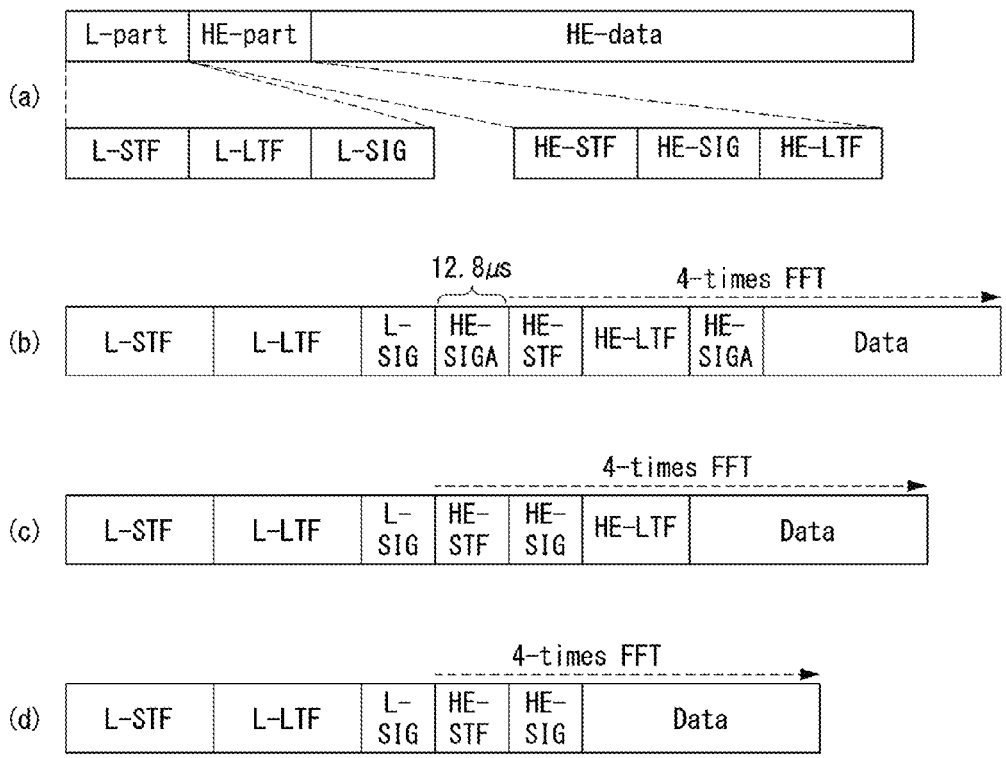

【Fig. 26】

| L-STF | L-LTF | L-SIG | HE-SIG A | | | | |
|-------|-------|-------|----------|--------|--------|---------|------|
| L-STF | L-LTF | L-SIG | HE-SIG A | HE-STF | HE-LTF | HE-SIG B | Data |
| L-STF | L-LTF | L-SIG | HE-SIG A | | | | |
| L-STF | L-LTF | L-SIG | HE-SIG A | | | | |

[Fig. 27]

| L-STF | L-LTF | L-SIG | HE-SIG A | HE-SIG B | HE-STF | HE-LTF | Data |
|-------|-------|-------|----------|----------|--------|--------|------|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

[Fig. 28]

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 29]

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[Fig. 30]
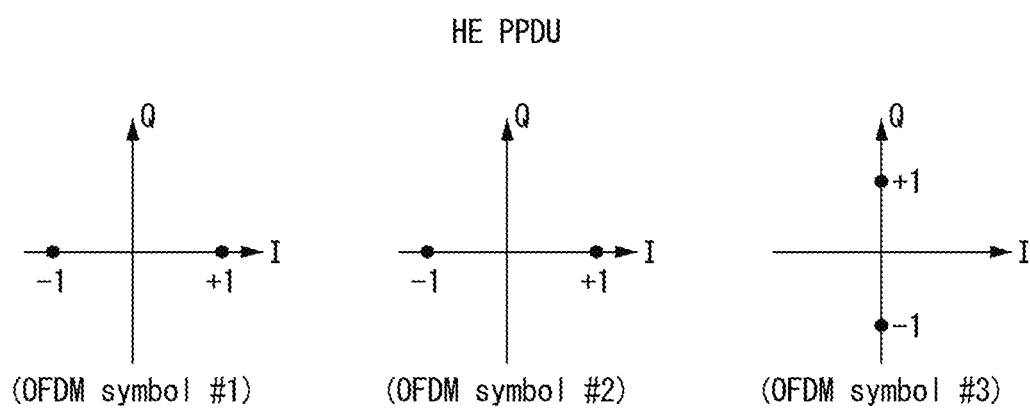

【Fig. 31】
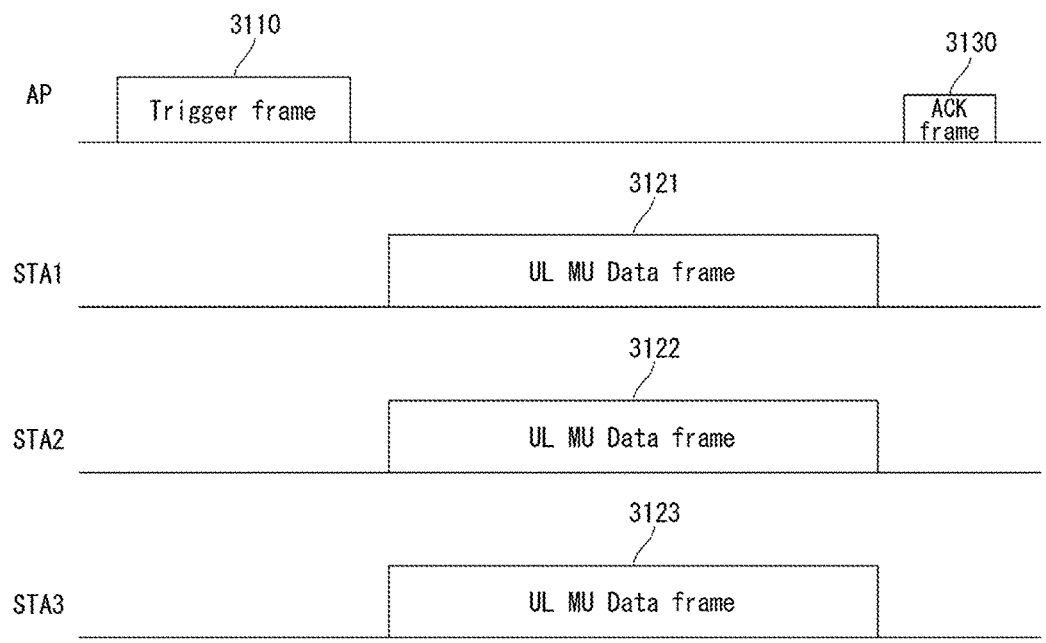

[Fig. 32]
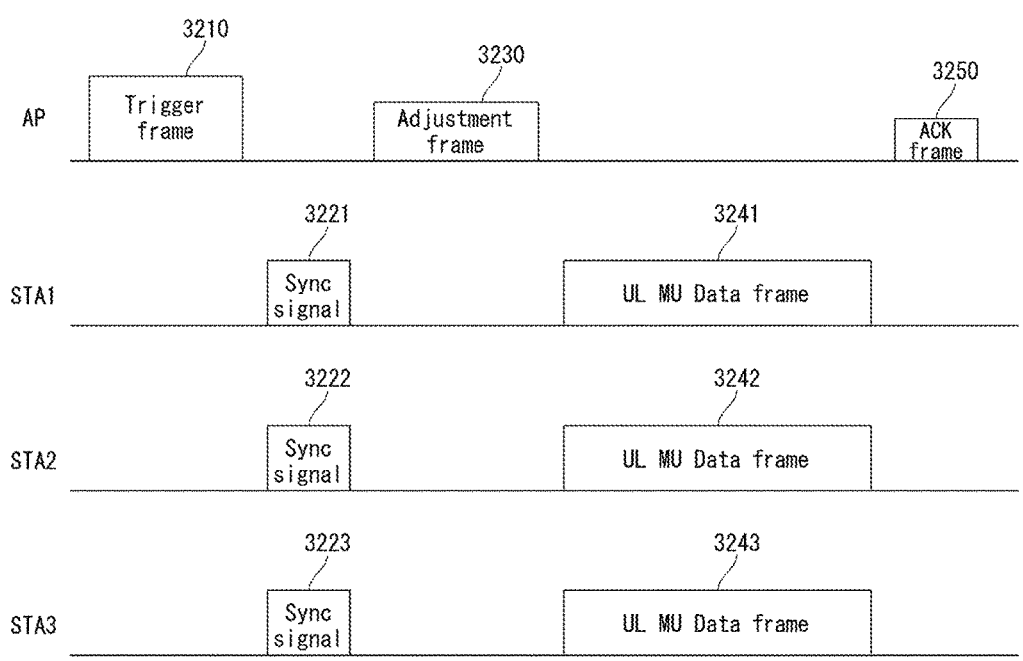

[Fig. 33]
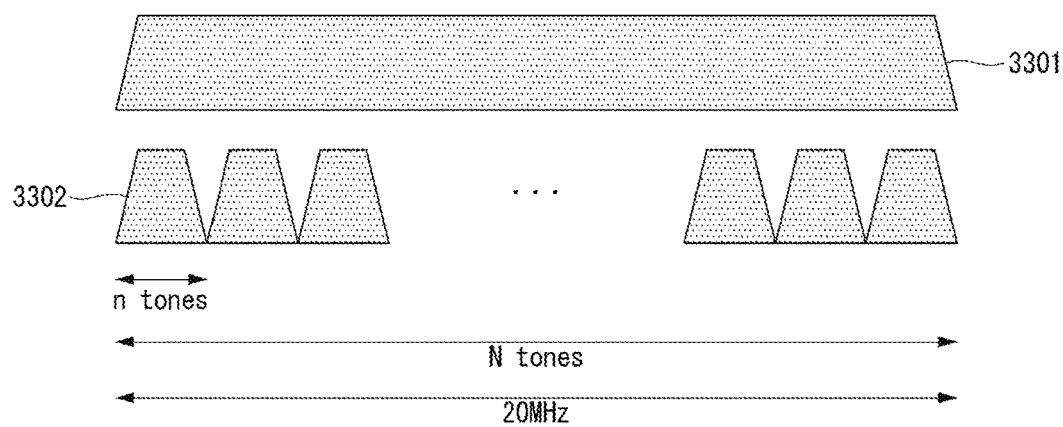

[Fig. 34]
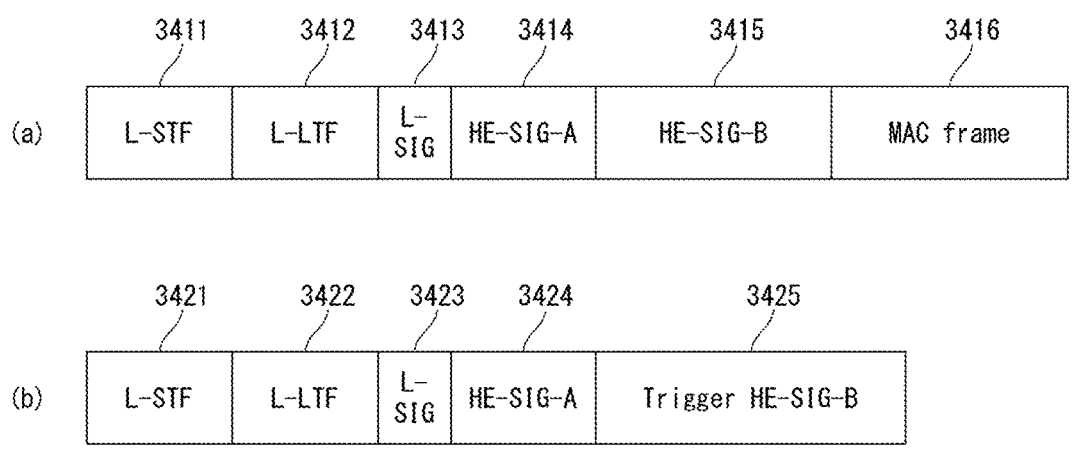

[Fig. 35]
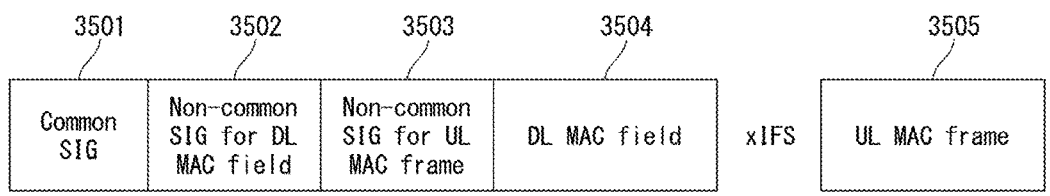

【Fig. 36】
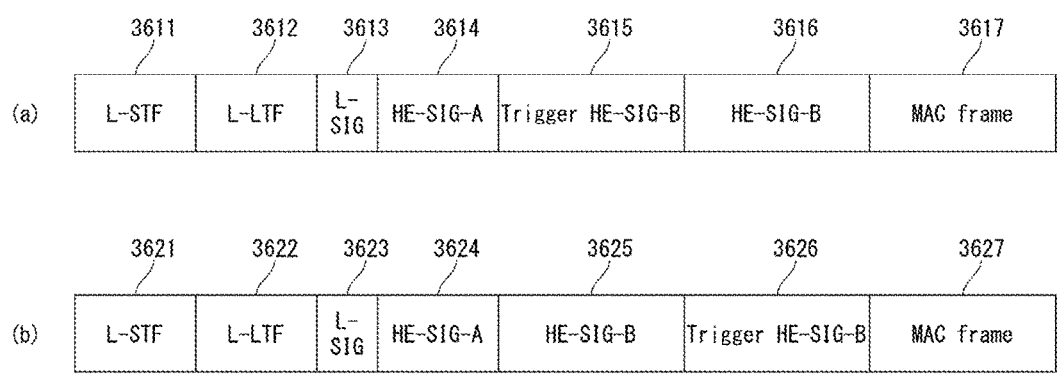

[Fig. 37]
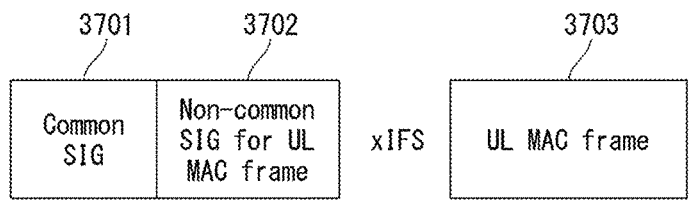
[Fig. 38]
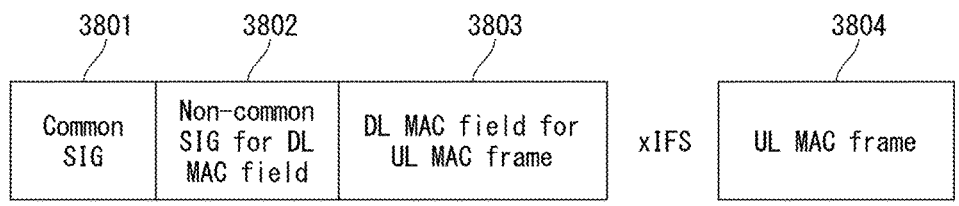

【Fig. 39】
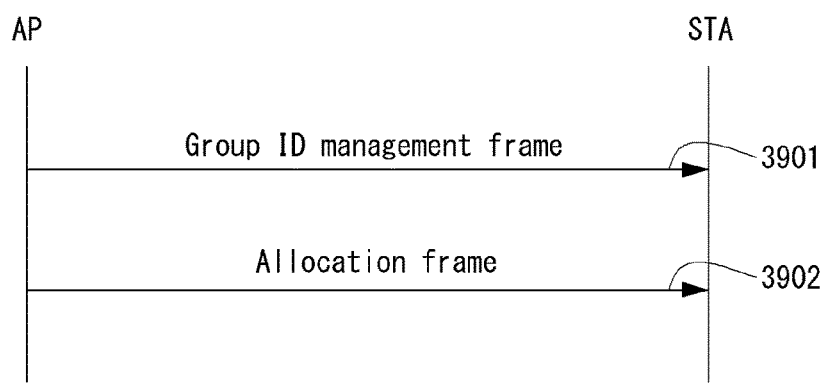
【Fig. 40】
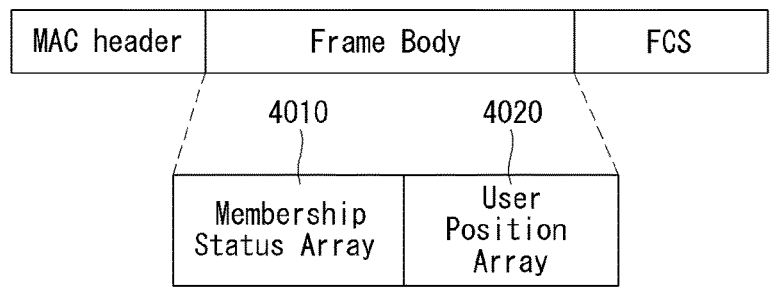

[Fig. 41]
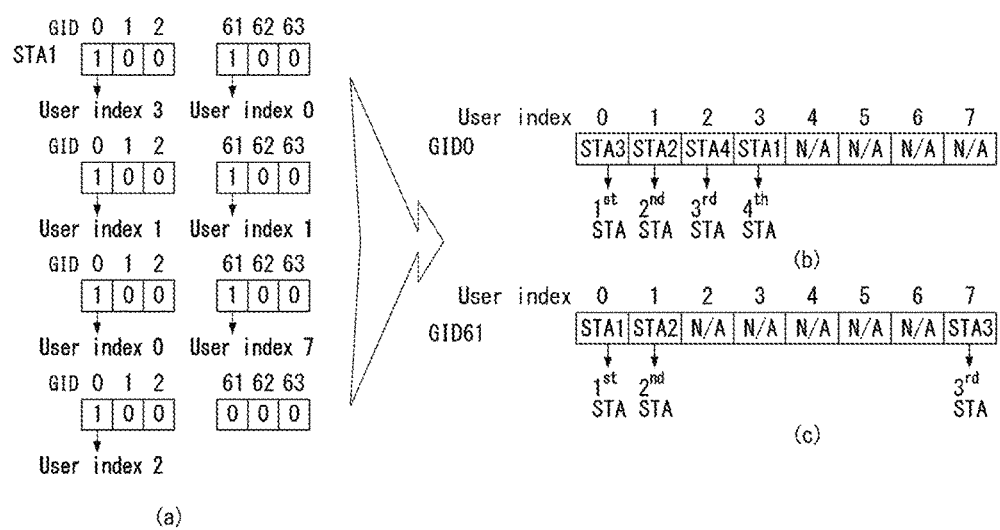

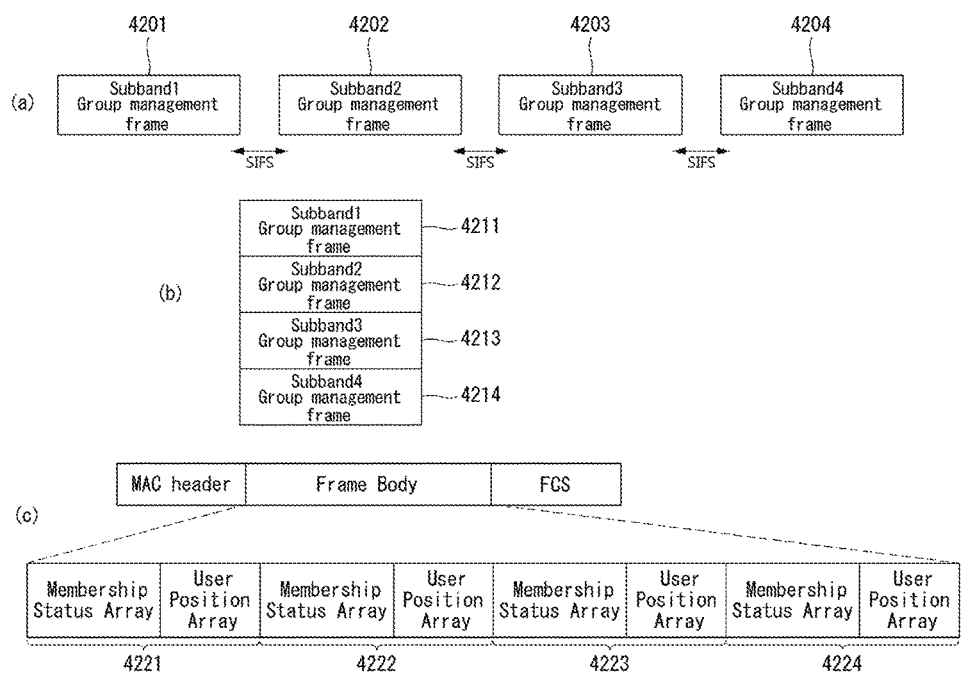
[Fig. 42]

[Fig. 43]
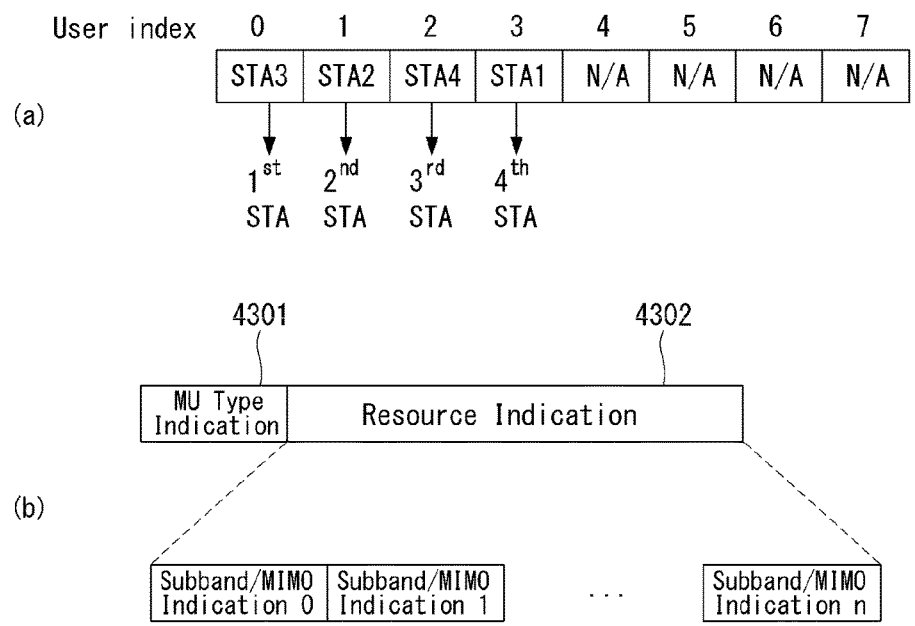

[Fig. 44]
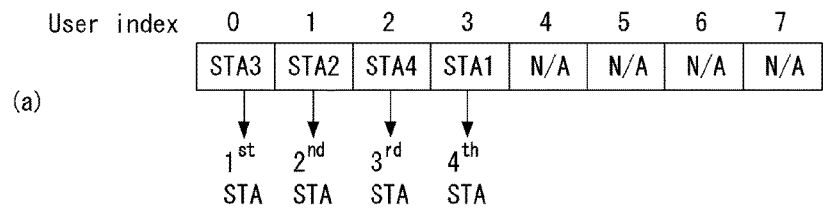
(a)
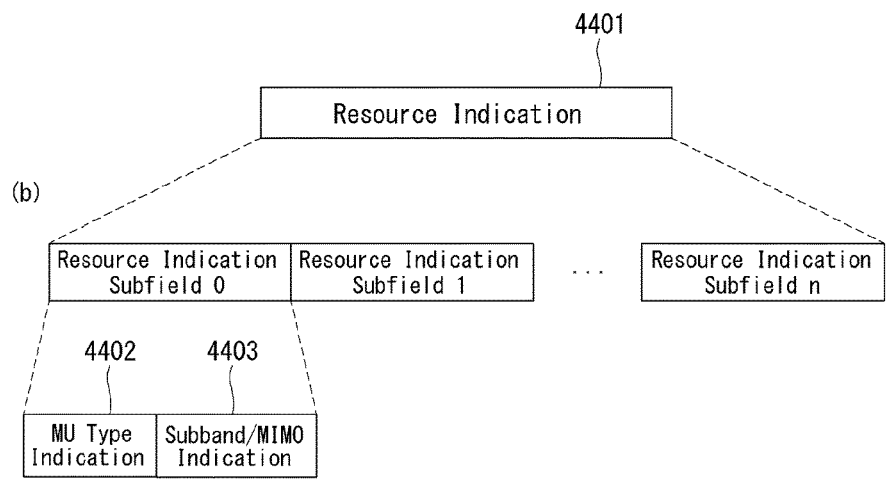
(b)
[Fig. 45]
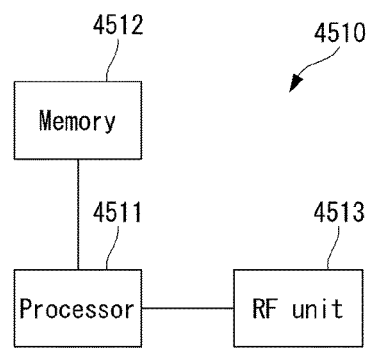

MULTI-USER TRANSMISSION METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/006558, filed on Jun. 26, 2015, which claims the benefit of U.S. Provisional Application No. 62/036,122, filed on Aug. 12, 2014 and 62/034,755, filed on Aug. 7, 2014, the contents of which are all hereby incorporated by reference herein in their entirety.

TECHNICAL FIELD

The present invention relates to a wireless communication system and, more particularly, to a method for multi-user (MU) uplink or downlink (UL or DL) data transmission and an apparatus supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An embodiment of the present invention proposes a method for uplink/downlink multi-user transmission/reception method in a wireless communication system.

Furthermore, an embodiment of the present invention proposes the format of a frame which is used in uplink/downlink multi-user transmission/reception in a wireless communication system.

Technical objects to be achieved by the present invention are not limited to the aforementioned object, and those skilled in the art to which the present invention pertains may evidently understand other technological objects from the following description.

Technical Solution

According to an aspect of the present invention, a method for multi-user (MU) transmission in a wireless communication system includes receiving, by a station (STA), an allocation frame including resource allocation information for the MU transmission from an access point (AP). The allocation frame may include indication information for indicating whether the resource allocation information is a frequency resource for orthogonal frequency division multiple access (OFDMA) transmission or a spatial resource for MU multi-input multi-output (MIMO) transmission.

According to another aspect of the present invention, a station (STA) apparatus for multi-user (MU) transmission in a wireless communication system includes a radio frequency (RF) unit for sending and receiving a radio signal and a processor. The processor may be configured to receive an allocation frame including resource allocation information for the MU transmission from an access point (AP). The allocation frame may include indication information for indicating whether the resource allocation information is a frequency resource for orthogonal frequency division multiple access (OFDMA) transmission or a spatial resource for MU multi-input multi-output (MIMO) transmission.

According to another aspect of the present invention, a method for multi-user (MU) transmission in a wireless communication system includes transmitting, by an access point (AP), an allocation frame including resource allocation information for the MU transmission to a station (STA). The allocation frame may include indication information for indicating whether the resource allocation information is a frequency resource for orthogonal frequency division multiple access (OFDMA) transmission or a spatial resource for MU multi-input multi-output (MIMO) transmission.

According to another aspect of the present invention, an access point (AP) apparatus for multi-user (MU) transmission in a wireless communication system a radio frequency (RF) unit for sending and receiving a radio signal and a processor. The processor may be configured to transmit an allocation frame including resource allocation information for the MU transmission to a station (STA). The allocation frame may include indication information for indicating whether the resource allocation information is a frequency resource for orthogonal frequency division multiple access (OFDMA) transmission or a spatial resource for MU multi-input multi-output (MIMO) transmission.

Preferably, the indication information may be configured for each of STAs participating in the MU transmission.

Preferably, the resource allocation information may be configured in a bitmap form.

Preferably, the method may further include receiving, by the STA, a group ID management frame including a group identifier to identify a group of STAs participating in the MU transmission from the AP.

Preferably, the group identifier may be independently determined in each band of a basic unit in a frequency domain.

Preferably, the group ID management frame may include a single group identifier determined in the band of the basic unit and sequentially transmitted in a time domain.

Preferably, the group ID management frame may include a plurality of group identifiers determined in each band of the basic unit.

Preferably, the group identifier may be determined based on a different group identifier set depending on whether the OFDMA method or the MU MIMO method is applied to the MU transmission.

Preferably, the group ID management frame may include a user position, and the user position may be configured in a bitmap form.

Advantageous Effects

In accordance with an embodiment of the present invention, in a wireless communication system, a larger number of apparatuses or a larger number of apparatus groups compared to an existing wireless communication system can smoothly perform uplink/downlink multi-user transmission/reception.

Furthermore, in accordance with an embodiment of the present invention, the length of a frame which is used for uplink/downlink multi-user transmission/reception can be minimized.

Advantages which may be obtained in the present invention are not limited to the aforementioned advantages, and various other advantages may be evidently understood by those skilled in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 1 is a diagram showing an example of an IEEE 802.11 system to which an embodiment of the present invention may be applied.

FIG. 2 is a diagram illustrating a structure of the layer architecture of the IEEE 802.11 system to which an embodiment of the present invention may be applied.

FIG. 3 illustrates a non-HT format PPDU and HT format PPDU in a wireless communication system to which an embodiment of the present invention may be applied.

FIG. 4 illustrates a VHT format PPDU format in a wireless communication system to which an embodiment of the present invention may be applied.

FIG. 5 is a diagram illustrating constellations for classifying the formats of PPDUs in a wireless communication system to which an embodiment of the present invention may be applied.

FIG. 6 illustrates the format of an MAC frame in an IEEE 802.11 system to which an embodiment of the present invention may be applied.

FIG. 7 is a diagram illustrating a Frame Control field within the MAC frame in a wireless communication system to which an embodiment of the present invention may be applied.

FIG. 8 illustrates a VHT format of an HT Control field in a wireless communication system to which an embodiment of the present invention may be applied.

FIG. 9 is a diagram for illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram conceptually showing a channel sounding method in a wireless communication system to which an embodiment of the present invention may be applied.

FIG. 12 is a diagram illustrating a VHT NDPA frame in a wireless communication system to which an embodiment of the present invention may be applied.

FIG. 13 is a diagram illustrating a NDP PPDU in a wireless communication system to which an embodiment of the present invention may be applied.

FIG. 14 is a diagram illustrating the format of a VHT Compressed Beamforming frame in a wireless communication system to which an embodiment of the present invention may be applied.

FIG. 15 is a diagram illustrating the format of a beamforming report poll frame in a wireless communication system to which an embodiment of the present invention may be applied.

FIG. 16 is a diagram illustrating a group ID management frame in a wireless communication system to which an embodiment of the present invention may be applied.

FIG. 17 is a diagram illustrating a downlink multi-user (DL MU) PPDU format in a wireless communication system to which an embodiment of the present invention may be applied.

FIG. 18 is a diagram illustrating a DL MU PPDU format in a wireless communication system to which an embodiment of the present invention may be applied.

FIG. 19 is a diagram illustrating a DL MU-MIMO transmission process in a wireless communication system to which an embodiment of the present invention may be applied.

FIG. 20 is a diagram illustrating an ACK frame in a wireless communication system to which an embodiment of the present invention may be applied.

FIG. 21 is a diagram illustrating a block ACK request frame in a wireless communication system to which an embodiment of the present invention may be applied.

FIG. 22 is a diagram illustrating the BAR Information field of a block ACK request frame in a wireless communication system to which an embodiment of the present invention may be applied.

FIG. 23 is a diagram illustrating a block ACK frame in a wireless communication system to which an embodiment of the present invention may be applied.

FIG. 24 is a diagram illustrating the BA Information field of the block ACK frame in a wireless communication system to which an embodiment of the present invention may be applied.

FIG. 25 is a diagram illustrating a high efficiency (HE) format PPDU according to an embodiment of the present invention.

FIGS. 26 to 29 are diagrams illustrating HE format PPDUs according to embodiments of the present invention.

FIG. 30 illustrates a phase rotation for detecting an HE format PPDU according to an embodiment of the present invention.

FIGS. 31 and 32 are diagrams illustrating an UL MU transmission procedure according to an embodiment of the present invention.

FIG. 33 is a diagram illustrating a resource allocation unit in an OFDMA MU transmission method according to an embodiment of the present invention.

FIG. 34 is a diagram illustrating a frame structure for supporting UL MU transmission according to an embodiment of the present invention.

FIGS. 35 to 38 are diagrams illustrating the structures of frames for supporting UL MU transmission according to embodiments of the present invention.

FIG. 39 is a diagram illustrating a MU transmission method according to an embodiment of the present invention.

FIG. 40 is a diagram illustrating a group ID management frame according to an embodiment of the present invention.

FIG. 41 is a diagram illustrating a resource allocation method in an MU transmission method according to an embodiment of the present invention.

FIG. 42 is a diagram illustrating a group ID management frame according to an embodiment of the present invention.

FIG. 43 is a diagram illustrating part of an allocation frame according to an embodiment of the present invention.

FIG. 44 is a diagram illustrating part of an allocation frame according to an embodiment of the present invention.

FIG. 45 is a block diagram illustrating a wireless apparatus according to an embodiment of the present invention.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU includes a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| FIELD | BIT | DESCRIPTION |
|---|---|---|
| MCS | 7 | Indicate a modulation and coding scheme |
| CBW 20/40 | 1 | Set to "0" if a CBW is 20 MHz or 40 MHz or upper/lower Set to "1" if a CBW is 40 MHz |
| HT length | 16 | Indicate the number of data octets within a PSDU |
| Smoothing | 1 | Set to "1" if channel smoothing is recommended Set to "0" if channel estimation is recommended unsmoothingly for each carrier |
| Not-sounding | 1 | Set to "0" if a PPDU is a sounding PPDU Set to "1" if a PPDU is not a sounding PPDU |
| Reserved | 1 | Set to "1" |
| Aggregation | 1 | Set to "1" if a PPDU includes an A-MPDU Set to "0" if not |
| Space-time block coding (STBC) | 2 | Indicate a difference between the number of space-time streams (NSTS) and the number of spatial streams (NSS) indicated by an MCS Set to "00" if an STBC is not used |
| FEC coding | 1 | Set to "1" if low-density parity check (LDPC) is used Set to "0" if binary convolutional code (BCC) is used |
| Short GI | 1 | Set to "1" if a short guard interval (GI) is used after HT training Set to "0" if not |

TABLE 1-continued

| FIELD | BIT | DESCRIPTION |
|---|---|---|
| Number of extension spatial streams | 2 | Indicate the number of extension spatial streams (NESSs) Set to "0" if there is no NESS Set to "1" if the number of NESSs is 1 Set to "2" if the number of NESSs is 2 Set to "3" if the number of NESSs is 3 |
| CRC | 8 | Include CRS for detecting an error of a PPDU on the receiver side |
| Tail bits | 6 | Used to terminate the trellis of a convolutional decoder Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU includes a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmitting STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz<br>or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT<br>SU PPDU, but indicates a VHT MU<br>PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |

TABLE 3-continued

| FIELD | BIT | DESCRIPTION |
|---|---|---|
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder Set to "0" |

The VHT-STF is used to improve AGC estimation performance in MIMO transmission.

The VHT-LTF is used for a VHT-STA to estimate an MIMO channel.

Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail below with reference to the following drawings.

FIG. 5 is a diagram illustrating constellations for classifying the formats of PPDUs in a wireless communication system to which an embodiment of the present invention may be applied.

FIG. 5(a) illustrates the constellation of an L-SIG field included in a non-HT format PPDU, FIG. 5(b) illustrates a phase rotation for HT mixed format PPDU detection, and FIG. 5(c) illustrates a phase rotation for VHT format PPDU detection.

In order to classify a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a Frame Control field, a Duration/ID field, an Address 1 field, an Address 2 field, an Address 3 field, a Sequence Control field, an Address 4 field, a QoS Control field, and an HT Control field.

The Frame Control field includes information about the characteristics of a corresponding MAC frame. The Frame Control field is described in detail later.

The Duration/ID field may be implemented to have a different value depending on the type and subtype of a corresponding MAC frame.

If the type and subtype of a corresponding MAC frame is a PS-poll frame for a power save (PS) operation, the Duration/ID field may be configured to include the association identifier (AID) of an STA that has transmitted the frame. In the remaining cases, the Duration/ID field may be configured to have a specific duration value depending on the type and subtype of a corresponding MAC frame. Furthermore, if a frame is an MPDU included in an aggregate-MPDU (A-MPDU) format, the Duration/ID field included in an MAC header may be configured to have the same value.

The Address 1 field to the Address 4 field are used to indicate a BSSID, a source address (SA), a destination address (DA), a transmitting address (TA) indicating the address of a transmitting STA, and a receiving address (RA) indicating the address of a receiving STA.

An Address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The Sequence Control field includes a sequence number and a fragment number. The sequence number may indicate a sequence number assigned to a corresponding MAC frame. The fragment number may indicate the number of each fragment of a corresponding MAC frame.

The QoS Control field includes information related to QoS. The QoS Control field may be included if it indicates a QoS Data frame in a subtype subfield.

The HT Control field includes control information related to an HT and/or VHT transmission/reception scheme. The HT Control field is included in a control wrapper frame. Furthermore, the HT Control field is present in a QoS Data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the Frame Control field, the Duration/ID field, and Address 1 field) and the Last field (i.e., the FCS field) form a minimum frame format and are present in all of frames. The remaining fields may be present only in a specific frame type.

FIG. 7 is a diagram illustrating a Frame Control field within the MAC frame in a wireless communication system to which an embodiment of the present invention may be applied.

Referring to FIG. 7, the Frame Control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether an MAC frame to be additionally transmitted is present or not. The More Data subfield may be set to "1" if an MAC frame to be additionally transmitted is present and may be set to "0" if an MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in an MAC frame, but the present invention is not limited thereto. That is, each of the aforementioned fields may be replaced with another field or an additional field may be further included and all of the fields may not be essentially included.

FIG. 8 illustrates a VHT format of an HT Control field in a wireless communication system to which an embodiment of the present invention may be applied.

Referring to FIG. 8, the HT Control field may include a VHT subfield, an HT control middle subfield, an AC constraint subfield, and a reverse direction grant (RDG)/more PPDU subfield.

The VHT subfield indicates whether the HT Control field has the format of an HT Control field for VHT (VHT=1) or has the format of an HT Control field for HT (VHT=0). In FIG. 8, it is assumed that the HT Control field is an HT Control field for VHT (i.e., VHT=1). The HT Control field for VHT may be called a VHT Control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT Control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
|---|---|---|
| MRQ | MCS request | Set to "1" if MCS feedback (solicited MFB) is not requested<br>Set to "0" if not |

TABLE 4-continued

| SUBFIELD | MEANING | DEFINITION |
| --- | --- | --- |
| MSI | MRQ sequence identifier | An MSI subfield includes a sequence number within a range of 0 to 6 to identify a specific request if an unsolicited MFB subfield is set to "0" and an MRQ subfield is set to "1." Include a compressed MSI subfield (2 bits) and an STBC indication subfield (1 bit) if an unsolicited MFB subfield is "1." |
| MFSI/GID-L | MFB sequence identifier/LSB group ID | An MFSI/GID-L subfield includes the received value of an MSI of included within a frame related to MFB information if an unsolicited MFB subfield is set to "0." An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB. VHT-MCS = 15, NUM_STS = 7 indicated that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU. All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU. An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ,).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the Duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)
d) A DCF interframe space (IFS) (DIFS)
e) An arbitration interframe space (IFS) (AIFS)
f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a Block ACK Request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$\text{aSIFSTime}(16\ \mu s) = \text{aRxRFDelay}(0.5) + \text{aRxPLCPDelay}(12.5) + \text{aMACProcessingDelay}(1\ \text{or}\ <2) + \text{aRxTxTurnaroundTime}(<2) \quad \text{[Equation 1]}$$

$$\text{aRxTxTurnaroundTime} = \text{aTxPLCPDelay}(1) + \text{aRxTxSwitchTime}(0.25) + \text{aTxRampOnTime}(0.25) + \text{aTxRFDelay}(0.5) \quad \text{[Equation 2]}$$

The "aSlotTime" is defined as in Equation 3 below.

$$\text{aSlotTime} = \text{aCCATime}(<4) + \text{aRxTxTurnaroundTime}(<2) + \text{aAirPropagationTime}(<1) + \text{aMACProcessinaelay}(<2) \quad \text{[Equation 3]}$$

In Equation 3, a default physical layer parameter is based on "aMACProcessingDelay" having a value which is equal to or smaller than 1 μs. A radio wave is spread 300 m/μs in the free space. For example, 3 μs may be the upper limit of a BSS maximum one-way distance ~450 m (a round trip is ~900 m).

The PIFS and the SIFS are defined as in Equations 4 and 5, respectively.

$$\text{DIFS}(16\ \mu s) = \text{aSIFSTime} + \text{aSlotTime} \quad \text{[Equation 4]}$$

$$\text{DIFS}(34\ \mu s) = \text{aSIFSTime} + 2*\text{aSlotTime} \quad \text{[Equation 5]}$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$\text{TxSIFS} = \text{SIFS} - \text{aRxTxTurnaroundTime} \quad \text{[Equation 6]}$$

$$\text{TxPIFS} = \text{TxSIFS} + \text{aSlotTime} \quad \text{[Equation 7]}$$

$$\text{TxDIFS} = \text{TxSIFS} + 2*\text{aSlotTIme} \quad \text{[Equation 8]}$$

Channel State Information Feedback Method

An SU-MIMO technology in which a beamformer allocates all of antennas to a single beamformee and performs communication increases a channel capacity through a diversity gain and stream multi-transmission using the space-time. The SU-MIMO technology can contribute to the improvement of performance of the physical layer by extending the degree of space freedom in such a way as to increase the number of antennas compared to a case where an MIMO technology is not applied.

Furthermore, the MU-MIMO technology in which a beamformer allocates an antenna to a plurality of beamformees can improve performance of an MIMO antenna by increasing the transfer rate per beamformee or the reliability of a channel through a link layer protocol for the multi-access of a plurality of beamformees which have accessed a beamformer.

In an MIMO environment, there is a need for a feedback procedure for obtaining channel information because performance may be greatly influenced depending on how accurately is a beamformer aware of channel information.

Two methods may be basically supported for the feedback procedure for obtaining channel information. One method is a method using a control frame, and the other method is a method using a channel sounding procedure not including a data field. Sounding means that a corresponding field is used in order to measure a channel for purposes other than the data demodulation of a PPDU including a preamble training field.

Hereinafter, a channel information feedback method using a control frame and a channel information feedback method using a null data packet (NDP) are described in more detail.

1) A Feedback Method Using a Control Frame

In an MIMO environment, a beamformer may indicate the feedback of channel state information through an HT control field included in an MAC header, or a beamformee may report channel state information through an HT control field included in an MAC frame header (see FIG. 8). The HT Control field may be included in a QoS Data frame in which the Order subfield of a Control Wrapper frame or MAC header has been set to 1 and management frames.

2) Feedback Method Using Channel Sounding

FIG. 11 is a diagram conceptually showing a channel sounding method in a wireless communication system to which an embodiment of the present invention may be applied.

FIG. 11 illustrates a method for feeding back channel state information between a beamformer (e.g., an AP) and a beamformee (e.g., a non-AP STA) based on a sounding protocol. The sounding protocol may mean a procedure for receiving information about channel state information through feedback.

A channel state information sounding method between a beamformer and a beamformee based on the sounding protocol may be performed according to the following steps.

(1) A beamformer sends a VHT null data packet announcement (VHT NDPA) frame for providing notification of sounding transmission for the feedback of a beamformee.

The VHT NDPA frame refers to a control frame which is used to provide notification that channel sounding is initiated and a null data packet (NDP) will be transmitted. In other words, by sending the VHT NDPA frame prior to the transmission of the NDP frame, a beamformee may be prepared for the feedback of channel state information before receiving the NDP frame.

The VHT NDPA frame may include association identifier (AID) information, feedback type information, etc. about a beamformee which will send an NDP. The VHT NDPA frame will be described in more detail later.

The VHT NDPA frame may be transmitted using different methods if data is transmitted using MU-MIMO and if data is transmitted using SU-MIMO. For example, if channel sounding for MU-MIMO is performed, the VHT NDPA frame may be transmitted using a broadcast method. In contrast, if channel sounding for SU-MIMO is performed, the VHT NDPA frame may be transmitted to a single target STA using a unicast method.

(2) A beamformer sends an NDP after an SIFS time after sending a VHT NDPA frame. The NDP has a VHT PPDU structure other than a data field.

Beamformees which have received the VHT NDPA frame may check the value of an AID12 subfield included in an STA information field and check whether each of the beamformees is a sounding target STA.

Furthermore, the beamformees may be aware of a feedback sequence through the sequence of an STA Info field included in NDPA. FIG. 11 illustrates a case where a feedback sequence is performed in order of a beamformee 1, a beamformee 2, and a beamformee 3.

(3) The beamformee 1 obtains DL channel state information based on a training field included in an NDP and generates feedback information to be transmitted to a beamformer.

After receiving the NDP frame, the beamformee 1 sends a VHT Compressed Beamforming frame, including feedback information, to the beamformer after an SIFS.

The VHT Compressed Beamforming frame may include the SNR value of a space-time stream, information about the compressed beamforming feedback matrix of a subcarrier, etc. The VHT Compressed Beamforming frame is described in more detail later.

(4) After receiving the VHT Compressed Beamforming frame from the beamformee 1, the beamformer sends a beamforming report poll frame to the beamformee 2 after an SIFS in order to obtain channel information from the beamformee 2.

The beamforming report poll frame plays the same role as the NDP frame. The beamformee 2 may measure a channel state based on the transmitted beamforming report poll frame.

The beamforming report poll frame is described in more detail later.

(5) The beamformee 2 that has received the beamforming report poll frame sends a VHT Compressed Beamforming frame, including feedback information, to the beamformer after an SIFS.

(6) After receiving the VHT Compressed Beamforming frame from the beamformee 2, the beamformer sends a beamforming report poll frame to the beamformee 3 in order to obtain channel information from the beamformee 3 after an SIFS.

(7) The beamformee 3 that has received the beamforming report poll frame sends a VHT Compressed Beamforming frame, including feedback information, to the beamformer after an SIFS.

A frame used in the above-described channel sounding procedure is described below.

FIG. 12 is a diagram illustrating a VHT NDPA frame in a wireless communication system to which an embodiment of the present invention may be applied.

Referring to FIG. 12, the VHT NDPA frame may include a Frame Control field, a Duration field, a receiving address (RA) field, a Transmitting Address (TA) field, a sounding dialog token field, an STA information 1 (STA Info 1) field to an STA information n (STA Info n) field, and FCS.

The value of the RA field indicates the address of a recipient or STA which receives a VHT NDPA frame.

If the VHT NDPA frame includes a single STA Info field, the value of the RA field has the address of an STA identified by an AID within the STA Info field. For example, if the VHT NDPA frame is transmitted to a single target STA for SU-MIMO channel sounding, an AP sends the VHT NDPA frame to a target STA in a unicast manner.

In contrast, if the VHT NDPA frame includes one or more STA Info fields, the value of the RA field has a broadcast address. For example, if the VHT NDPA frame is transmitted to one or more target STAs for MU-MIMO channel sounding, an AP broadcasts the VHT NDPA frame.

The value of the TA field indicates the address of a transmitter which sends the VHT NDPA frame, the address of an STA which sends the VHT NDPA frame, or a bandwidth which signalizes TA.

The sounding dialog token field may also be called a sounding sequence field. A Sounding Dialog Token Number subfield within the sounding dialog token field includes a value selected by a beamformer in order to identify the VHT NDPA frame.

The VHT NDPA frame includes at least one STA Info field. That is, the VHT NDPA frame includes an STA Info field including information about a sounding target STA. One STA Info field may be included in each sounding target STA.

Each STA Info field may include an AID12 subfield, a Feedback Type subfield, and an Nc index subfield.

Table 5 shows the subfields of the STA Info field included in the VHT NDPA frame.

TABLE 5

| SUBFIELD | DESCRIPTION |
| --- | --- |
| AID12 | Include the AID of an STA, that is, the subject of sounding feedback. If a target STA is an AP, a mesh STA or an STA, that is, a member of an IBSS, the value of the AID12 subfield is set to "0". |
| Feedback Type | Indicate a feedback request type for a sounding target STA. "0" in the case of SU-MIMO "1" in the case of MU-MIMO |
| Nc Index | If a Feedback Type subfield indicates MU-MIMO, indicates a value obtained by subtracting 1 from the column number Nc of a compressed beamforming feedback matrix. "0" if Nc = 1, "1" if Nc = 2, ... "7" if Nc = 8, Set as a Reserved subfield in the case of SU-MIMO. |

The pieces of information included in each of the above-described fields may comply with the definition of an IEEE 802.11 system. Furthermore, the above-described fields may correspond to an example of fields which may be included in an MAC frame, may be replaced with other fields, or may further include an additional field FIG. 13 is a diagram illustrating a NDP PPDU in a wireless communication system to which an embodiment of the present invention may be applied.

Referring to FIG. 13, an NDP may have a format from which a data field has been omitted in the same VHT PPDU format as that of FIG. 4. The NDP may be precoded based on a specific precoding matrix and transmitted to a sounding target STA.

In the L-SIG field of the NDP, a length field indicating the length of a PSDU included in a data field is set to "0."

In the VHT-SIG-A field of the NDP, a group ID field indicating whether a transmission scheme used for NDP transmission is MU-MIMO or SU-MIMO is set as a value indicating SU-MIMO transmission.

The data bit of the VHT-SIG-B field of the NDP is set in a bit pattern fixed for each bandwidth.

When a sounding target STA receives an NDP, it estimates a channel and obtains channel state information based on the VHT-LTF field of the NDP.

FIG. 14 is a diagram illustrating the format of a VHT Compressed Beamforming frame in a wireless communication system to which an embodiment of the present invention may be applied.

Referring to FIG. 14, the VHT Compressed Beamforming frame is a VHT action frame for supporting a VHT function and includes an action field in a frame body. The action field is included in the frame body of an MAC frame, and provides a mechanism for specifying extended management actions.

The action field includes a Category field, a VHT Action field, a VHT MIMO Control field, a VHT Compressed Beamforming Report field, and an MU Exclusive Beamforming Report field.

The Category field is set as a value indicating a VHT category (i.e., a VHT Action frame). The VHT Action field is set as a value indicating a VHT Compressed Beamforming frame.

The VHT MIMO Control field is used to feed back control information related to beamforming feedback. The VHT MIMO Control field may be always present in the VHT Compressed Beamforming frame.

The VHT Compressed Beamforming Report field is used to feed back information about beamforming metric including SNR information about a space-time stream which is used to send data.

The MU Exclusive Beamforming Report field is used to feed back SNR information about a spatial stream if MU-MIMO transmission is performed.

Whether the VHT Compressed Beamforming Report field and the MU Exclusive Beamforming Report field are present or not and the contents thereof may be determined based on the values of the Feedback Type subfield, remaining feedback segments subfield, and First Feedback Segment subfield of the VHT MIMO Control field.

The VHT MIMO Control field, the VHT Compressed Beamforming Report field, and the MU Exclusive Beamforming Report field are described in more detail below.

1) The VHT MIMO Control field includes an Nc index subfield, an Nr index subfield, a Channel Width subfield, a Grouping subfield, a Codebook Information subfield, a Feedback Type subfield, a remaining feedback segments subfield, a First Feedback Segment subfield, a Reserved subfield, and a Sounding Dialog Token Number subfield.

Table 6 shows the subfields of the VHT MIMO Control field

TABLE 6

| SUBFIELD | NUMBER OF BITS | DESCRIPTION |
|---|---|---|
| Nc Index | 3 | Indicate a value obtained by subtracting 1 from the column number Nc of a compressed beamforming feedback matrix. "0" if Nc = 1, "1" if Nc = 2, . . . "7" if Nc = 8 |
| Nr Index | 3 | Indicate a value obtained by subtracting 1 from the row number Nr of a compressed beamforming feedback matrix. "0" if Nr = 1, "1" if Nr = 2, . . . "7" if Nr = 8 |
| Channel Width | 2 | Indicate the bandwidth of a channel measured in order to generate a compressed beamforming feedback matrix. "0" in the case of 20 MHz, "1" in the case of 40 MHz, "2" in the case of 80 MHz, and "3" in the case of 160 MHz or 80 + 80 MHz |
| Grouping | 2 | Indicate subcarrier grouping Ng used in a compressed beamforming feedback matrix. "0" if Ng = 1 (no grouping), "1" if Ng = 2, "2" if Ng = 4, and a value "3" is set as a reserved value |
| Codebook Information | 1 | Indicate the size of codebook entries. If a feedback type is SU-MIMO, "0" if bψ = 2, bΦ = 4, "1" if bψ = 4, bΦ = 6, If a feedback type is MU-MIMO, "0" if bψ = 5, bΦ = 7, "1" if bψ = 7, bΦ = 9, In this case, bψ and bΦ refer to the number of quantized bits. |
| Feedback Type | 1 | Indicate a feedback type. "0" in the case of SU-MIMO, "1" in the case of MU-MIMO |
| Remaining Feedback Segments | 3 | Indicate the number of remaining feedback segments of a related VHT Compressed Beamforming frame. Set to "0" in the case of the last feedback segment of a segmented report or a segment of an unsegmented report. Set as a value from "1" to "6" not in the case of the first or last feedback segment of a segmented report. Set as a value from "1" to "6" in the case of a feedback segment other than the last segment of a segmented report. In the case of a retransmission feedback segment, a field is set as the same value as a related segment of the original transmission. |
| First Feedback Segments | 1 | Set to "1" in the case of the first feedback segment of a segmented report or the feedback segment of an unsegmented report. Set to "0" not in the case of the first feedback segment or if a VHT Compressed Beamforming Report field or an MU Exclusive Beamforming Report field is not present in a frame. The field is set as the same value as a related segment of the original transmission |
| Sounding Dialog Token Number | 6 | Set as the value of the sounding dialog token of an NDPA frame |

If the VHT Compressed Beamforming frame does not transfer some or all of the VHT Compressed Beamforming Report field, the Nc Index subfield, the Channel Width subfield, the Grouping subfield, the Codebook Information subfield, the Feedback Type subfield, and the Sounding Dialog Token Number subfield are set as reserved fields, the First Feedback Segment subfield is set to "0", and the remaining feedback segments subfield is set to "7."

The Sounding Dialog Token Number subfield may also be called a sounding sequence number subfield.

2) The VHT Compressed Beamforming Report field is used to transfer explicit feedback information that expresses a compressed beamforming feedback matrix "V", used by a transmitting beamformer to determine a steering matrix "Q", in an angle form.

Table 7 shows the subfields of the VHT Compressed Beamforming Report field.

TABLE 7

| SUBFIELD | NUMBER OF BITS | DESCRIPTION |
|---|---|---|
| Average SNR of space-time stream 1 | 8 | Average SNR on all of subcarriers for a space-time stream 1 in a beamformee |
| . . . | . . . | . . . |
| Average SNR of space-time stream Nc | 8 | Average SNR on all of subcarriers for a space-time stream Nc in a beamformee |
| Compressed beamforming feedback matrix V for subcarrier k = scidx (0) | Na*(bψ + bΦ)/2 | Sequence of the angle of a compressed beamforming feedback matrix for a corresponding subcarrier |
| Compressed beamforming feedback matrix V for subcarrier k = scidx (1) | Na*(bψ + bΦ)/2 | Sequence of the angle of a compressed beamforming feedback matrix for a corresponding subcarrier |
| . . . | . . . | . . . |
| Compressed beamforming feedback matrix V for subcarrier k = scidx (Ns-1) | Na*(bψ + bΦ)/2 | Sequence of the angle of a compressed beamforming feedback matrix for a corresponding subcarrier |

Referring to Table 7, the VHT Compressed Beamforming Report field may include an average SNR of space-time streams and the compressed beamforming feedback matrix "V" of each subcarrier. The compressed beamforming feedback matrix is a matrix including information about a channel situation, and is used to calculate a channel matrix (i.e., a steering matrix "Q") in a transmission method using MIMO.

scidx( ) means a subcarrier in which a compressed beamforming feedback matrix subfield is transmitted. Na is fixed by an Nr×Nc value (e.g., if Nr×Nc=2×1, $\Phi11$, $\Psi21$, . . . ).

Ns refers to the number of subcarriers in which a compressed beamforming feedback matrix is transmitted to a beamformer. A beamformee may reduce the number of subcarriers Ns in which a compressed beamforming feedback matrix is transmitted using a grouping method. For example, the number of feedback compressed beamforming feedback matrices can be reduced by grouping a plurality of subcarriers into a single group (or grouping a plurality of subcarriers in an Ng unit) and transmitting compressed beamforming feedback matrices for each corresponding group. Ns may be calculated from a Channel Width subfield and a Grouping subfield included in the VHT MIMO Control field.

Table 8 illustrates an average SNR subfield of a space-time stream.

TABLE 8

| Average SNR of Space-Time i subfield | AvgSNR i |
| --- | --- |
| −128 | ≤−10 dB |
| −127 | −9.75 dB |
| −126 | −9.5 dB |
| . . . | . . . |
| +126 | 53.5 dB |
| +127 | ≥53.75 dB |

Referring to Table 8, an average SNR of each of space-time streams is calculated by calculating an average SNR value of all of subcarriers included in a channel and mapping the calculated average SNR value in a range of −128~+128.

3) The MU Exclusive Beamforming Report field is used to transfer explicit feedback information expressed in the form of a delta( ) SNR. Information within the VHT Compressed Beamforming Report field and the MU Exclusive Beamforming Report field may be used for an MU beamformer to determine a steering matrix "Q."

Table 9 shows the subfields of the MU Exclusive Beamforming Report field included in the VHT Compressed Beamforming frame.

TABLE 9

| SUBFIELD | NUMBER OF BITS | DESCRIPTION |
| --- | --- | --- |
| A delta SNR for a space-time stream 1 for a subcarrier k = sscidx (0) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (0) | 4 | A deviation between the SNR of a corresponding subcarrier and an average SNR of all the subcarriers of a corresponding space-time stream |
| ... | | |
| A delta SNR for a space-time stream 1 for a subcarrier k = sscidx (1) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (1) | 4 | A deviation between the SNR of a corresponding subcarrier and an average SNR of all the subcarriers of a corresponding space-time stream |
| ... | | |
| A delta SNR for a space-time stream 1 for a subcarrier k = sscidx (Ns'-1) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (Ns'-1) | 4 | A deviation between the SNR of a corresponding subcarrier and an average SNR of all the subcarriers of a corresponding space-time stream |

Referring to Table 9, the MU Exclusive Beamforming Report field may include an SNR per space-time stream for each subcarrier.

Each delta SNR subfield has a value that increases at an interval of 1 dB between −8 dB and 7 dB.

scidx( ) refers to a subcarrier(s) in which a delta SNR subfield is transmitted, and Ns refers to the number of subcarriers in which a delta SNR subfield is transmitted to a beamformer.

FIG. 15 is a diagram illustrating the format of a beamforming report poll frame in a wireless communication system to which an embodiment of the present invention may be applied.

Referring to FIG. 15, the beamforming report poll frame includes a Frame Control field, a Duration field, a receiving address (RA) field, a Transmitting Address (TA) field, a Feedback Segment Retransmission Bitmap field, and an FCS.

The value of the RA field indicates the address of an intended recipient.

The value of the TA field indicates the address of an STA that sends the beamforming report poll frame or a bandwidth which signals a TA.

The Feedback Segment Retransmission Bitmap field indicates a feedback segment that is requested in a VHT compressed beamforming report.

In the value of the Feedback Segment Retransmission Bitmap field, if the bit of a location n is "1", (n=0 in the case of the LSB and n=7 in the case of the MSB), a feedback segment corresponding to "n" in the remaining feedback segments subfield within the VHT MIMO Control field of a VHT Compressed Beamforming frame is requested. In contrast, if the bit of the location n is "0", a feedback segment corresponding to "n" in the remaining feedback segments subfield within the VHT MIMO Control field is not requested.

Group Identifier (ID)

For higher throughput, a VHT WLAN system supports an MU-MIMO transmission method. Accordingly, an AP may transmit a data frame to one or more MIMO-paired STAs at the same time. The AP may transmit data to an STA group, including one or more of a plurality of STAs associated with the AP, at the same time. For example, the number of paired STAs may be a maximum of 4. If a maximum number of spatial streams is 8, a maximum of four spatial streams may be allocated to each of the STAs.

Furthermore, in a WLAN system supporting tunneled direct link setup (TDLS) or direct link setup (DLS) or a mesh network, an STA attempting to transmit data may transmit a PPDU to a plurality of STAs using an MU-MIMO transmission scheme.

An example in which an AP transmits a PPDU to a plurality of STAs using an MU-MIMO transmission scheme is described below.

An AP transmits a PPDU to one or more STAs belonging to a paired STA group, that is, an intended recipient, through different spatial streams at the same time. As described above, the VHT-SIG A field of a VHT PPDU format includes group ID information and space-time stream information, and thus each of the STAs can check whether the received PPDU is a PPDU transmitted thereto. In this case, data may not be transmitted to a specific STA of the STA group, that is, the intended recipient, because a spatial stream has not been allocated to the specific STA.

In order to assign or change a user position corresponding to one or more group IDs, a group ID management frame is used. That is, an AP may provide notification of STAs associated with a specific group ID through a group ID management frame before it perform MU-MIMO transmission.

FIG. 16 is a diagram illustrating a group ID management frame in a wireless communication system to which an embodiment of the present invention may be applied.

Referring to FIG. 16, the group ID management frame is a VHT Action frame for supporting a VHT function, and includes an Action field in its Frame Body. The Action field is included in the Frame Body of an MAC frame and provides a mechanism for specifying extended management operations.

The Action field includes a Category field, a VHT Action field, a Membership Status Array field, and a User Position Array field.

The Category field is set as a value indicative of a VHT Category (i.e., a VHT Action frame). The VHT Action field is set as a value indicative of a group ID management frame.

The Membership Status Array field includes a Membership Status subfield of 1 bit corresponding to each group. If the Membership Status subfield is set to "0", it indicates that an STA is not a member of a corresponding group. If the Membership Status subfield is set to "1", it indicates that an STA is a member of a corresponding group. When one or more Membership Status subfields within the Membership Status Array field are set to "1", one or more groups may be allocated to an STA.

An STA may have one user position in each group to which the STA belongs.

The User Position Array field includes a User Position subfield of 2 bits corresponding to each group. The user position of an STA within a group to which the STA belongs is indicated by a User Position subfield within the User Position Array field. An AP may allocate the same user position to different STAs within each group.

An AP may transmit a group ID management frame only if a dot11VHTOptionImplemented parameter is 'true'. The group ID management frame is transmitted to only a VHT STA whose MU Beamformee Capable field within a VHT Capability element field has been set to "1." The group ID management frame is transmitted as a frame addressed to each of STAs.

An STA receives a group ID management frame having an RA field matched with its MAC address. The STA updates GROUP_ID_MANAGEMENT, that is, a PHYCONFIG_VECTOR parameter, based on the contents of the received group ID management frame.

The transmission of a group ID management frame to an STA and the transmission of corresponding ACK by the STA are completed before an MU PPDU is transmitted to the STA.

An MU PPDU is transmitted to an STA based on the contents of a group ID management frame that has been transmitted to the STA most recently and whose ACK has been received.

Downlink (DL) MU-MIMO Frame

FIG. 17 is a diagram illustrating a DL multi-user (MU) PPDU format in a wireless communication system to which an embodiment of the present invention may be applied.

Referring to FIG. 17, the PPDU includes a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 18 is a diagram illustrating a DL multi-user (MU) PPDU format in a wireless communication system to which an embodiment of the present invention may be applied.

In FIG. 18, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 18, the MU PPDU includes L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 18, each VHT A-MPDU may be transmitted in a different stream.

In FIG. 18, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block ACK Procedure

FIG. 19 is a diagram illustrating a DL MU-MIMO transmission process in a wireless communication system to which an embodiment of the present invention may be applied.

In 802.11ac, MU-MIMO is defined in downlink from an AP to a client (i.e., a non-AP STA). In this case, a multi-user (MU) frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each of the STAs.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

Acknowledgement (ACK)/Block ACK Frame

In general, an ACK frame is used as a response to an MPDU, and a block ACK frame is used as a response to an A-MPDU.

FIG. 20 is a diagram illustrating an ACK frame in a wireless communication system to which an embodiment of the present invention may be applied.

Referring to FIG. 20, the ACK frame includes a Frame Control field, a Duration field, an RA field, and an FCS.

The RA field is set as the value of the second address (Address 2) field of a data frame, a management frame, a block ACK request frame, a block ACK frame or a PS-Poll frame that has been received right before.

When an ACK frame is transmitted by a non-QoS STA, if a more fragments subfield within the Frame Control field of a data frame or a management frame that has been received right before is "0", a duration value is set to "0."

In an ACK frame not transmitted by a non-QoS STA, a duration value is set as a value (ms) obtained by subtracting the time required to send the ACK frame and an SIFS interval from the Duration/ID field of a data frame, a management frame, a block ACK request frame, a block ACK frame or a PS-Poll frame that has been received right before. If the calculated duration value is not an integer value, it is rounded off to the nearest whole number.

Hereinafter, a block ACK (request) frame is described.

FIG. 21 is a diagram illustrating a block ACK request frame in a wireless communication system to which an embodiment of the present invention may be applied.

Referring to FIG. 21, the Block ACK Request (BAR) frame includes a Frame Control field, a Duration/ID field, a Receiving Address (RA) field, a Transmitting Address (TA) field, a BAR Control field, a BAR Information field, and a frame check sequence (FCS).

The RA field may be set as the address of an STA that receives the BAR frame.

The TA field may be set as the address of an STA that sends the BAR frame.

The BAR Control field includes a BAR ACK Policy subfield, a Multi-TID subfield, a Compressed Bitmap subfield, a Reserved subfield, and a TID Information (TID Info) subfield.

Table 10 illustrates the BAR Control field.

TABLE 10

| SUBFIELD | BIT | DESCRIPTION |
| --- | --- | --- |
| BAR ACK policy | 1 | Set to "0" when a sender requests an immediate ACK for data transmission. Set to "1" when a sender does not request an immediate ACK for data transmission. |
| Multi-TID | 1 | Indicate the type of BAR frame depending on the value of a Multi-TID subfield and a Compressed Bitmap subfield. 00: Basic BAR 01: Compressed BAR 10: Reserved value 11: Multi-TID BAR |
| Compressed bitmap | 1 | |
| Reserved | 9 | |
| TID_Info | 4 | The meaning of a TID_Info field is determined by the type of BAR frame. Include TID that requests a BA frame in the case of a Basic BAR frame or a Compressed BAR frame. Include the number of TIDs in the case of a Multi-TID BAR frame |

The BAR Information field includes different information depending on the type of BAR frame. This is described with reference to FIG. 22.

FIG. 22 is a diagram illustrating the BAR Information field of a block ACK request frame in a wireless communication system to which an embodiment of the present invention may be applied.

FIG. 22(a) illustrates the BAR information field of a Basic BAR frame and a Compressed BAR frame, and FIG. 22(b) illustrates a BAR information field of a Multi-TID BAR frame.

Referring to FIG. 22(a), in the case of the Basic BAR frame and the Compressed BAR frame, a BAR Information field includes a Block ACK Starting Sequence Control subfield.

Furthermore, the Block ACK Starting Sequence Control subfield includes a Fragment Number subfield and a Starting Sequence Number subfield.

The Fragment Number field is set to 0.

In the case of the Basic BAR frame, the Starting Sequence Number subfield includes the sequence number of the first MSDU in which a corresponding BAR frame is transmitted. In the case of the Compressed BAR frame, the Starting Sequence Control subfield includes the sequence number of the first MSDU or A-MSDU for transmitting a corresponding BAR frame.

Referring to FIG. 22(b), in the case of the Multi-TID BAR frame, the BAR Information field is configured in such a manner that a Per TID Info subfield and a Block ACK Starting Sequence Control subfield are repeated for one or more TIDs.

The Per TID Info subfield includes a Reserved subfield and a TID Value subfield. The TID Value subfield includes a TID value.

The Block ACK Starting Sequence Control subfield, as described above, includes a fragment number and a Starting Sequence Number subfield. The Fragment Number field is set to 0. The Starting Sequence Control subfield includes the sequence number of the first MSDU or A-MSDU for transmitting a corresponding BAR frame.

FIG. 23 is a diagram illustrating a block ACK frame in a wireless communication system to which an embodiment of the present invention may be applied.

Referring to FIG. 23, the Block ACK (BA) frame includes a Frame Control field, a Duration/ID field, a Reception Address (RA) field, a Transmitting Address (TA) field, a BA Control field, a BA Information field, and a frame check sequence (FCS).

The RA field may be set as the address of an STA that has requested a block ACK.

The TA field may be set as the address of an STA that sends a BA frame.

The BA Control field includes a BA ACK Policy subfield, a Multi-TID subfield, a Compressed Bitmap subfield, a Reserved subfield, and a TID Information (TID Info) subfield.

Table 11 illustrates the BA Control field.

TABLE 11

| SUBFIELD | BIT | DESCRIPTION |
| --- | --- | --- |
| BA ACK policy transmission. | 1 | Set to "0" when a sender requests an immediate ACK for data Set to "1" when a sender does not request an immediate ACK for data transmission. |
| Multi-TID | 1 | Indicate the type of BA frame depending on the values of a Multi-TID subfield and a Compressed Bitmap subfield. 00: Basic BA 01: Compressed BA 10: Reserved value 11: Multi-TID BA |
| Compressed bitmap | 1 | |
| Reserved | 9 | |
| TID_Info | 4 | The meaning of a TID_Info field is determined by the type of BA frame. Include TID that requests a BA frame in the case of a Basic BA frame, a Compressed BA frame. Include the number of TIDs in the case of a Multi-TID BA frame |

The BA Information field includes different information depending on the type of BA frame. This is described below with reference to FIG. 24.

FIG. 24 is a diagram illustrating the BA Information field of the block ACK frame in a wireless communication system to which an embodiment of the present invention may be applied.

FIG. 24(a) illustrates the BA Information field of a Basic BA frame, FIG. 24(b) illustrates the BA Information field of a Compressed BA frame, and FIG. 24(c) illustrates the BA Information field of a Multi-TID BA frame.

Referring to FIG. 24(a), in the case of the Basic BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU for transmitting a corresponding BA frame, and is set as the same value as the Basic BAR frame that has been received right before.

The Block ACK Bitmap subfield has the length of 128 octets and is used to indicate the reception state of a maximum of 64 MSDUs. In the Block ACK Bitmap subfield, a value "1" indicates that an MPDU corresponding to a corresponding bit location has been successfully received. A value "0" indicates that an MPDU corresponding to a corresponding bit location has not been successfully received.

Referring to FIG. 24(b), in the case of the Compressed BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU or A-MSDU for transmitting a corresponding BA frame, and is set as the same value as the Basic BAR frame that has been received right before.

The Block ACK Bitmap subfield has the length of 8 octets and is used to indicate the reception state a maximum of 64 MSDUs and A-MSDUs. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Referring to FIG. 24(c), in the case of the Multi-TID BA frame, the BA Information field is configured in such a manner that a Per TID Info subfield, a Block ACK Starting Sequence Control subfield, and a Block ACK Bitmap subfield are repeated for one or more TIDs and is configured in order of an increasing TID.

The Per TID Info subfield includes a Reserved subfield and a TID Value subfield. The TID Value subfield includes a TID value.

The Block ACK Starting Sequence Control subfield includes a fragment number and a Starting Sequence Number subfield as described above. The Fragment Number field is set to 0. The Starting Sequence Control subfield includes the sequence number of the first MSDU or A-MSDU for transmitting a corresponding BA frame.

The Block ACK Bitmap subfield has a length of 8 octets. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

In the following description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 25 is a diagram illustrating a high efficiency (HE) format PPDU according to an embodiment of the present invention.

FIG. 25(a) illustrates a schematic configuration of the HE format PPDU, and FIGS. 25(b) to 25(d) illustrate more detailed configurations of the HE format PPDU.

Referring to FIG. 25(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 µs (=1/312.5 kHz), the IDFT/DFT period of the HE-part may be 12.8 µs (=1/78.125 kHz).

In this case, since one of 0.8 µs, 1.6 µs, and 3.2 µs may be used as a GI, the OFDM symbol length (or symbol interval) of the HE-part including the GI may be 13.6 µs, 14.4 µs, or 16 µs depending on the GI.

Referring to FIG. 25(b), the HE-SIG field may be divided into an HE-SIG-A field and an HE-SIG-B field.

For example, the HE-part of the HE format PPDU may include an HE-SIG-A field having a length of 12.8 µs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 25(b), the positions of the HE-SIG-A field and the HE-SIG-B field may be different from those of FIG. 25(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 11(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 25(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

An HE format PPDU for a WLAN system to which an embodiment of the present invention may be applied may be transmitted through at least one 20 MHz channel. For example, the HE format PPDU may be transmitted in a 40 MHz, 80 MHz or 160 MHz frequency band through a total of four 20 MHz channels. This is described in more detail below with reference to the following drawing.

The following PPDU format is described based on FIG. 25(b), for convenience of description, but the present invention is not limited thereto.

FIG. 26 is a diagram illustrating an HE format PPDU according to an embodiment of the present invention.

FIG. 26 illustrates a PPDU format if an 80 MHz frequency band has been allocated to one STA (or if an OFDMA resource unit has been allocated to a plurality of STAs within an 80 MHz frequency band) or if different streams each having an 80 MHz frequency band have been allocated to a plurality of STAs.

Referring to FIG. 26, an L-STF, an L-LTF, and an L-SIG field may be transmitted in an OFDM symbol generated based on 64 FFT points (or 64 subcarriers) in each 20 MHz channel.

An HE-SIG A field may include common control information in common transmitted to STAs that receive a PPDU. The HE-SIG A field may be transmitted in one to three OFDM symbols. The HE-SIG A field may be duplicated in a 20 MHz unit and includes the same information. Furthermore, the HE-SIG-A field provides notification of information about the full bandwidth of a system.

Table 12 illustrates information included in the HE-SIG A field.

TABLE 12

| FIELD | BIT | DESCRIPTION |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicate the position or number of spatial streams for each STA or indicate the position or number of spatial streams for a group of STAs |
| UL indication | 1 | Indicate whether a PPDU is directed toward an AP (uplink) or an STA (downlink) |
| MU indication | 1 | Indicate whether a PPDU is an SU-MIMO PPDU or an MU-MIMO PPDU |
| GI indication | 1 | Indicate whether a short GI or a long GI is used |
| Allocation information | 12 | Indicate a band or channel (a subchannel index or subband index) allocated to each STA in a band in which a PPDU is transmitted |
| Transmission power | 12 | Indicate transmission power for each channel or each STA |

Pieces of information included in each of the fields illustrated in Table 12 may comply with the definition of the IEEE 802.11 system. Furthermore, each of the aforementioned fields corresponds to an example of fields which may be included in a PPDU, but is not limited thereto. That is, each of the aforementioned fields may be replaced with another field or an additional field may be further included and all of the fields may not be essentially included.

The HE-STF is used to improve performance of AGC estimation in MIMO transmission.

The HE-SIG B field may include user-specific information which is required for each of STAs to receive its data (e.g., a PSDU). The HE-SIG B field may be transmitted in one or two OFDM symbols. For example, the HE-SIG B field may include information about a modulation and coding scheme (MCS) for a corresponding PSDU and the length of the corresponding PSDU.

The L-STF, L-LTF, the L-SIG field, and the HE-SIG A field may be repeated in a 20 MHz channel unit and transmitted. For example, when a PPDU is transmitted through four 20 MHz channels (i.e., 80 MHz bands), the L-STF, the L-LTF, the L-SIG field, and the HE-SIG A field may be repeated every 20 MHz channel and transmitted.

If the size of FFT increases, a legacy STA supporting the existing IEEE 802.11a/g/n/ac may not decode a corresponding HE PPDU. In order for a legacy STA and an HE STA to coexist, the L-STF, L-LTF, and the L-SIG field are transmitted through 64 FFT in a 20 MHz channel so that a legacy STA can receive them. For example, the L-SIG field may occupy one OFDM symbol, and one OFDM symbol time may be 4 μs, and a GI may be 0.8 μs.

The size of FFT for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the size of FFT increases, the number of OFDM subcarriers per unit frequency increases because spacing between the OFDM subcarriers is reduced, but the OFDM symbol time is increased. In order to improve efficiency of a system, the length of a GI after the HE-STF may be set to be the same as that of the HE-SIG A field.

The HE-SIG A field may include information which is required for an HE STA to decode an HE PPDU. However, the HE-SIG A field may be transmitted through 64 FFT in a 20 MHz channel so that both a legacy STA and an HE STA can receive the HE-SIG A field. The reason for this is that the HE STA has to receive an existing HT/VHT format PPDU in addition to an HE format PPDU and a legacy STA and the HE STA have to distinguish the HT/VHT format PPDU from the HE format PPDU.

FIG. 27 is a diagram illustrating an HE format PPDU according to an embodiment of the present invention.

Referring to FIG. 27, the HE format PPDU is the same as that of FIG. 26 except that an HE-SIG B field is located after an HE-SIG A field. In this case, the size of FFT per unit frequency may be further increased after an HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

FIG. 28 is a diagram illustrating an HE format PPDU according to an embodiment of the present invention.

In FIG. 28, it is assumed that 20 MHz channels are allocated to different STAs (e.g., an STA 1, an STA 2, an STA 3, and an STA 4).

Referring to FIG. 28, an HE-SIG B field is located after an HE-SIG A field. In this case, the size of FFT per unit frequency may be further increased after an HE-STF (or the HE-SIG B field). For example, 256 FFT may be used in a 20 MHz channel, 512 FFT may be used in a 40 MHz channel, and 1024 FFT may be used in an 80 MHz channel from an HE-STF (or the HE-SIG B field).

Information transmitted in each of the fields included in the HE format PPDU is the same as that of FIG. 26, and a description thereof is omitted.

The HE-SIG B field may include information specified for each of the STAs, but may be encoded in a full band (i.e., indicated in the HE-SIG-A field). That is, the HE-SIG B field includes information about all of the STAs and is received by all of the STAs.

The HE-SIG B field may provide notification of information about a frequency bandwidth allocated to each of the STAs and/or stream information in a corresponding frequency band. For example, in the HE-SIG-B field of FIG. 28, a 20 MHz frequency band may be allocated to the STA 1, a next 20 MHz frequency band may be allocated to the STA 2, a next 20 MHz frequency band may be allocated to the STA 3, and a next 20 MHz frequency band may be allocated to the STA 4. Furthermore, a 40 MHz frequency band may be allocated to the STA 1 and the STA 2, and a next 40 MHz frequency band may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 28. In this case, in the HE-SIG-B field, information about all of the STAs may be transmitted in a full band, and control information specific to each of the STAs may be transmitted in a 20 MHz unit through the HE-SIG-C field.

Furthermore, in the examples of FIGS. 26 to 28, the HE-SIG-B field is not transmitted in a full band, but may be transmitted in a 20 MHz unit like the HE-SIG-A field. This is described below with reference to the following drawing.

FIG. 29 is a diagram illustrating an HE format PPDU according to an embodiment of the present invention.

In FIG. 29, it is assumed that 20 MHz channels are allocated to different STAs (e.g., an STA 1, an STA 2, an STA 3, and an STA 4).

Referring to FIG. 29, as in FIG. 28, an HE-SIG B field is located after an HE-SIG A field. In this case, the HE-SIG B field is not transmitted in a full band and is transmitted in a 20 MHz unit like the HE-SIG A field.

In this case, the size of FFT per unit frequency may be further increased from an HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

Information transmitted in each of the fields included in the HE format PPDU is the same as that of FIG. 26, and a description thereof is omitted.

The HE-SIG A field may be may be duplicated in a 20 MHz unit and transmitted.

The HE-SIG B field may provide notification of information about a frequency band width allocated to each of the STAs and/or stream information in a corresponding frequency band.

The HE-SIG B field may be transmitted in a 20 MHz unit like the HE-SIG A field. In this case, the HE-SIG B field includes information about each of the STAs, and thus information about each of the STAs may be included in each HE-SIG B field of a 20 MHz unit. In this case, FIG. 29 illustrates an example in which a 20 MHz frequency band is allocated to each of the STAs. For example, if a 40 MHz frequency band is allocated to an STA, the HE-SIG-B field may be duplicated in a 20 MHz unit and transmitted.

Furthermore, information about all of the STAs (i.e., all of pieces of information specific to the STAs are combined) may be included in the HE-SIG B field and may be duplicated in a 20 MHz unit like the HE-SIG A field and transmitted.

As in the examples of FIGS. 27 to 29, if the HE-SIG-B field is placed ahead of the HE STF and the HE-LTF, the length of a symbol may be configured to be short using 64 FFT in 20 MHz. As in the example of FIG. 26, if the HE-SIG-B field is placed behind the HE STF and the HE-LTF, the length of a symbol may be configured to be long using 256 FFT in 20 MHz.

If some bandwidth having a small interference level from a neighbor BSS are allocated to an STA in a situation in which a different bandwidth is supported for each BSS, it may be preferred that the HE-SIG-B field is not transmitted in a full band as described above.

In FIGS. 26 to 29, a data field is payload and may include a SERVICE field, a scrambled PSDU, tail bits, and padding bits.

FIG. 30 illustrates a phase rotation for detecting an HE format PPDU according to an embodiment of the present invention.

In order to classify HE format PPDUs, the phases of three OFDM symbols transmitted after an L-SIG field in an HE format PPDU may be used.

Referring to FIG. 30, in the HE format PPDU, the phases of an OFDM symbol #1 and an OFDM symbol #2 transmitted after an L-SIG field are not rotated, but the phase of an OFDM symbol #3 may be rotated 90 degrees counterclockwise. That is, BPSK may be used as a modulation method for the OFDM symbol #1 and the OFDM symbol #2, and QBPSK may be used as a modulation method for the OFDM symbol #3.

An STA attempts to decode a first OFDM symbol to a third OFDM symbol transmitted after the L-SIG field of a received PPDU based on a constellation, such as that of FIG. 30. If the decoding is successful, the STA may determine the corresponding PPDU to be an HE format PPDU.

In this case, if the HE-SIG A field is transmitted in three OFDM symbols after the L-SIG field, this means that all of the OFDM symbol #1 to the OFDM symbol #3 are used to send the HE-SIG A field.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 31 is a diagram illustrating an UL MU transmission procedure according to an embodiment of the present invention.

Referring to FIG. 31, an AP instructs STAs participating in UL MU transmission to prepare UL MU transmission, receives an UL MU data frame from corresponding STAs, and transmits an ACK frame (a Block ACK (BA) frame) as a response to the UL MU data frame.

First, the AP instructs the STAs which will send UL MU data to prepare UL MU transmission by sending an UL MU trigger frame 3110 to the STAs. In this case, the UL MU scheduling frame may also be called a term "UL MU Scheduling frame."

In this case, the UL MU trigger frame 3110 may include STA identifier (ID)/address information, information about the allocation of resources to be used by each of the STAs, and control information such as duration information.

The STA ID/address information may mean information about an ID or address for specifying each of the STAs which transmits uplink data.

The resource allocation information means information about uplink transmission resources (e.g., frequency/subcarrier information allocated to each of the STAs in the case of UL MU OFDMA transmission, and a stream index allocated to each of the STAs in the case of UL MU MIMO transmission) allocated to each of the STAs.

The duration information means information for determining time resources for the transmission of an UL data frame transmitted by the plurality of STAs.

For example, the duration information may include information about the interval of a transmit opportunity (TXOP) allocated to the uplink transmission of each of the STAs and information (e.g., a bit or symbol) about the length of an uplink frame.

Furthermore, the UL MU trigger frame 3110 may further include control information, such as MCS information and/or coding information to be used when the UL MU data frame is transmitted by each of the STAs.

Such control information may be transmitted in the HE-part (e.g., the HE-SIG A field or the HE-SIG B field) of a PPDU that delivers the UL MU trigger frame 3110 or the control field (e.g., the Frame Control field of an MAC frame) of the UL MU trigger frame 3110.

The PPDU that delivers the UL MU trigger frame 3110 has a structure starting from the L-part (e.g., the L-STF, the L-LTF, and the L-SIG field). Accordingly, legacy STAs may perform network allocation vector (NAV) setting through L-SIG protection from the L-SIG field. For example, the legacy STAs may calculate an interval (hereinafter referred to as an "L-SIG protection interval") for NAV setting based on a data length and data rate information in the L-SIG field. Furthermore, the legacy STAs may determine that there is no data to be transmitted thereto during the calculated L-SIG protection interval.

For example, the L-SIG protection interval may be determined to be the sum of the value of the MAC Duration field of the UL MU trigger frame 3110 and the remaining interval after the L-SIG field of a PPDU that delivers the UL MU trigger frame 3110. Accordingly, the L-SIG protection interval may be set as a value up to the interval in which an ACK frame 3130 (or a BA frame) transmitted to each of the STAs is transmitted based on the MAC duration value of the UL MU trigger frame 3110.

A method for allocating resources for UL MU transmission to each of the STAs is described in more detail below. For convenience of description, fields including control information are classified and described, but the present invention is not limited thereto.

A first field may distinguish and indicate UL MU OFDMA transmission and UL MU MIMO transmission. For example, if the first field is "0", it may indicate UL MU OFDMA transmission. If the first field is "1", it may indicate UL MU MIMO transmission. The size of the first field may include 1 bit.

A second field (e.g., an STA ID/Address field) provides notification of the IDs or addresses of STAs that will participate in UL MU transmission. The size of the second field may include the number of bits for providing notification of the STA IDs×the number of STAs that will participate in UL MU transmission. For example, if the second field includes 12 bits, it may indicate the ID/address of each of STAs for every 4 bits.

A third field (e.g., a resource allocation field) indicates a resource area allocated to each of STAs for UL MU transmission. In this case, the resource areas allocated to the STAs may be sequentially indicated for the STAs in order of the previous second field.

If a value of the first field is "0", the third field indicates frequency information (e.g., a frequency index and a subcarrier index) for UL MU transmission in order of STA IDs/addresses included in the second field. If the first field value is "1", the third field indicates MIMO information (e.g., a stream index) for UL MU transmission in order of STA IDs/addresses included in the second field.

In this case, since one STA may be notified of several indices (i.e., a frequency/subcarrier index or a stream index), the size of the third field may include a plurality of bits (or may be configured in a bitmap form)×the number of STAs that will participate in UL MU transmission.

For example, it is assumed that the second field is set in order of the "STA 1" and the "STA 2" and the third field is set in order of "2" and "2."

In this case, if the first field is "0", frequency resources may be allocated to the STA 1 from a higher (or lower) frequency region, and next frequency resources may be sequentially allocated to the STA 2. For example, if OFDMA of a 20 MHz unit is supported in an 80 MHz band, the STA 1 may use a higher (or lower) 40 MHz band, and the STA 2 may use a next 40 MHz band.

In contrast, if the first field is "1", a higher (or lower) stream may be allocated to the STA 1 and next streams may be sequentially allocated to the STA 2. In this case, a beamforming scheme according to each stream may have been previously designated, or more detailed information about a beamforming scheme according to a stream may be included in the third field or a fourth field.

The STAs transmit respective UL MU data frames 3121, 3122, and 3123 to the AP based on the UL MU trigger frame 3110 transmitted by the AP. In this case, the STAs may transmit the UL MU data frames 3121, 3122, and 3123 to the AP after an SIFS since the UL MU trigger frame 3110 was received from the AP.

Each of the STAs may determine a specific frequency resource for UL MU OFDMA transmission or a spatial stream for UL MU MIMO transmission based on the resource allocation information of the UL MU trigger frame 3110.

More specifically, in the case of UL MU OFDMA transmission, the STAs may transmit the UL data frames on the same time resource through different frequency resources.

In this case, different frequency resources for UL data frame transmission may be allocated to the STA 1 to the STA 3 based on STA ID/address information and resource allocation information included in the UL MU trigger frame 3110. For example, the STA ID/address information may sequentially indicate the STA 1 to the STA 3, and the resource allocation information may sequentially indicate a frequency resource 1, a frequency resource 2, and a frequency resource 3. In this case, the frequency resource 1, frequency resource 2, and frequency resource 3 sequentially indicated based on the resource allocation information may be allocated to the STA 1 to STA 3 sequentially indicated based on the STA ID/address information, respectively. That is, the STA 1 may transmit the UL data frame 3121 to the AP through the frequency resource 1, the STA 2 may transmit the UL data frame 3122 to the AP through the frequency resource 2, and the STA 3 may transmit the UL data frame 3123 to the AP through the frequency resource 3.

Furthermore, in the case of UL MU MIMO transmission, each of the STAs may transmit the UL data frame on the same time resource through at least one different stream of a plurality of spatial streams.

In this case, the spatial stream for UL data frame transmission may be allocated to each of the STA 1 to the STA 3 based on the STA ID/address information and resource allocation information included in the UL MU trigger frame 3110. For example, the STA ID/address information may sequentially indicate the STA 1 to the STA 3, and the resource allocation information may sequentially indicate a spatial stream 1, a spatial stream 2, and a spatial stream 3. In this case, the spatial stream 1, spatial stream 2, and spatial stream 3 sequentially indicated based on the resource allocation information may be allocated to the STA 1 to the STA 3 sequentially indicated based on the STA ID/address information, respectively. That is, the STA 1, the STA 2, and the STA 3 may transmit the UL data frames 3121, 3122, and 3123 to the AP through the spatial stream 1, the spatial stream 2, and the spatial stream 3, respectively.

As described above, transmission duration (or transmission termination time) of each of the UL data frames 3121, 3122, and 3123 transmitted by the respective STAs may be determined by MAC duration information included in the UL MU trigger frame 3110. Accordingly, the STAs may synchronize the transmission termination times of the UL data frames 3121, 3122, and 3123 (or an uplink PPDU in which the UL data frame is delivered) based on an MAC duration value included in the UL MU trigger frame 3110 through bit padding or fragmentation.

The PPDU in which the UL data frames 3121, 3122, and 3123 are delivered may also be configured as a new structure without an L-part.

Furthermore, in the case of UL MU MIMO transmission or UL MU OFDMA transmission of a subband form of less than 20 MHz, the L-part of a PPDU in which the UL data frames 3121, 3122, and 3123 are delivered may be transmitted in an SFN form (i.e., all of the STAs transmit the same L-part configuration and contents at the same time). In contrast, in the case of UL MU OFDMA transmission of a subband form of 20 MHz or higher, the L-part of a PPDU in which the UL data frames 3121, 3122, and 3123 are delivered may be transmitted in a 20 MHz unit in a band to which each of the STAs has been allocated.

As described above, an MAC duration value may be set as a value up to the interval in which the ACK frame 3130 is transmitted in the UL MU trigger frame 3110. An L-SIG protection interval may be determined based on the MAC duration value. Accordingly, a legacy STA may perform NAV setting up to the ACK frame 3130 through the L-SIG field of the UL MU trigger frame 3110.

If an UL data frame can be sufficiently configured based on information about the UL MU trigger frame 3110, an HE-SIG field (i.e., a region in which control information about a method for configuring a data frame is transmitted) may not be present in a PPDU in which the UL data frames 3121, 3122, and 3123 are delivered. For example, an HE-SIG-A field and/or an HE-SIG-B field may not be transmitted. Furthermore, an HE-SIG-A field and an HE-SIG-C field are transmitted, but an HE-SIG-B field may not be transmitted.

The AP may transmit the ACK frame 3130 (or the BA frame) as a response to the UL data frames 3121, 3122, and 3123 received from the respective STAs. In this case, the AP may receive the UL data frames 3121, 3122, and 3123 from the STAs and may transmit the ACK frame 3130 to each of the STAs after an SIFS.

If the structure of an existing ACK frame is used in the same manner, the existing ACK frame may be configured to include the AID (or a partial AID (PAD)) of STAs, participating in UL MU transmission, in an RA field having a size of 6 octets.

Alternatively, if an ACK frame having a new structure is configured, the ACK frame may be configured in a form for DL SU transmission or DL MU transmission. That is, in the case of DL SU transmission, the ACK frame 3130 may be sequentially transmitted to the STAs participating in UL MU transmission. In the case of DL MU transmission, the ACK frame 3130 may be simultaneously transmitted to the STAs participating in UL MU transmission through resources (i.e., a frequencies or streams) allocated to the STAs.

The AP may transmit only the ACK frame 3130 for an UL MU data frame that has been successfully received to a corresponding STA. Furthermore, the AP may provide notification of whether the reception is successful through ACK or NACK through the ACK frame 3130. If the ACK frame 3130 includes NACK information, information (e.g., UL MU scheduling information) for a reason of NACK or a subsequent procedure may also be included.

Alternatively, a PPDU in which the ACK frame 3130 is delivered may be configured as a new structure without an L-part.

The ACK frame 3130 may also include STA ID or address information. If the sequence of STAs indicated in the UL MU trigger frame 3110 is applied in the same manner, the STA ID or address information may be omitted.

Furthermore, the TXOP (i.e., the L-SIG protection interval) of the ACK frame 3130 may be extended, and a frame for next UL MU scheduling or a Control frame including adjustment information for next UL MU transmission may be included in the TXOP.

For UL MU transmission, an adjustment process for synchronization between the STAs may be added.

FIG. 32 is a diagram illustrating an UL MU transmission procedure according to an embodiment of the present invention.

The same description as that of the example of FIG. 31 is omitted for convenience of description.

Referring to FIG. 32, an AP may instruct STAs to be used in UL MU to prepare the UL MU, may perform an adjustment process for synchronization between the STAs for the UL MU, may receive an UL MU data frame, and may transmit ACK.

First, the AP instructs the STAs that will send UL MU data to prepare UL MU transmission by sending an UL MU trigger frame 3210 to the STAs.

The STAs that have received the UL MU trigger frame 3210 from the respective AP transmit sync signals 3221, 3222, and 3223 to the AP. In this case, the STAs may transmit the sync signals 3221, 3222, and 3223 to the AP after an SIFS since they received the UL MU trigger frame 3210.

Furthermore, the AP that has received the sync signals 3221, 3222, and 3223 from the STAs transmits an Adjustment frame 3230 to each of the STAs. In this case, the AP may transmit the Adjustment frame 3230 to the STAs after an SIFS since it received the sync signals 3221, 3222, and 3223.

A procedure for transmitting and receiving the sync signals 3221, 3222, and 3223 and the Adjustment frame 3230 is a procedure for adjusting a time/frequency/power between the STAs for the transmission of the UL MU data frames. That is, in this procedure, the STAs transmit the respective sync signals 3221, 3222, and 3223 to the AP. The AP notifies the STAs of adjustment information for adjusting an error, such as a time/frequency/power, through the Adjustment frame 3230 based on corresponding values so that a corresponding value can be adjusted and transmitted in an UL MU data frame to be transmitted next. Furthermore, such a procedure is performed after the UL MU trigger frame 3210, so the STA can have the time to prepare to configure a data frame based on scheduling.

More specifically, the STAs indicated in the UL MU trigger frame 3210 transmit the sync signals 3221, 3222, and 3223 in respective indicated or designated resource areas. In this case, the sync signals 3221, 3222, and 3223 transmitted by the STAs may be multiplexed according to a time division multiplexing (TDM), code division multiplexing (CDM) and/or spatial division multiplexing (SDM) method.

For example, if the sequence of the STAs indicated in the UL MU trigger frame 3210 is the STA 1, the STA 2, and the STA 3 and the sync signals 3221, 3222, and 3223 of the STAs are CDM-multiplexed, the STA 1, the STA 2, and the STA 3 may transmit a sequence 1, a sequence 2, and a sequence 3, allocated in the designated sequence of the STAs, to the AP.

In this case, in order for the sync signals 3221, 3222, and 3223 of the STAs to be multiplexed according to the TDM, CDM and/or SDM method, resources (e.g., a time/sequence/stream) to be used by each of the STAs may be indicated or defined for each of the STAs.

Furthermore, a PPDU in which the sync signals 3221, 3222, and 3223 are delivered may not include an L-part or may be transmitted through only a physical layer signal without the configuration of an MAC frame.

The AP that has received the sync signals 3221, 3222, and 3223 from the STAs transmits the Adjustment frame 3230 to each of the STAs.

In this case, the AP may transmit the Adjustment frame 3230 to each of the STAs according to a DL SU transmission method or may transmit the Adjustment frame 3230 to each of the STAs according to a DL MU transmission method. That is, in the case of DL SU transmission, the Adjustment frames 3230 may be sequentially transmitted to the STAs participating in UL MU transmission. In the case of DL MU transmission, the Adjustment frames 3230 may be simultaneously transmitted to the STAs participating in UL MU transmission through resources (i.e., frequencies or streams) allocated to the STAs.

The Adjustment frame 3230 may also include STA ID or address information. If the sequence of STAs indicated in the UL MU trigger frame 3210 is applied in the same manner, the STA ID or address information may be omitted.

Furthermore, the Adjustment frame 3230 may include an adjustment field.

The adjustment field may include information for adjusting an error, such as a time/frequency/power. In this case, the signals of the STAs received by the AP may have an error, such as a time/frequency/power, and the adjustment information means information that provides notification of the adjustment of a corresponding error gap. In addition, any information may be included in the Adjustment frame 3230 if the information can precisely adjust an error, such as the time/frequency/power of the STAs, based on the sync signals 3221, 3222, and 3223 received by the AP.

A PPDU in which the Adjustment frame 3230 is delivered may include a new structure without an L-part.

A procedure for transmitting and receiving the sync signals 3221, 3222, and 3223 and the Adjustment frame 3230 may be performed before the UL MU trigger frame 3210 of the STAs are transmitted.

Furthermore, the transmission of the sync signals 3221, 3222, and 3223 may be omitted, and the AP may include adjustment information in the UL MU trigger frame 3210 through implicit measurement and transmit the UL MU trigger frame 3210. For example, in a pre-procedure to be described later, the AP may generate adjustment information for adjusting an error, such as a time/frequency/power between the STAs, through an NDP or buffer status/sounding frame transmitted by each of the STAs, and may transmit the adjustment information to each of the STAs through the UL MU trigger frame 3210.

Furthermore, in the case of STAs not requiring adjustment (e.g., if an adjustment procedure between STAs that will perform UL MU transmission has been previously completed), a procedure for transmitting and receiving the sync signals 3221, 3222, and 3223 and the Adjustment frame 3230 may be omitted.

Furthermore, if only some adjustment procedure is required, only a correspondingly procedure may be adjusted. For example, if the cyclic prefix (CP) length of an UL MU data frame is long to the extent that synchronization deviated between STAs is not a problem, a procedure for adjusting the time difference may be omitted. Alternatively, if a guard band between STAs is sufficient upon UL MU OFDMA transmission, a procedure for adjusting a frequency difference may be omitted.

The STAs transmit respective UL MU data frames 3241, 3242, and 3243 to the AP based on the UL MU trigger frame 3210 and the Adjustment frame 3230 transmitted by the AP. In this case, the STAs may transmit the UL MU data frames 3241, 3242, and 3243 to the AP after an SIFS since they received the Adjustment frame 3230 from the AP.

The AP may transmit an ACK frame 3250 (or a Block ACK (BA) frame) as a response to the UL data frames 3241, 3242, and 3243 received from the STAs. In this case, the AP may transmit the ACK frame 3250 to the STAs after an SIFS it received the UL data frames 3241, 3242, and 3243 from the STAs.

Hereinafter, an embodiment of the present invention proposes a method for allocating resources in an OFDMA multi-user (MU) transmission method.

FIG. 33 is a diagram illustrating a resource allocation unit in an OFDMA MU transmission method according to an embodiment of the present invention.

Referring to FIG. 33, when a DL/UL MU OFDMA transmission method is used, a plurality of resource units 3302 may be configured in an n-tone (or subcarrier) unit in a 20 MHz band. One or more resource units 3302 may be allocated to one STA as DL/UL resources, and thus different resource units 3302 may be allocated to a plurality of STAs.

Furthermore, if a 20 MHz band is allocated to one STA, a resource unit 3301 is configured in an N-tone (or subcarrier) unit.

For example, 9 resource units 3302 may be determined in a 26-tone unit in a 20 MHz unit, and different resource units 3302 may be allocated to a maximum of 9 STAs. Furthermore, if the entire 20 MHz is to be allocated to one STA, a 242-tone resource unit 3301 may be used.

In the case of downlink, the data fields of a PPDU of a 20 MHz unit may be multiplexed in a frequency domain a 26-tone unit allocated to STAs and simultaneously transmitted to a maximum of 9 STAs. In the case of uplink, if resources are allocated in a 26-tone unit for each STA, each of the 9 STAs may configure the data field of a PPDU in a 26-tone unit allocated thereto, and the 9 STAs may transmit the data fields to the AP at the same time.

In a 40 MHz unit, the resource unit of the 20 MHz unit may be duplicated in a 20 MHz unit and may determine a resource unit of the 40 MHz unit.

For example, in a 40 MHz unit, 18 resource units may be determined in a 26-tone unit. Furthermore, if one additional resource unit of a 26-tone unit can be used at the center of a 40 MHz bandwidth, a total of 19 resource units may be used in the 40 MHz unit.

Furthermore, if a full 40 MHz bandwidth is to b e allocated to one STA, two resource units may be used in a 242-tone unit. Furthermore, if one or two additional resource units of a 26-tone unit can be further used at the center of the 40 MHz bandwidth, two resource units in the 242-tone unit and one or two remaining tones in the 26-tone unit may be allocated.

Likewise, in an 80 MHz unit, the resource unit of the 40 MHz unit may be duplicated in a 40 MHz unit, and thus determines a resource unit of the 80 MHz unit. Furthermore, the resource unit of the 40 MHz unit may be duplicated in a 40 MHz unit, and one additional resource unit of a 26-tone unit may be further used at the center of an 80 MHz bandwidth.

When an UL MU data frame is transmitted (refer to FIGS. 31 and 32), the UL MU data frame may be transmitted in a 20 MHz, 40 MHz, 80 MHz or 160 MHz band.

If a full bandwidth is 20 MHz or higher, if an UL MU data frame has to be transmitted along with an L-part (and an HE-SIG) duplicated in a 20 MHz unit when the UL MU data frame is transmitted, the L-part (and HE-SIG) of a 20 MHz band to which a resource unit allocated thereto is transmitted.

For example, if a full bandwidth is 40 MHz (0~40 MHz), a 0~10 MHz region has been allocated to an STA 1 and a 20~30 MHz region has been allocated to an STA 2, the STA 1 transmits an L-part (and an HE-SIG) in the 0~20 MHz region and transmits an MAC data field (i.e., the data field of a PPDU) in the 0~10 MHz region. The STA 2 transmits an L-part (and an HE-SIG) in the 20~40 MHz region and transmits an MAC data field (i.e., the data field of a PPDU) in the 20~30 MHz region.

If an STA duplicates an L-part in a 20 MHz unit regardless of a frequency resource region allocated thereto and transmits the L-part in a full bandwidth (in the above example, if both the STA 1 and the STA 2 duplicate the L-parts in a 20 MHz unit and transmit them in a full bandwidth 40 MHz), a problem in which power of the L-part is relatively higher than that of a data field may be generated. Furthermore, efficiency of use of radio resources may be deteriorated because surrounding STAs recognize that STAs (in the above example, the STA 1 and the STA 2) performing UL transmission also use frequency resources other than frequency resources allocated thereto and thus do not use the frequency resources.

An HE-SIG may not be transmitted in an UL MU data frame. Upon UL OFDMA transmission, for example, when nine STAs transmit UL MU data frames in a 26-tone unit in a 20 MHz frequency band, if the nine STAs transmit different HE-SIGs in the same 20 MHz band, there is a possibility that an AP may not smoothly decode the HE-SIGs because the HE-SIGs collide against each other.

Furthermore, if information, such as a frequency resource (i.e., a subcarrier), a time resource, MCS information, and a beamforming scheme used for the transmission of an UL MU data frame, is notified in a trigger frame, each of STAs transmits its own UL MU data frame based on control information determined by the trigger frame. Accordingly, an AP may decode a corresponding UL MU data frame although each of the STAs does not send an HE-SIG in the UL MU data frame.

In contrast, if an AP transmits a trigger frame in order to determine whether uplink data to be transmitted from an STA to the AP is present, the trigger frame may include only resource unit information which is used to send an UL MU data frame. In this case, an STA having uplink data to be transmitted to the AP may select a random resource unit and competitively transmit buffer status information.

Hereinafter, an embodiment of the present invention proposes a method for configuring control information in which an UL MU transmission procedure has been taken into consideration.

The control information may be divided into control information in common applied to an STA involved in an UL MU transmission procedure (hereinafter referred to as "common control information") and control information specifically applied to each STA (hereinafter referred to as "non-common control information"). Furthermore, an SIG field that carries the common control information is called a "common SIG field" and an SIG field that carries the non-common control information is called a "non-common SIG."

For example, the common control information may include common information, such as a bandwidth, and information about the configuration of a non-common SIG field. Furthermore, the non-common control information may include the MAC length of a corresponding frame or the frame of a next PPDU, an MCS applied to an MAC frame, the type of information included in an MAC frame and so on.

The control information may be delivered through the SIG field in the trigger frame and/or the UL MU data frame in FIGS. 31 and 32.

The common SIG field may be duplicated (i.e., the same information is transmitted) in a 20 MHz unit and transmitted. The common SIG field may correspond to the L-SIG field, the HE-SIG A field, the HE-SIG B field or the HE-SIG B1 field (if the HE-SIG B field is divided into the HE-SIG B1 field and the HE-SIG B2 field), for example.

The non-common SIG field may be transmitted in a 20 MHz unit by encoding all of pieces of non-common control information corresponding to respective STAs at once. Furthermore, each of STAs may decode only its own non-common control information by independently encoding non-common control information about each of the STAs. In this case, each of the STAs needs to be aware of the number of STAs participating in an UL MU transmission procedure and how many resources (frequencies or streams) have been divided into several resources (frequencies or streams). Such information may be delivered in the common SIG field. The non-common SIG field may correspond to the HE-SIG B field, the HE-SIG B2 (if the HE-SIG B is divided into the HE-SIG B1 and the HE-SIG B2) or HE-SIG C field, for example.

In the following description of the present invention, an "MAC field" means a field that carries a DL/UL MAC frame. For example, the MAC field may correspond to the data field of a DL/UL (SU/MU) PPDU or a PSDU (i.e., an MPDU or A-MPDU). In this case, the MAC frame includes a DL/UL MAC control frame, a management frame or a data frame.

Furthermore, the "MAC frame (also called a "frame") may mean a DL/UL MAC frame (i.e., an MAC control frame, an MAC management frame or a data frame) itself. In this case, the "MAC frame" may be interpreted as having the same meaning as "MAC field." Furthermore, the "MAC frame (also called a "frame") may mean a DL/UL (SU/MU) PPDU including an "MAC field."

1. Common Control Information

The common control information delivered in the common SIG field is as follows.

As described above, for example, an L-SIG field, an HE-SIG A field, an HE-SIG B field or an HE-SIG B1 field (if the HE-SIG B field is divided into the HE-SIG B1 field and an HE-SIG B2 field) may correspond to the common SIG field.

More specifically, if the L-SIG field is used as the common SIG field, the "Rate" field of 4 bits and "Reserved" field of 1 bit of the L-SIG field may be used to transmit the common control information.

Bandwidth Indication (2 Bits)

This field indicates channel bandwidth information. For example, the band indication field may indicate 20 MHz, 40 MHz, 80 MHz, 80+80 or 160 MHz using "0", "1", "2" or "3"

GI Indication (1 Bit)

This field indicates whether a GI attached to a data symbol is a short GI or a long GI.

HE-SIG Configuration Indication (1 Bit)

This field indicates whether the HE-SIG field (i.e., a non-common SIG field) subsequent to the common SIG field is information about the configuration of a frame itself including the common SIG field (for own frame) or information about the configuration of a frame subsequent to a frame including the common SIG field (for the next UL frame).

For example, if an L-SIG field is used as a common SIG field, for example, an HE-SIG A field or an HE-SIG B field may correspond to a subsequent HE-SIG field (i.e., a non-common SIG field). Furthermore, if the HE-SIG A field is used as the common SIG field, for example, an HE-SIG B field may correspond to a subsequent HE-SIG field (i.e., a non-common SIG field).

If a non-common SIG field indicates information about the configuration of a frame subsequent to a frame including a common SIG field, for example, a trigger frame (or a scheduling frame) just before transmitted by an AP in order to transmit an UL MU data frame may correspond to the non-common SIG field. In this case, this field may be called "trigger indication" or "trigger frame indication." This is described below with reference to the following drawing.

FIG. 34 is a diagram illustrating a frame structure for supporting UL MU transmission according to an embodiment of the present invention.

FIG. 34 shows the sequence of frames in a time axis. In this case, the configuration of the frames in a frequency axis is omitted.

FIG. 34(*a*) is a diagram illustrating a normal frame (i.e., a frame other than a trigger frame) and FIG. 34(*b*) is a diagram illustrating a trigger frame (or a scheduling frame).

Referring to FIG. 34(*a*), the normal frame may include an L-STF 3411, an L-LTF 3412, an L-SIG field 3413, an HE-SIG-A field 3414, an HE-SIG-B field 3415, and an MAC frame 3416. An HE-STF and an HE-LTF may be further added to the normal frame.

In this case, the MAC frame 3416 may mean an MAC control frame, a management frame or an MAC frame itself, such as a data frame, and may be interpreted as a field (i.e., the data field of a PPDU) including the MAC control frame, management frame or MAC frame.

In FIG. 34(*a*), an HE-SIG-A field may be used as a common SIG field and an HE-SIG-B field may be used as a non-common SIG field. In this case, the HE-SIG-A field includes common control information, such as a bandwidth, and information about the configuration of an HE-SIG-B field. Furthermore, the HE-SIG-B field includes the length of an MAC frame, an MCS, and configuration information, such as the type of information included in an MAC frame.

A trigger frame (or a scheduling frame) may include an MAC frame including an MAC field (i.e., a field including an MAC frame, such as an MAC control frame or an MAC management frame) as in FIG. 34(*a*), but may include only a field up to an SIG field (i.e., include only a physical (PHY) preamble) without including an MAC field as in FIG. 34(*b*).

In this case, the physical preamble includes a legacy preamble (i.e., including an L-STF, an L-LTF and/or an L-SIG field) and an HE-preamble (including an HE-STF, an HE-LTF and/or an HE-SIG field).

If a trigger frame is configured as in FIG. 34(*a*), control information (e.g., resource allocation information (subcarrier or stream) and/or MCS information) about an UL MU data frame subsequent to the trigger frame may be included in the MAC frame (i.e., the MAC field) 3416. In this case, the "HE-SIG configuration indication" field may indicate whether control information about the UL MU data frame subsequent to the trigger frame is included in the MAC frame 3416.

In contrast, if a trigger frame is configured as in FIG. 34(*b*), the trigger frame may include an L-STF 3421, an L-LTF 3422, an L-SIG field 3423, an HE-SIG-A field 3424, and a trigger HE-SIG-B field 3425. An HE-STF and an HE-LTF may be further added to the trigger frame.

In this case, control information about an UL MU data frame subsequent to the trigger frame may be included in a non-common SIG field (e.g., an HE-SIG B field) subsequent to a common SIG field. In this case, this field may also be called NDP indication.

For example, the HE-SIG-A field 3424 includes common control information, such as a bandwidth, and information about the configuration of an HE-SIG-B field. Furthermore, the HE-SIG-B (i.e., the trigger HE-SIG-B) 3425 includes information (e.g., resource allocation information (subcarrier or stream) or MCS information) about the configuration of a subsequent UL MU data frame because an MAC field is not included in its own frame.

Accordingly, the HE-SIG-B field may be called the trigger HE-SIG-B field 3425 because the attributes of the HE-SIG-B field are different from those of the normal frame. In contrast, an HE-SIG-B field included in a normal frame and providing notification of its own frame configuration information (i.e., the configuration of an MAC field included in its own frame) may be called a normal HE-SIG-B field.

The HE-SIG-B field needs to indicate whether such a frame is a normal HE-SIG-B field or a trigger HE-SIG-B field because STAs that receive such a frame is unaware of whether the received frame is a normal frame or a trigger frame. Accordingly, an STA that has received the frame (or the HE-SIG-B field) may identify the frame through the "HE-SIG configuration indication" field.

The "HE-SIG configuration indication" field may be included in a common SIG field (e.g., the L-SIG field or the HE-SIG-A field) as described above, but may be included in the first part (i.e., the most significant bit (MSB)) of a non-common SIG field (e.g., the HE-SIG-B field).

MU Indication (1 Bit)

This field indicates whether a frame including a common SIG field is an SU frame or an MU frame.

In the case of DL, if a frame is configured according to OFDMA or MU MIMO, it may be determined to be a multi-user operation. In the case of UL, if a frame is to be configured according to OFDMA or MU MIMO, the "HE-SIG configuration indication" may be used because a trigger frame (or a scheduling frame) needs to be first transmitted. In other cases, however, a method for directly accessing, by an STA, a channel and transmitting uplink data may be used. For such a case, MU indication of 1 bit may be used. That is, if the MU indication is "1", it indicates an UL SU frame, and thus the value of an HE-SIG field (i.e., a non-common SIG field) subsequent to a common SIG field may be interpreted using a different method. For example, as in the aforementioned VHT-SIG A1 field, a bit indicative of the position of the stream of a user in an MU frame for each specific bit group may indicate the (partial) AID of a user in an SU frame.

Furthermore, the MU indication field may indicate whether a frame included in a common SIG field is a DL frame or an UL frame. In this case, the MU indication field may be called DL/UL indication.

Common control information transmitted in a common SIG field is important information which is used for an STA that receives a corresponding frame and the third STA to determine whether or not to use a medium.

In the case of an existing frame, the third STA may be aware of whether a corresponding frame is an UL frame or a DL frame by reading an RA/TA field in an MAC header. In this case, for example, if the third STA has missed a trigger frame (or a scheduling frame) because UL MU transmission is made possible and an UL frame transmitted by a surrounding STA is an MU frame, the third STA cannot read the RA/TA field of an MAC header because it is unaware of the configuration of the UL MU frame. Accordingly, the common SIG field needs to indicate whether a corresponding frame is a DL frame or an UL frame because the third STA has to check whether the corresponding frame is an UL MU frame.

Furthermore, a trigger frame (or a scheduling frame) is a DL frame transmitted by an AP. Accordingly, if the trigger frame (or the scheduling frame) is indicated by the "HE-SIG configuration indication", the third STA may be aware that the corresponding frame is a DL frame and a next frame is an UL frame. In this case, if a trigger frame (or a scheduling frame) is not indicated by the "HE-SIG configuration indication" or if the third STA has missed a trigger frame (or a scheduling frame), the third STA needs to be aware of whether the corresponding frame is a DL frame or an UL frame.

Length of Non-Common SIG Field (1 or 2 Bits)

This field includes information about the length of a non-common SIG field. This field is required if resource allocation information (subcarrier or stream) for STAs is transmitted in a non-common SIG field to be described later and the length of a non-common SIG field is varied. This may be optionally included.

The length of a non-common SIG field may provide notification of the length of several determined symbols. For example, whether the length is 1 symbol or 2 symbols may be indicated using 1 bit.

Furthermore, although the length of a non-common SIG field is varied, it does not need to be indicated if a receiving STA performs blind decoding.

Color Bits (x Bits)

This color bits field distinguishes surrounding BSSs. For example, if the color bits are 3 bits, it may distinguish surrounding 8 BSSs and provide notification of them. Alternatively, one (e.g., 0b000) of indication values indicated by the color bits may be used for a frame that does not need to distinguish BSSs. For example, an STA needs to perform NAV setting although a BSS is not a BSS to which the STA belongs as a result of reading the color bits. Accordingly, a specific indication value may be always allocated to the RTS, CTS, trigger frame, etc.

Furthermore, in general, an STA may read the color bits and neglect an RTS, CTS, trigger frame, etc. if a BSS is not a BSS to which the STA belongs as a result of the reading. However, an STA may read the RTS, CTS, trigger frame, etc. of another BSS to although the frame is the frame of another BSS to which the STA does not belongs, and may perform NAV setting. That is, an RTS, CTS, trigger frame, etc. use the color bits like another frame, but an STA may consider such a specific frame to be another BSS frame and may perform NAV setting.

Cascade Indication (1 Bit)

This field indicates whether a frame including a common SIG field has a cascade frame structure. That is, the cascade indication field indicates whether a DL/UL MAC field (i.e., a field including an MAC frame, such as an MAC control frame, an MAC management frames or an MAC data frame) is included in a frame including a common SIG field and an MAC frame including an UL/DL MAC field is transmitted after the xIFS of the frame. This is described in more detail below with reference to the following drawing.

FIG. 35 is a diagram illustrating the format of a frame for supporting UL MU transmission according to an embodiment of the present invention.

FIG. 35 shows the sequence of frames in a time axis. In this case, elements in a frequency axis are omitted.

In FIG. 35, elements, such as a legacy preamble (an L-STF, an L-LTF, and an L-SIG field), an HE-STF, and an HE-LTF may be included in each frame, but they are omitted for convenience of description.

FIG. 35 shows an example in which a DL MAC field 3504 is piggy-backed to a trigger frame by an AP and transferred and each of STAs transmits an UL MAC frame 3505 after the xIFS of the trigger frame.

There is a need for a non-common SIG field 3503 (i.e., a trigger HE-SIG B field) for an UL MAC frame because information about the configuration of the UL MAC frame subsequent to the trigger frame needs to be delivered as described above. Furthermore, if the trigger frame triggers UL MU data transmission and the DL MAC field 3504 is piggybacked and delivered in the trigger frame, the trigger frame requires a non-common SIG field 3502 (i.e., a normal HE-SIG-B field) for the DL MAC field.

Accordingly, the trigger frame may include a common SIG field 3501, the non-common SIG field 3502 (i.e., the normal HE-SIG-B field) for the DL MAC field, the non-common SIG field 3503 (i.e., the trigger HE-SIG B field) for the UL MAC frame, and the DL MAC field 3504.

In this case, the positions of the non-common SIG field 3502 for the DL MAC field and the non-common SIG field 3503 for the UL MAC frame may be reversed.

A frame that includes a DL MAC field and that delivers information about the configuration of a subsequent UL frame as described above may be called a "cascade frame" (i.e., a normal frame+a trigger frame). The trigger frame (or scheduling frame) may have a cascade frame type.

In this case, the common SIG field 3501 may indicate that a subsequent field is the non-common SIG field 3502 for the DL MAC field. The non-common SIG field 3502 for the DL MAC field may indicate that a subsequent field is the non-common SIG field 3503 for the UL MAC frame. The non-common SIG field 3503 for the UL MAC frame may indicate that a subsequent field is the DL MAC field 3504.

If a trigger frame is configured to have an MAC structure, control information (e.g., resource allocation information (subcarrier or stream) and/or MCS information) for the UL MAC frame 3505 subsequent to the trigger frame may be included in the DL MAC field 3504. In this case, the "cascade indication" field may indicate whether the control information for the UL MU data frame subsequent to the trigger frame is included in the DL MAC field 3504.

The UL MAC frame 3505 may include or may not include a non-common SIG field. For example, if an AP provides notification of information about the configuration of the UL MAC frame 3505 in the trigger frame and thus each of STAs transmits the UL MAC frame 3505, a non-common SIG field may be omitted from the UL MAC frame 3505.

An L-SIG field is configured like an existing L-SIG field, and an HE-SIG A field, an HE-SIG B field or an HE-SIG B1 field (if the HE-SIG B field is divided into the HE-SIG B1 field and an HE-SIG B2 field) may be used as the common SIG field.

In this case, the aforementioned common control information may be included in the HE-SIG A field (or the HE-SIG B field or the HE-SIG B1 field). In addition to the aforementioned information, the following common control information may be additionally included in the HE-SIG A field.

For example, if the same MCS as that of a VHT-SIG field is applied to the common SIG field, 24 bits per symbol may be included. Accordingly, the common SIG field may include 1 symbol (i.e., 24-bit information) or 2 symbols (i.e., 48-bit information) depending on information included in the HE-SIG A field.

CRC Check (8 Bits)

This field includes CRC for detecting an error of a PPDU in a receiving STA.

Tail Bits (6 Bits)

This field is used to terminate the trellis of a convolutional decoder. For example, all of 6 bits may be set to 0.

Length of MAC Field (3 Bits) and MCS (4 Bits)

This field includes information about the length of an MAC field and an MCS.

If resource allocation information (a subcarrier or a stream) for STAs is transmitted in an MAC structure, such as a DL MAC field to be described later (i.e., a field including an MAC frame, such as an MAC control frame, an MAC management frame or an MAC data frame), this field provides notification of information about the length of an MAC field and an MCS and may be optionally included. In this case, this field may provide notification of the number of STAs instead of length information because the length of the MAC field may be determined by the number of STAs.

Each of the aforementioned fields is an embodiment of the present invention and is merely an example. Some of the illustrated fields may be excluded or substituted with other fields. Furthermore, another field may be included.

Furthermore, the number of bits per information field has been illustrated for convenience of description, but the number of bits for each of the fields is merely an example and a different number of bits for each of the fields may be used. Furthermore, a plurality of fields, that is, some of the illustrated fields, may be merged to form one field.

A frame type may be determined depending on the value of the aforementioned HE-SIG configuration field (or the trigger indication field), the MU indication field (or the DL/UL indication field) and/or the cascade indication field. This is summarized as follows.

Table 13 illustrates a mapping relation between the values of the HE-SIG configuration field (or the trigger indication field), the DL/UL indication field, and the cascade indication field and frame types.

In Table 13, information indicated by the value of each of the fields is merely an example and may be defined to be different from that described above.

Referring to Table 13, if the HE SIG configuration field (or the trigger indication field) is "0", the HE-SIG field subsequent to the common SIG field indicates a "normal frame" because it includes information (for own frame) about the configuration of a frame itself including the common SIG field.

Furthermore, whether a corresponding frame is a DL normal frame or an UL normal frame is determined based on a value of the DL/UL indication field. The non-common SIG field of both the DL normal frame and the UL normal frame may correspond to a normal HE-SIG-B field. Furthermore, information about the MCS level, length, etc. of the non-common SIG field may be included in the common SIG field.

In this case, the cascade indication field may be neglected or may be used to indicate another piece of predetermined information.

If the HE SIG configuration field (or the trigger indication field) is "1", it indicates a "trigger frame" because an HE-SIG field subsequent to a common SIG field includes information (for the next UL frame) about the configuration of a frame subsequent to a frame including the common SIG field.

Furthermore, whether a corresponding frame is a normal trigger frame not including a DL MAC field or a trigger frame of a cascade format including a DL MAC field is determined based on a value of the cascade indication field. If a corresponding frame is a trigger frame of a cascade format, as described above, a non-common SIG field includes both a normal HE-SIG-B field and a trigger HE-SIG-B field, which may be configured in a predetermined sequence. For example, if the normal HE-SIG-B field is ahead of the trigger HE-SIG-B in time, information such as the MCS level, length, etc. of the normal HE-SIG-B field may be included in a common SIG field, and information such as the MCS level, length, etc. of the trigger HE-SIG-B field may be included in the common SIG field or the normal HE-SIG-B field. In contrast, for example, if the trigger HE-SIG-B field is ahead of the normal HE-SIG-B field in time, information such as the MCS level, length, etc. of the trigger HE-SIG-B may be included in the common SIG field, and information such as the MCS level, length, etc. of the normal HE-SIG-B field may be included in the common SIG field or the trigger HE-SIG-B field.

In this case, the DL/UL indication field may be neglected or may be used to indicate another piece of predetermined information.

Table 14 illustrates a mapping relation between the values of the HE-SIG configuration field (or the trigger indication field), the MU indication field, and the cascade indication field and frame types.

In Table 14, information indicated by the value of each of the fields is merely an example and may be defined to be different from that described above.

TABLE 13

| HE-SIG CONFIGURATION 0: own frame 1: next frame | DL/UL INDICATION 0: downlink 1: uplink | CASCADE INDICATION 0: non-cascade 1: cascade | FRAME TYPE |
|---|---|---|---|
| 0 | 0 | — | DL normal frame |
| 0 | 1 | — | UL normal frame |
| 1 | — | 0 | Trigger frame |
| 1 | — | 1 | Trigger frame (cascade frame) |

TABLE 14

| HE-SIG CONFIGURATION 0: own frame 1: next frame | SU/MU INDICATION 0: SU 1: MU | CASCADE INDICATION 0: non-cascade 1: cascade) | FRAME TYPE |
|---|---|---|---|
| 0 | 0 | — | SU normal frame |
| 0 | 1 | — | MU normal frame |
| 1 | — | 0 | Trigger frame |

TABLE 14-continued

| HE-SIG CONFIGURATION 0: own frame 1: next frame | SU/MU INDICATION 0: SU 1: MU | CASCADE INDICATION 0: non-cascade 1: cascade) | FRAME TYPE |
|---|---|---|---|
| 1 | 0 | 0 | Trigger frame (cascade frame) |
| 1 | 1 | 1 | Trigger frame (cascade frame) |

Referring to Table 14, if the HE SIG configuration field (or the trigger indication field) is "0", an HE-SIG field subsequent to a common SIG field indicates a "normal frame" because it includes information (for own frame) about the configuration of a frame itself including the common SIG field.

Furthermore, whether a corresponding frame is an SU normal frame or an MU normal frame is determined based on a value of the SU/MU indication field. The non-common SIG field of the SU normal frame may be omitted or the SU normal frame may be designed so that an STA is not decoded. The non-common SIG field of the MU normal frame may correspond to a normal HE-SIG-B field. Furthermore, information about, the MCS level, length, etc. of the non-common SIG field may be included in the common SIG field.

In this case, the cascade indication field may be neglected or may be used to indicate another piece of predetermined information.

If the HE SIG configuration field (or the trigger indication field) is "1", it indicates a "trigger frame" because an HE-SIG field subsequent to a common SIG field includes information (for the next UL frame) about the configuration of a frame subsequent to a frame including the common SIG field.

Furthermore, whether a corresponding frame is a normal trigger frame not including a DL MAC field or a trigger frame of a cascade format including a DL MAC field is determined based on a value of the cascade indication field.

If a corresponding frame is a trigger frame of a cascade format, whether it is an SU trigger frame or an MU trigger frame is determined based on a value of the SU/MU indication field. That is, the SU trigger frame includes only data for a single user in the DL MAC field, and the MU trigger frame includes data for a multi-user in the DL MAC field.

A normal HE-SIG-B field of a cascade type SU trigger frame may be omitted or the SU trigger frame may be designed so that an STA is not decoded. Furthermore, information about the MCS level, length, etc. of the trigger HE-SIG-B field may be included in the common SIG field.

In the case of a cascade type MU trigger frame, as described above, the non-common SIG field of the MU trigger frame includes both the normal HE-SIG-B field and the trigger HE-SIG-B field, which may be configured in a predetermined sequence. For example, if the normal HE-SIG-B field is ahead of the trigger HE-SIG-B field in time, information such as the MCS level, length, etc. of the normal HE-SIG-B field may be included in the common SIG field, and information such as the MCS level, length, etc. of the trigger HE-SIG-B may be included in the common SIG field or the normal HE-SIG-B field. In contrast, for example, if the trigger HE-SIG-B field is ahead of the normal HE-SIG-B field in time, information such as the MCS level, length, etc. of the trigger HE-SIG-B field, may be included in the common SIG field, and information such as the MCS level, length, etc. of the normal HE-SIG-B field may be included in the common SIG field or the trigger HE-SIG-B field.

In contrast, in the case of a normal trigger frame not including a DL MAC field, the normal trigger frame includes only a physical preamble. Accordingly, the SU/MU indication field may be neglected or may be used to indicate another piece of predetermined information. In this case, a non-common SIG field may correspond to a trigger HE-SIG-B field. Furthermore, information, such as the MCS level, length, etc. of the non-common SIG field, may be included in a common SIG field.

Table 15 illustrates a mapping relation between the values of a trigger indication field and a cascade indication field (or a DL/UL indication field) and frame types.

Table 15 illustrates a mapping relation between the values of an HE-SIG configuration field (or a trigger indication field), an MU indication field, and a cascade indication field and frame types.

In Table 15, information indicated by the value of each of the fields is merely an example and may be defined to be different from that described above.

TABLE 15

| TRIGGER + CASCADE INDICATION | FRAME TYPE |
|---|---|
| 00 | trigger frame |
| 01 | normal SU frame |
| 10 | cascade frame |
| 11 | normal MU frame |

Referring to Table 15, if the value of the trigger indication field and the cascade indication field is "00", a frame type may indicate a normal trigger frame not including a DL MAC field. In this case, a non-common SIG field may correspond to a trigger HE-SIG-B field. Furthermore, information, such as the MCS level, length, etc. of the non-common SIG field, may be included in a common SIG field.

If a value of the trigger indication field and the cascade indication field is "01", a frame type may indicate a normal SU frame. If a value of the trigger indication field and the cascade indication field is "11", a frame type may indicate a normal MU frame. In this case, a non-common SIG field may correspond to an normal HE-SIG-B field. Furthermore, information, such as the MCS level, length, etc. of the non-common SIG field, may be included in a common SIG field.

If a value of the trigger indication field and the cascade indication field is "10", a frame type may indicate a cascade type trigger frame including a DL MAC field. In this case, a non-common SIG field includes both a normal HE-SIG-B field and a trigger HE-SIG-B field, which may be configured in a predetermined sequence. For example, if the normal HE-SIG-B field is ahead of the trigger HE-SIG-B in time, information such as the MCS level, length, etc. of the normal HE-SIG-B field may be included in a common SIG field, and information, such as the MCS level, length, etc. of the trigger HE-SIG-B field may be included in the common SIG field or the normal HE-SIG-B field. In contrast, for example, if the trigger HE-SIG-B is ahead of the normal HE-SIG-B field in time, information such as the MCS level, length, etc. of the trigger HE-SIG-B field may be included in a common SIG field and information such as the MCS level, length, etc. of the normal HE-SIG-B field may be included in a common SIG field or a trigger HE-SIG-B field.

In Table 15, a frame type may be indicated by a combination of the trigger indication (or HE-SIG configuration indication) field of 1 bit and the cascade indication (or DL/UL indication) field of 1 bit. Furthermore, a frame type may be indicated by a single field of 2 bits formed by combining the two fields.

As described above, a trigger frame includes its own configuration information (i.e., a normal HE-SIG-B field) and also has to include information (i.e., a trigger HE-SIG-B field) about the configuration of a subsequent UL MU frame. Accordingly, two types of trigger frame configurations may be present depending on the sequence of the two pieces of information. This is described below with reference to the following drawing.

FIG. 36 is a diagram illustrating the format of frames for supporting UL MU transmission according to an embodiment of the present invention.

FIG. 36 shows the sequence of the frames in a time axis. In this case, elements in a frequency axis are omitted.

As in FIG. 36(a), a trigger frame may include an L-STF 3611, an L-LTF 3612, an L-SIG field 3613, an HE-SIG-A field 3614, a trigger HE-SIG-B field 3615, an HE-SIG-B field 3616, and an MAC frame 3617. That is, the HE-SIG-B 3616 may be configured after the trigger HE-SIG-B field 3615.

Furthermore, as in FIG. 36(b), a trigger frame may include an L-STF 3621, an L-LTF 3622, an L-SIG field 3623, an HE-SIG-A field 3624, an HE-SIG-B field 3625, a trigger HE-SIG-B field 3626, and an MAC frame 3627. That is, the trigger HE-SIG-B 3626 may be configured after the HE-SIG-B field 3625.

The reason why the trigger frame is configured to include the two types is for disposing fields to be transmitted more robustly ahead depending on which one of a normal HE-SIG B field and a trigger HE-SIG B needs to be transmitted more robustly.

Since a trigger frame can have the two types as described above, indication for the configuration of the trigger frame is required and indication is also required because the two non-common SIG fields (i.e., the normal HE-SIG-B field and the trigger HE-SIG-B field) may have different MCS levels, lengths, etc.

Table 16 illustrates a mapping relation between the values of a trigger indication field and a cascade indication field (or a DL/UL indication field) and frame types.

In Table 16, information indicated by the value of each of the fields is merely an example and may be defined to be different from that described above.

TABLE 16

| Trigger + cascade indication | 00 | 01 | 10 | 11 |
|---|---|---|---|---|
| Frame type | Normal frame | Trigger frame | Cascade frame (configuration of FIG. 36(b)) | Cascade frame (configuration of FIG. 36(a)) |
| HE-SIG-B configuration and contents | Normal HE-SIG-B field | Trigger HE-SIG-B field | Normal HE-SIG-B field & trigger HE-SIG-B field * The MCS, length, etc. of the normal HE-SIG-B are included in the HE-SIG-A field. * The MCS, length, etc. of the trigger HE-SIG-B field are included in the HE-SIG-A field. * The MCS, length, etc. of the normal HE-SIG-B field are included in the HE-SIG-A field or the normal HE-SIG-B field | Trigger HE-SIG-B field & normal HE-SIG-B field * The MCS, length, etc. of the trigger HE-SIG-B field are included in the HE-SIG-A field. * The MCS, length, etc. of the normal HE-SIG-B field are included in the HE-SIG-A field or the the trigger HE-SIG-B field |

Referring to Table 16, if the value of the trigger indication field and the cascade indication field is "00", a frame type indicates a normal frame. In this case, a non-common SIG field corresponds to a normal HE-SIG-B field. Furthermore, information, such as the MCS level, length, etc. of the non-common SIG field, is included in a common SIG field.

If a value of the trigger indication field and the cascade indication field is "01", a frame type indicates a normal trigger frame not including a DL MAC field. In this case, a non-common SIG field corresponds to a trigger HE-SIG-B field. Furthermore, information, such as the MCS level, length, etc. of the non-common SIG field, is included in a common SIG field.

If a value of the trigger indication field and the cascade indication field is "10", a frame type indicates a cascade type trigger frame including a DL MAC field. In this case, a non-common SIG field includes both a normal HE-SIG-B field and a trigger HE-SIG-B field, and the normal HE-SIG-B field is configured ahead of the trigger HE-SIG-B field in time as in FIG. 36(b). Information such as the MCS level, length, etc. of the normal HE-SIG-B field, is included in a common SIG field (e.g., an HE-SIG-A field), and information such as the MCS level, length, etc. of the trigger HE-SIG-B field is included in a common SIG field (e.g., HE-SIG-A) or a normal HE-SIG-B field.

If a value of the trigger indication field and the cascade indication field is "11", a frame type indicates a cascade type trigger frame including a DL MAC field. In this case, a non-common SIG field includes both a normal HE-SIG-B field and a trigger HE-SIG-B field, and the trigger HE-SIG-B field is configured ahead of the normal HE-SIG-B field in time as in FIG. 36(a). Information such as the MCS level, length, etc. of the trigger HE-SIG-B field is included in a common SIG field (e.g., an HE-SIG-A field), and information such as the MCS level, length, etc. of the normal HE-SIG-B field is included in a common SIG field (e.g., the HE-SIG-A field) or the trigger HE-SIG-B.

In Table 16, a frame type may be indicated by a combination of the trigger indication (or HE-SIG configuration indication) field of 1 bit and the cascade indication (or DL/UL indication) field of 1 bit. Furthermore, a frame type may be indicated by a single field of 2 bits in which the two fields have been combined.

Furthermore, a frame type may be determined using all of the aforementioned trigger indication field (or HE-SIG configuration field), the MU indication field (or DL/UL indication field), and the cascade indication field. This is summarized as follows.

Table 17 illustrates a mapping relation between the values of a trigger indication field, a DL/UL indication field, and a cascade indication field and frame types.

In Table 17, information indicated by the value of each of the fields is merely an example and may be defined to be different from that described above.

TABLE 17

| HE-SIG CONFIGU-RATION 0: own frame 1: next frame | DL/UL INDICATION 0: downlink 1: uplink | CASCADE INDICATION 0: non-cascade 1: cascade | FRAME TYPE |
|---|---|---|---|
| 0 | 0 | 0 | DL normal frame |
| 0 | 0 | 1 | Cascade frame (configuration of FIG. 36(b)) |
| 0 | 1 | 0 | UL normal frame |
| 0 | 1 | 1 | Reserved |
| 1 | 0 | 0 | Trigger frame |
| 1 | 0 | 1 | Cascade frame (configuration of FIG. 36(a)) |
| 1 | 1 | 0 | Reserved |
| 1 | 1 | 1 | Reserved |

Referring to Table 17, if the value of the trigger indication field, the DL/UL indication field, and the cascade indication field is "000", a frame type indicates a DL normal frame. Furthermore, if the value of the trigger indication field, the DL/UL indication field, and the cascade indication field value is "010", a frame type indicates an UL normal frame. The non-common SIG field of a DL/UL normal frame corresponds to a normal HE-SIG-B field. Furthermore, information, such as the MCS level, length, etc. of a non-common SIG field, is included in a common SIG field.

If a value of the trigger indication field, the DL/UL indication field, and the cascade indication field is "100", a frame type indicates a normal trigger frame not including a DL MAC field. In this case, a non-common SIG field corresponds to a trigger HE-SIG-B field. Furthermore, information, such as the MCS level, length, etc. of a non-common SIG field, is included in a common SIG field.

If a value of the trigger indication field, the DL/UL indication field, and the cascade indication field is "001", a frame type indicates a cascade type trigger frame including a DL MAC field. In this case, a non-common SIG field includes both a normal HE-SIG-B field and a trigger HE-SIG-B field, and the normal HE-SIG-B field is configured ahead of the trigger HE-SIG-B field in time as in FIG. 36(b). Information such as the MCS level, length, etc. of the normal HE-SIG-B field is included in a common SIG field, and information such as the MCS level, length, etc. of the trigger HE-SIG-B field is included in the common SIG field or the normal HE-SIG-B field.

If a value of the trigger indication field, the DL/UL indication field, and the cascade indication field is "101", a frame type indicates a cascade type trigger frame including a DL MAC field. In this case, a non-common SIG field includes both a normal HE-SIG-B field and a trigger HE-SIG-B field, and the trigger HE-SIG-B field is configured ahead of the normal HE-SIG-B field in time as in FIG. 36(a).

Information, such as the MCS level, length, etc. of the trigger HE-SIG-B field is included in the common SIG field, and information such as the MCS level, length, etc. of the normal HE-SIG-B field is included in a common SIG field or the trigger HE-SIG-B field.

Table 18 illustrates a mapping relation between the values of a trigger indication field, an MU indication field, and a cascade indication field and frame types.

In Table 18, information indicated by the value of each of the fields is merely an example and may be defined to be different from that described above.

TABLE 18

| HE-SIG CONFIGU-RATION 0: own frame 1: next frame | SU/MU INDICATION 0: SU 1: MU | CASCADE INDICATION 0: non-cascade 1: cascade) | FRAME TYPE |
|---|---|---|---|
| 0 | 0 | 0 | SU normal frame |
| 0 | 0 | 1 | SU trigger frame (Cascade frame, configuration of FIG. 36(b)) |
| 0 | 1 | 0 | MU normal frame |
| 0 | 1 | 1 | MU trigger frame (Cascade frame, configuration of FIG. 36(b)) |
| 1 | 0 | 0 | Trigger frame |
| 1 | 0 | 1 | SU trigger frame (Cascade frame, configuration of FIG. 36(a)) |
| 1 | 1 | 0 | Reserved |
| 1 | 1 | 1 | MU trigger frame (Cascade frame, configuration of FIG. 36(a)) |

Referring to Table 18, if a value of the trigger indication field, the SU/MU indication field, and the cascade indication field is "000", a frame type indicates an SU normal frame. Furthermore, if a value of the trigger indication field, the SU/MU indication field, and the cascade indication field is "010", a frame type indicates an MU normal frame. The non-common SIG field of an SU/MU normal frame corresponds to a normal HE-SIG-B. Furthermore, information, such as the MCS level, length, etc. of the non-common SIG field, is included in a common SIG field.

If a value of the trigger indication field, the SU/MU indication field, and the cascade indication field is "100", a frame type indicates a normal trigger frame not including a DL MAC field. In this case, a non-common SIG field corresponds to a trigger HE-SIG-B field. Furthermore, information, such as the MCS level, length, etc. of a non-common SIG field, is included in a common SIG field.

If a value of the trigger indication field, the SU/MU indication field, and the cascade indication field is "001" and "101", a frame type indicates a cascade type SU trigger frame including data for a single user in a DL MAC field. A normal HE-SIG-B field may be omitted from the cascade type SU trigger frame or the cascade type SU trigger frame may be designed so that an STA is not decoded. Furthermore, information, such as the MCS level, length, etc. of a trigger HE-SIG-B field, may be included in a common SIG field.

If a value of the trigger indication field, the SU/MU indication field, and the cascade indication field is "011" and "111", a frame type indicates a cascade type MU trigger frame including data for a multi-user in a DL MAC field.

If a value of the trigger indication field, the SU/MU indication field, and the cascade indication field is "011", a non-common SIG field includes a normal HE-SIG-B field and a trigger HE-SIG-B field, and the normal HE-SIG-B field is configured ahead of the trigger HE-SIG-B field in time as in FIG. 36(b). Information such as the MCS level, length, etc. of the normal HE-SIG-B field is included in a common SIG field, and information, such as the MCS level, length, etc. of the trigger HE-SIG-B field is included in a common SIG field or a normal HE-SIG-B field.

In contrast, if a value of the trigger indication field, the SU/MU indication field, and the cascade indication field is "111", a non-common SIG field includes both a normal HE-SIG-B field and a trigger HE-SIG-B field, and the trigger HE-SIG-B field is configured ahead of the normal HE-SIG-B field in time as in FIG. 36(a). Information such as the MCS level, length, etc. of the trigger HE-SIG-B field is included in a common SIG field, and information such as the MCS level, length, etc. of the normal HE-SIG-B field is included in the common SIG field or the trigger HE-SIG-B field.

In Table 17 and Table 18, a frame type may be indicated by a combination of a trigger indication (or HE-SIG configuration indication) field of 1 bit, a DL/UL indication (or SU/MU indication) field, and a cascade indication field of 1 bit. Furthermore, a frame type may be indicated by a single field of 3 bits in which the three fields have been combined.

2. Non-Common Control Information

Option 1) non-common control information may be delivered in a non-common SIG field.

FIG. 37 is a diagram illustrating the structure of frames for supporting UL MU transmission according to an embodiment of the present invention.

FIG. 37 shows the sequence of the frames in a time axis. In this case, elements in a frequency axis are omitted.

In FIG. 37, elements, such as a legacy preamble (e.g., an L-STF, an L-LTF, and an L-SIG field), an HE-STF, and an HE-LTF, in each frame may be included, but have been omitted for convenience of description.

Referring to FIG. 37, a trigger frame includes a common SIG field 3701, including the aforementioned common control information, and a non-common SIG field 3702 (i.e., a trigger HE-SIG-B field) for an UL MAC frame. That is, if the trigger frame does not have a cascade type frame structure, it has a null data packet (NDP) structure not including a DL MAC field.

After the trigger frame is transmitted by an AP, each of STAs transmits an UL MAC frame 3703 after an xIFS. A non-common SIG field may be included or may not be included in the UL MAC frame 3703.

An example of information included in the non-common SIG field 3702 is as follows.

CRC Check (8 Bits)

This field includes CRC for detecting an error of a PPDU in a receiving STA.

Tail Bits (6 Bits)

This field is used to terminate the trellis of a convolutional decoder. For example, all of the 6 bits may be set to 0.

STA Identification Information

This field includes a partial AID (PAID), an AID or an ID capable of distinguishing STAs within a BSS, such as an STA address.

Number of STAs

This field may provide notification of the number of STAs in the case of OFDMA or MU MIMO.

However, if the number of STAs is fixed, it does not need to be separately notified. In this case, this field may be omitted. For example, the number of STAs may be fixed to 9 regardless of a 20 MHz, 40 MHz or 80 MHz bandwidth.

Alternatively, if the number of STAs is fixed for each bandwidth, the number of STAs may be determined depending on a bandwidth. For example, 4 STAs may be determined for a 20 MHz bandwidth, 8 STAs may be determined for a 40 MHz bandwidth, and 16 STAs may be determined for an 80 MHz or higher bandwidth.

Furthermore, the number of STAs is not fixed, but a maximum number of STAs may be fixed. As in the above example, if a maximum number of STAs may be determined to be 4 in the case of a 20 MHz bandwidth, may be determined to be 8 in the case of a 40 MHz bandwidth, and may be determined to be 16 in the case of an 80 MHz or higher bandwidth. Accordingly, the flexibility of an SIG length can be further limited compared to a method for fixing a maximum number of STAs regardless of a bandwidth. That is, if the number of STAs is fixed regardless of a bandwidth, the number of signaled bits is the same regardless of the bandwidth. Accordingly, more SIG symbols need to be relatively used in the case of 20 MHz and relatively smaller symbols may be used in the case of 160 MHz.

The Number of STAs * Information about the Configuration of an UL MAC Frame

This field indicates information about the configuration of an UL MAC frame specified for each STA. For example, this field may include band resource information (e.g., a resource unit or a subcarrier index) in the case of OFDMA and may include information about the number of streams and an index, and AC information, an MCS, and STBC indication if several access categories (AC) are present within one STA in the case of MU MIMO.

Option 2) non-common control information may be transmitted in a DL MAC field.

FIG. 38 is a diagram illustrating the structure of frames for supporting UL MU transmission according to an embodiment of the present invention.

FIG. 38 shows the sequence of the frames in a time axis. In this case, elements in a frequency axis are omitted.

In FIG. 38, elements, such as a legacy preamble (e.g., an L-STF, an L-LTF, and an L-SIG field), an HE-STF, and an HE-LTF in each frame, may be included, but have been omitted for convenience of description.

Referring to FIG. 38, a trigger frame includes a common SIG field 3801 including the aforementioned common control information, a non-common SIG field 3802 (i.e., a normal HE-SIG-B field) for a DL MAC field, and a DL MAC field 3803 for an UL MAC frame.

The common SIG field 3801 or the non-common SIG field 3802 for a DL MAC field includes information about the configuration of its own frame. Furthermore, the DL MAC field 3803 for an UL MAC frame includes information about the configuration of a subsequent UL MU frame 3804. In this case, the information about the configuration of the UL MU frame 3804 includes the aforementioned non-common control information (refer to Option 1).

If the trigger frame is configured as a cascade frame, a DL MAC field may include the MAC frame (i.e., the MAC control frame, management frame or data frame) of a DL frame itself in addition to information about the configuration of the UL MU frame 3804.

After the trigger frame is transmitted by an AP, each of STAs transmits the UL MAC frame 3804 after an xIFS. A non-common SIG field may be included or may not be included in the UL MAC frame 3804.

In the aforementioned embodiments of the present invention, the spacing "xIFS" between the DL frame and the UL frame is spacing for preventing the time during which other STAs cut in and transmit data after a DL frame is transmitted. For example, an SIFS may correspond to the spacing xIFS. Alternatively, in order to secure a processing time, extension frame spacing (EIFS) to which a dummy symbol or signal extension has been added may correspond to the spacing xIFS.

As described above, if information about the configuration of the UL MAC frame 3804 is included in the DL MAC field 3803, the DL MAC field 3803 may be configured as follows.

If the trigger frame is transmitted as an MU frame, an A-MPDU is transmitted through resources allocated to each STA in downlink.

If an STA that performs DL reception and an STA that performs UL transmission through a trigger frame are the same, information about the configuration of an UL MAC frame for the corresponding STA may be included in the foremost A-MPDU subframe of an A-MPDU for each STA.

In contrast, if an STA that performs DL reception and an STA that performs UL transmission through a trigger frame are different, information about the configuration of an UL MAC frame for each STA may be included in the foremost A-MPDU subframe of a specific one of A-MPDUs for each STA. In this case, the UL transmitting STA needs to be notified of an A-MPDU including the information about the configuration of the UL MAC frame for each STA. To this end, the common SIG field 3801 or the non-common SIG field 3802 for a DL MAC field may be used.

Group ID and UL/DU MU Resource Allocation Method

In the existing WLAN system, a Group ID includes the grouping of only four users (i.e., four STAs). The group ID is an ID to identify a group of STAs participating MU transmission and is limited to a maximum of 64 STAs.

In the 802.11ax system, the support of DL MU transmission for more users is taken into consideration. Accordingly, for example, it is necessary to group at least 9 STAs into one group in order to support DL MU transmission of an OFDMA method in a 26-tone unit for each STA in a 20 MHz band.

Furthermore, in the 802.11ax system, an environment in which STAs much greater than those in an existing WLAN system are crowded is taken into consideration. Accordingly, group IDs much larger than the current 64 group IDs are required.

Accordingly, an embodiment of the present invention proposes the format of a group ID management frame and/or an allocation frame for allocating frequency and/or spatial resources to a plurality of STAs in an UL/DL MU transmission procedure.

In the following description of the present invention, a "full bandwidth" means a bandwidth in which an UL/DL MU PPDU (OFDMA and/or MU MIMO applied) is transmitted or a bandwidth supported in a BSS.

In the following description of the present invention, a "frame" may mean a DL/UL MAC frame (i.e., an MAC control frame, an MAC management frames or a data frame) itself. Furthermore, the frame may mean a DL/UL (SU/MU) PPDU including a DL/UL MAC frame.

FIG. 39 is a diagram illustrating a MU transmission method according to an embodiment of the present invention.

Referring to FIG. 39, an AP sends a group ID management frame to an STA (S3901).

The group ID management frame includes "group ID indication information" for indicating one or more groups to which the STA belongs. Furthermore, the group ID management frame includes a "user index" indicating that what place is a group to which the STA belongs from one or more groups.

The AP transmits an allocation frame to the STA (S3902).

In this case, the allocation frame means a frame for allocating an UL/DL resource (a frequency and/or a spatial stream) for UL/DL MU transmission.

In the case of UL MU transmission, for example, the aforementioned trigger frame may correspond to the allocation frame. In the case of DL MU transmission, for example, a DL MU data frame may correspond to the allocation frame.

Furthermore, if a trigger frame is configured as a cascade frame including both trigger information and DL data, it may correspond to the allocation frame. In this case, the allocation frame includes both UL resource allocation information and DL resource allocation information.

The allocation frame includes a group ID indicating whether the allocation frame is a frame related to which STA group. For example, when the AP transmits a DL MU data frame to a plurality of STAs belonging to one group or the AP transmits a trigger frame so that a plurality of STAs belonging to one group performs UL MU data transmission, the DL MU data frame and the trigger frame include a corresponding group ID.

Furthermore, the allocation frame includes resource allocation information for each of STAs belonging to a corresponding group in an SIG field (e.g., an HE-SIG A field or an HE-SIG B field). In this case, the resource allocation information for each STA is included in the sequence of user positions (or user indices) indicated in a group ID management frame. That is, pieces of resource allocation information for each STA are sequentially included in the sequence of resource allocation information for an STA whose user position is indicated by 0 and resource allocation information for an STA whose user position is indicated by 1.

The format of a group ID management frame and an allocation frame according to an embodiment of the present invention is described below.

Hereinafter, each of frames illustrated in the following drawings illustrates an MAC frame format (i.e., an MPDU). A service field and a tail field may be added to each of the illustrated frames to form a data field. Furthermore, a legacy preamble (e.g., an L-STF, an L-LTF, and an L-SIG field) and an HE preamble (e.g., an HE-STF, an HE-LTF, and an HE-SIG field) may be attached to a data field configured as described above to form a PPDU. In this case, the PPDU may be the aforementioned HE format PPDU.

FIG. 40 is a diagram illustrating a group ID management frame according to an embodiment of the present invention.

The name of each of the (sub) fields illustrated in FIG. 40 is the same as those of the group ID management frame (FIG. 16) of an 802.11ac system and is only an example, and the (sub) fields do not mean the same (sub) fields as the group ID management frame (FIG. 16) of an 802.11ac system. Accordingly, different names may be used.

Referring to FIG. 40, the group ID management frame according to an embodiment of the present invention may include an MAC header, a frame body, and a frame check sequence (FCS).

The frame body may include a Membership Status Array field 4010 and a User Position Array field 4020.

The Membership Status Array field 4010 may be configured in the form of a bitmap indicating whether an STA is a group member using 1 bit for each group. That is, the Membership Status Array field 4010 may include a Membership Status subfield of 1 bit for each group.

If a bit indicative of a specific group is set to "0", it may indicate that an STA that has received a group ID management frame is not a member of the corresponding group. If a bit indicative of a specific group is set to "1", it may indicate that an STA that has received a group ID management frame is a member of a corresponding group. Furthermore, information mapped to a bit value may be set on the contrary to the above. Accordingly, one STA may belong to one or more groups.

The User Position Array field 4020 may indicate one or more user positions (or user indices) in each group to which a corresponding STA belongs for an STA that has received a corresponding group ID management frame.

The User Position Array field 4020 may be configured in the form of a bitmap indicative of the position of an STA in n bits for each group. That is, the User Position Array field 4020 may a User Position subfield of n bits for each group.

FIG. 40 illustrates only the Membership Status Array field and the User Position Array field, that is, fields forming the frame body for one subband, but another field may be further added.

FIG. 41 is a diagram illustrating a resource allocation method in an MU transmission method according to an embodiment of the present invention.

In FIG. 41, it is assumed that a group ID (GID) supports 64 and 8 user positions (user indices) are supported.

FIG. 41(*a*) illustrates a group ID management frame (more specifically, a Membership Status Array field).

An STA 1 belongs to GIDs 0 and 61, a user index is 3 in the GID 0, and a user index is 0 in the GID 61. An STA 2 belongs to the GIDs 0 and 61, a user index is 1 in the GID 0 and a user index is 1 in the GID 61. An STA 3 belongs to the GIDs 0 and 61, a user index is 0 in the GID 0 and a user index is 7 in the group ID 61. An STA 4 belongs to only the GID 0 and a user index is 2 in the GID 0.

FIGS. 41(*b*) and 41(*c*) illustrate the configuration of the user indices of the respective group IDs 0 and 61 if a group ID and a user index are allocated in the corresponding group ID for each STA based on the group ID management frame as in FIG. 41(*a*).

FIG. 41(*b*) illustrates an example in which the 4 STAs belongs to the group ID 0, the user index 0 is allocated to the STA 3, the user index 1 is allocated to the STA 2, the user index 2 is allocated to the STA 4, and the user index 3 is allocated to the STA 1 in the sequence of the user indices.

Likewise, FIG. 41(*c*) illustrates an example in which 3 STAs belong to the group ID 61, and the user index 0 is allocated to the STA 1, the user index 1 is allocated to the STA 2, and the user index 7 is allocated to the STA 3 in the sequence of the user indices.

As described above, if a group ID and a user index is allocated in the corresponding group ID for each STA based on a group ID management frame, resources allocated to each of the STAs is indicated by an allocation frame as follows.

An allocation frame may include resource allocation information for each STA in the sequence of user indices.

If the GID "0" is indicated in the allocation frame, a first bit group within the corresponding allocation frame indicates resources allocated to the STA 3 to which the user index 0 has been allocated based on the group ID management frame. A second bit group within the corresponding allocation frame indicates resources allocated to the STA 2 to which the user index 1 has been allocated based on the group ID management frame. A third bit group within the corresponding allocation frame indicates resources allocated to the STA 4 to which the user index 2 has been allocated based on the group ID management frame. A fourth bit group within the corresponding allocation frame indicates resources allocated to the STA 1 to which the user index 1 has been allocated based on the group ID management frame.

Likewise, if the GID 61 is indicated in the allocation frame, a first bit group within the corresponding allocation frame indicates resources allocated to the STA 1 to which the user index 0 has been allocated based on the group ID management frame. A second bit group within the corresponding allocation frame indicates resources allocated to the STA 2 to which the user index 1 has been allocated based on the group ID management frame. Furthermore, a third bit group within the corresponding allocation frame indicates resources allocated to the STA 3 to which the user index 7 has been allocated based on the group ID management frame.

A bit group(s) indicative of resource allocation (or indication) information for each station in the allocation frame is hereinafter called a "resource indication field, for convenience of description.

A) Group ID Management Frame

A method for configuring each of the fields of the group ID management frame illustrated in FIG. 40 is described in more detail below.

Option A-1) if the number of STAs of a system and the number of STAs attempting to use an MU are increased, the group ID management frame is transmitted to each STA. Accordingly, more group ID management frames need to be transmitted, and more group IDs are required according to an increase in the number of STAs.

Accordingly, since 64 group IDs may be insufficient, it is necessary to change the format of the group ID management frame in order to allocate more group IDs.

In order to support more than 64 groups, the Membership Status Array field 4010 of the group ID management frame may include a length of more than 8 octets in the group ID management frame of the 802.11ac system. For example, the Membership Status Array field 4010 may have a length of 9 octets, 10 octets or 11 octets.

For example, if the Membership Status Array field 4010 has a length of 9 octets, it is configured in the form of a bitmap of 72 bits and may indicate a maximum of 72 groups. Likewise, if the Membership Status Array field 4010 has a length of 10 octets, it is configured in the form of a bitmap of 80 bits and may indicate a maximum of 80 groups. If the Membership Status Array field 4010 has a length of 11 octets, it is configured in the form of a bitmap of 88 bits and may indicate a maximum of 88 groups.

If the Membership Status Array field 4010 is configured to have a length of more than 8 octets as described above, the length of the User Position Array field 4020 needs to be increased depending on the length of the Membership Status Array field 4010.

For example, if the Membership Status Array field 4010 is configured to have a length of 9 octets, it may indicate a group of a maximum of 72 groups. Accordingly, the User Position Array field 4020 may have a length of 18 octets (i.e., 72*2 bits) in order to indicate the user positions of a maximum of 72 groups. Likewise, if the Membership Status Array field 4010 is configured to have a length of 10 octets, it may indicate a group of a maximum of 80 groups. The User Position Array field 4020 may have a length of 20 octets in order to indicate the user positions of a maximum of 80 groups. Furthermore, if the Membership Status Array field 4010 is configured to have a length of 11 octets, it may indicate a group of a maximum of 88 groups. Accordingly, the User Position Array field 4020 may have a length of 22 octets (i.e., 88*2 bits) in order to indicate the user positions of a maximum of 88 groups.

Option A-2) the number of STAs participating in UL/DL MU transmission (or a maximum number of STAs participating in UL/DL MU transmission) may be constantly fixed (e.g., 8 or 16) regardless of a bandwidth for UL/DL MU transmission.

For example, in the case of OFDMA, assuming that resources are allocated to an STA in a 2.5 MHz unit in a 20 MHz bandwidth, are allocated to an STA in a 5 MHz unit in a 40 MHz bandwidth, are allocated to an STA in a 10 MHz unit in an 80 MHz bandwidth, and are allocated to an STA in a 20 MHz unit in a 160 MHz bandwidth, the number of STAs is fixed to 8 regardless of a bandwidth.

If the number of STAs greater than 4 is fixed regardless of a bandwidth as described above, it is necessary to change the format of the group ID management frame in order to indicate more user positions for each group.

Accordingly, the User Position Array field 4020 may be configured in the form of a bitmap indicative of the user positions of STAs in a length of more than 2 bits for each STA in order to indicate user positions according to the predetermined number of STAs.

For example, if the number of STAs is fixed to 8 regardless of a bandwidth, the User Position Array field 4020 may be configured in the form of a bitmap indicative of the user positions of STAs in a length of 3 bits for each STA. Likewise, if the number of STAs is fixed to 16 regardless of a bandwidth, the User Position Array field 4020 may be configured in the form of a bitmap indicative of the user positions of STAs in a length of more than 4 bits for each STA.

Option A-3) a full bandwidth may be divided in a basic unit (e.g., a subband) and the number of STAs participating in UL/DL MU transmission (or a maximum number of STAs participating in UL/DL MU transmission) may be fixed for each basic unit.

For example, if one resource unit has 26 tones as described above, a maximum of nine STAs may participate in UL/DL MU transmission in a 20 MHz bandwidth. In order to support the nine STAs, the number of STAs participating in UL/DL MU transmission (or a maximum number of STAs capable of participating in UL/DL MU transmission) may be fixed to 9 for each 20 MHz bandwidth. Likewise, the number of STAs may be fixed to 4 for each 20 MHz bandwidth.

Even in this case, as in the above embodiment, if the number of STAs participating in UL/DL MU transmission (or a maximum number of STAs capable of participating in UL/DL MU transmission for each subband) is fixed to a number greater than 4, the format of the group ID management frame needs to be changed in order to indicate more user positions for each group.

Accordingly, in order to indicate user positions according to the predetermined number of STAs, the User Position Array field 4020 may be configured in the form of a bitmap indicative of the user positions of STAs in a length of more than 2 bits for each STA.

For example, if the number of STAs is fixed to 9 for each 20 MHz frequency band, the User Position Array field 4020 may be configured in the form of a bitmap indicative of the user positions of STAs in a length of 4 bits for each group.

If the number of STAs participating in UL/DL MU transmission (or a maximum number of STAs capable of participating in UL/DL MU transmission) is fixed for each band of a basic unit (e.g., a subband) in a frequency domain, a group ID is independently determined for each band of the basic unit. That is, a group ID set is defined for each basic unit. For example, if the basic unit is defined to be a 20 MHz frequency band and a full bandwidth is an 80 MHz frequency band, each group ID is determined for each 20 MHz unit.

If a full bandwidth is the same as a basic unit, a group ID determined in the basic unit is the same as a group ID determined in the full bandwidth.

In contrast, a group ID is determined for each basic unit. Accordingly, if a full bandwidth is greater than a basic unit, all of group IDs for each basic unit in the full bandwidth need to be transmitted to an STA. This is described below with reference to the following drawing.

FIG. 42 is a diagram illustrating a group ID management frame according to an embodiment of the present invention.

First, a group ID management frame may be separately included for each basic unit (e.g., subband). In this case, a group ID management frame corresponding to the number of "full bandwidth/basic units" is transmitted to each STA.

In this case, the group ID management frames for each basic unit may be sequentially transmitted in a time domain or may be multiplexed and transmitted in a frequency domain.

FIG. 42(a) shows an example in which a full bandwidth includes 4 subbands and group ID management frames are sequentially transmitted for each basic unit. A group ID management frame 4201 for a subband 1, a group ID management frame 4202 for a subband 2, a group ID management frame 4203 for a subband 3, and a group ID management frame 4204 for a subband 4 are sequentially transmitted.

In this case, the group ID management frames 4201, 4202, 4203, and 4204 corresponding to the respective subbands may be transmitted in order of increasing or decreasing subband index.

Spacing between the group ID management frames 4201, 4202, 4203, and 4204 corresponding to the respective subbands may be defined as "xIFS." The spacing "xIFS" for preventing the time during which other STAs cut in and transmit data before a next group ID management frame is transmitted after a single group ID management frame is transmitted, and may correspond to SIFS, for example.

In this case, the group ID management frames 4201, 4202, 4203, and 4204 corresponding to the respective subbands may be transmitted in a single subband (e.g., primary channel) or one or more subbands (e.g., a full bandwidth) in the frequency domain.

Furthermore, as FIG. 42(b), the group ID management frames 4201, 4202, 4203, and 4204 corresponding to the respective subbands may be multiplexed in the frequency domain and transmitted at the same time. In this case, the group ID management frames 4201, 4202, 4203, and 4204 corresponding to the respective subbands may be transmitted in a subband whose group ID is determined. For example, the group ID management frame 4201 including group ID information determined in the subband 1 may be transmitted in the subband 1.

Furthermore, a single group ID management frame including all of pieces of group ID information (and user position) determined by subband may be configured. In this case, only a frame body (i.e., including the Membership Status Array field and the User Position Array field) may be attached by the number of "full bandwidth/the basic units" to form a single group ID management frame.

FIG. 42(c) shows an example in which a full bandwidth includes 4 subbands.

A Membership Status Array field and User Position Array field 4221 for the subband 1, a Membership Status Array field and User Position Array field 4222 for the subband 2, a Membership Status Array field and User Position Array field 4223 for the subband 3, and a Membership Status Array field and User Position Array field 4224 for the subband 4 may be attached to form one frame body.

In this case, the Membership Status Array field and User Position Array fields 4221, 4222, 4223, and 4224 corresponding to the respective subbands may be configured in order of increasing or decreasing subband index.

In this case, a corresponding group ID management frame may be transmitted in a single subband (e.g., primary channel) or one or more subbands (e.g., a full bandwidth) in the frequency domain.

FIG. 42(c) illustrates only the Membership Status Array field and User Position Array field for one subband which forms a frame body, and may further include another field.

If a group ID for each basic unit is determined, an AP does not transmit pieces of group ID information for all of basic units as in the above embodiment, but may transmit only group ID information for some of the basic units. That is, the AP may transmit only group ID information for basic units which may be transmitted or received by a corresponding STA other than a full bandwidth under the determination of the AP.

In this case, group ID management frames for some basic units may be sequentially transmitted in the time domain as in FIG. 42(a) or may be multiplexed in the frequency domain and transmitted as in FIG. 42(b). Furthermore, as in FIG. 42(c), a single group ID management frame having group ID information determined in some basic units may be transmitted.

Option A-4) only one of the OFDMA method and the MU MIMO method may be used in single UL/DL MU transmission. In other words, the MU MIMO method is not used if the OFDMA method is used in UL/DL MU transmission in a specific time domain, and the OFDMA method may not be used if the MU MIMO method is used in UL/DL MU transmission in a specific time domain.

Accordingly, a different Group ID set may be configured depending on the OFDMA method and the MIMO method applied to UL/DL MU transmission. That is, a group ID may be determined based on a different group ID set depending on whether the OFDMA method or the MU MIMO method is applied to UL/DL MU transmission.

In this case, whether a group ID is to be used for OFDMA or MU MIMO whenever the group ID is used may be indicated in a group ID management frame and/or an allocation frame.

Option A-5) only one user position may be designed for one STA within one group in the 802.11ac system.

In this case, in a group ID management frame according to an embodiment of the present invention, one or more user positions may be designated for one STA within a single group ID.

More specifically, in an UL/DL MU transmission procedure, if multiple resources (multi-subbands or multi-streams) are allocated to one STA, a plurality of user positions may be designated for the STA within a single group ID. Accordingly, when an STA to which a multi-user position has been allocated receives an allocation frame indicative of a group ID to which the STA belongs, the STA may receive resource allocation information indicated in Resource Indication fields corresponding to a plurality of user positions, respectively, in the allocation frame.

Furthermore, in single UL/DL MU transmission, the OFDMA method and the MU MIMO method may be used together. In other words, frequency resources allocated to different STAs may be multiplexed in a frequency domain and at the same time, spatial streams allocated to different STAs may be multiplexed in a space domain.

For example, if one frequency resource unit includes 26 tones in a 20 MHz band, a first stream may be allocated to an STA 1 in resource units from a No. 1 resource unit to a No. 4 resource unit and a second stream may be allocated to an STA 2 in resource units from a No. 1 resource unit to a No. 4 resource unit. Accordingly, if one frequency resource unit includes 26 tones and a maximum of 9 spatial streams are supported in a 20 MHz band, resources may be simultaneously allocated to a maximum of 72 STAs in the 20 MHz band because spatial streams are allocated to a maximum of 9 STAs for each resource unit.

In order to support UL/DL MU transmission in which the OFDMA method and the MU MIMO method are used together as described above, multiple user positions may be allocated to one STA within a single group ID. Furthermore, in an allocation frame, a resource unit (i.e., a subband) for OFDMA may be indicated in a Resource Indication field corresponding to one user position and a resource unit (i.e., a spatial stream) for MU MIMO may be indicated in a Resource Indication field corresponding to another user position. In this case, the Resource Indication field corresponding to each user position may include an indicator for indicating whether corresponding resource allocation information is resource allocation information for OFDMA or resource allocation information for MU MIMO. This is described in more detail later.

Accordingly, in order to allocate a plurality of user positions to one STA within a single group ID as described above, the User Position Array field 4020 may be configured in a bitmap form. For example, if one frequency resource unit includes 26 tones in a 20 MHz band and different frequency resource units are allocated to a maximum of 9 STAs, the User Position Array field 4020 may be configured in the form of a bitmap of 9 bits.

B) Allocation Frame

The aforementioned embodiments of the present invention have proposed the formats of the group ID management frame in order to support a larger number of STAs and/or a larger number of group IDs.

Hereinafter, an embodiment of the present invention proposes the format of an allocation frame in order to support a larger number of STAs and/or a larger number of group IDs.

The format of the allocation frame proposed hereinafter may be used along with the format of the group ID management frame according to the proposed embodiment of the present invention.

Furthermore, the format of the allocation frame proposed hereinafter may be used so that the format of the group ID management frame (refer to FIG. 16) defined in the 802.11ac system is used without any change, but more than 4 STAs can participate in UL/DL MU transmission.

Option B-1) a plurality of group IDs may be indicated in an allocation frame so that a plurality of STAs may participate in UL/DL MU transmission at the same time.

It is hereinafter assumed that the format of the group ID management frame (refer to FIG. 16) defined in the 802.11ac system is used without any change and a maximum of 8 STAs can be supported in UL/DL MU transmission, for convenience of description.

If UL/DL resources for UL/DL MU transmission are allocated to 8 STAs in an allocation frame, two group ID management frames having the format defined in the 802.11ac system may be used.

First, it is assumed that a group ID 1 has been allocated to STAs 1, 2, 3, and 4 based on a group ID management frame and a group ID 2 has been allocated to STAs 5, 6, 7, and 8 based on the group ID management frame.

Furthermore, if two group IDs, such as the group ID 1 and the group ID 2, are indicated in an allocation frame, UL/DL MU resources (i.e., frequencies and/or spatial streams) may be allocated to the STAs 1 to 4 belonging to the group ID 1 and the STAs 5 to 8 belonging to the group ID 2 at the same time.

In this case, it is necessary for the allocation frame to indicate that which UL/DL MU resources are allocated to an STA belonging to the group ID 1 and an STA belonging to the group ID 2.

Accordingly, an SIG field may include a plurality of sets of a "group ID field and a Resource Indication field indicative of resource allocation information for an STA belonging to a corresponding group ID. More specifically, Resource Indication fields indicative of resource allocation information for STAs belonging to a corresponding group ID after a first group ID field may be sequentially included according to user positions. Furthermore, Resource Indication fields indicative of resource allocation information for STAs belonging to the corresponding group ID after a second group ID field may be sequentially included according to user positions.

Option B-2) only one spatial stream may be allocated to one STA within a single group ID in the 802.11ac system. For example, in the 802.11ac system, resource allocation information for each STA is indicated in 2 bits in the allocation frame. That is, if resource allocation information is "00", a $0^{th}$ spatial stream is indicated. If resource allocation information is "01", a first spatial stream is indicated. If resource allocation information is "11", a third spatial stream is indicated.

In this case, a plurality of resource units (i.e., subbands) needs to be allocated to one STA because OFDMA is supported in the 802.11ax system. Furthermore, likewise, a plurality of spatial streams needs to be allocated if the MU MIMO method is used.

Accordingly, in order to allocate multiple resources (e.g., multiple subbands or multiple spatial streams) to one STA, a Resource Indication field indicative of resource allocation information for each STA may be configured in the form of a bitmap in the allocation frame. For example, if one resource unit (or subband) includes 26 tones and a 20 MHz band includes a total of nine resource units, the Resource Indication field of the allocation frame may be configured in the form of a bitmap having a length of a total of 9 bits. For example, a resource allocation bit of "111000000" and $0^{th}$, $1^{st}$, and $2^{nd}$ subband or spatial streams may be allocated to one STA.

Option B-3) only any one of the OFDMA method and the MU MIMO method may be used in single UL/DL MU transmission. Accordingly, a group ID set according to the OFDMA method may be defined, and a group ID set according to the MU MIMO method may be defined. In this case, the format of the allocation frame needs to be changed.

FIG. 43 is a diagram illustrating part of an allocation frame according to an embodiment of the present invention.

In FIG. 43, it is assumed that 8 user positions (user indices) are supported.

More specifically, FIG. 43(b) partially illustrates only an MU Type Indication field and Resource Indication field for indicating resource allocation information for each STA in the allocation frame. Such fields may be included in the SIG field of the allocation frame.

If only any one of the OFDMA method and the MU MIMO method is used in single UL/DL MU transmission, it is necessary for an allocation frame to indicate that a group ID indicated by the allocation frame is applied to which one of the OFDMA method and the MU MIMO method. Accordingly, the allocation frame may include an MU Type Indication field 4301 for indicating that a group ID is applied to any one of the OFDMA and MU MIMO methods. That is, the MU Type Indication field 4301 is information for indicating whether a Resource Indication field indicates a frequency resource for OFDMA transmission or a spatial resource for MU MIMO transmission. For example, the MU Type indication field 4301 may include 1 bit and indicate any one of the OFDMA and MU MIMO methods.

Furthermore, a Resource Indication field 4302 together with the MU Type indication field 4301 may be included in the allocation frame. The Resource Indication field 4302 may include Subband/MIMO Indication fields 0~n(s) indicative of frequencies/spatial resources allocated for each STA in order of user position. The Subband/MIMO Indication fields corresponding to the number of STAs included in a corresponding group ID may be included.

A value of the Subband/MIMO Indication field may be different from that of resources indicated according to a multiplexing method indicated in the MU Type indication field 4301. For example, if OFDMA is indicated in the MU Type indication field 4301, the Subband/MIMO Indication field may indicate the index of a subband. If MU MIMO is indicated in the MU Type indication field 4301, the Subband/MIMO Indication field may indicate a stream index.

It is assumed that a user position "3" is allocated to an STA 1, a user position "1" is allocated to an STA 2, a user position "0" is allocated to an STA 3, and a user position "2" is allocated to an STA 4 based on a group ID management frame, as in FIG. 43(a).

Furthermore, if OFDMA is indicated in the MU Type indication field 4301 of the allocation frame, an index 1 is indicated in a Subband/MIMO Indication 0 field, indices 2~4 are indicated in a Subband/MIMO Indication 1 field, indices 5~8 are indicated in a Subband/MIMO Indication 2 field, and an index 9 is indicated in a Subband/MIMO Indication 3 field, resources allocated to the respective STAs are as follows.

The Subband/MIMO Indication fields are sequentially configured based on user positions indicated in the group ID management frame. Accordingly, if user position information indicated by the group ID management frame and a resource allocation sequence (i.e., the sequence of the Subband/MIMO Indication fields) are mapped in the allocation frame, frequencies/spatial resources allocated to the STAs may be identified.

One or more subbands are allocated to each of the STAs because OFDMA has been indicated in the MU Type indication field 4301.

Since the user position 0 for the STA 3 has been indicated in the group ID management frame, a "subband 1" is allocated to the STA 3 based on the Subband/MIMO Indication 0 field of the allocation frame.

Since the user position 1 for the STA 2 has been indicated in the group ID management frame, "subbands 2~4" are allocated to the STA 2 based on the Subband/MIMO Indication 1 field of the allocation frame.

Since the user position 2 for the STA 4 has been indicated in the group ID management frame, "subbands 5~8" are allocated to the STA 4 based on the Subband/MIMO Indication 2 field of the allocation frame.

Furthermore, since the user position 3 for the STA 1 has been indicated in the group ID management frame, a "subband 9" is allocated to the STA 1 based on the Subband/MIMO Indication 3 field of the allocation frame.

The Subband/MIMO Indication field may include 3 or 4 bits and indicate one resource, but as described above, in order to allocate multiple subbands or streams to one STA, each Subband/MIMO Indication field may be configured in the form of a bitmap (e.g., 8 bits or 9 bits).

Option B-4) the OFDMA method and the MU MIMO method may be used together in single UL/DL MU transmission. In other words, frequency resources allocated to different STAs may be multiplexed in a frequency domain and at the same time, spatial streams allocated to different STAs may be multiplexed in a space domain. In this case, the format of the allocation frame needs to be changed.

FIG. 44 is a diagram illustrating part of an allocation frame according to an embodiment of the present invention.

In FIG. 44, it is assumed that 8 user positions (user indices) are supported.

More specifically, FIG. 44(b) partially illustrates only a resource indication field for indicating resource allocation information for each STA in the allocation frame. Such a field may be included in the SIG field of the allocation frame.

A Resource Indication field 4401 may include resource indication subfields 0~n(s) indicative of frequencies/spatial resources allocated to each STA in order of user position. The Resource Indication subfield corresponding to the number of STAs included in a corresponding group ID may be included.

If the OFDMA method and the MU MIMO method are used together, a Resource Indication subfield for each STA included in an allocation frame may include an MU type indication field 4402 and a Subband/MIMO Indication field 4403.

The MU Type Indication field 4402 is indication information indicating whether the Subband/MIMO Indication field indicates a frequency resource for OFDMA transmission or a spatial resource for MU MIMO transmission. The MU Type Indication field 4402 is configured for each of STAs participating in MU transmission.

For example, the MU Type indication field 4402 may be configured in 1 bit and may indicate any one of OFDMA and MU MIMO.

Furthermore, the Subband/MIMO Indication field 4403 indicates a resource (e.g., a subband or spatial stream) allocated to each STA. A resource indicated by a value of the Subband/MIMO Indication field 4403 may be different according to a multiplexing method indicated in the MU Type indication field 4402. For example, when OFDMA is indicated in the MU Type indication field 4402, the Subband/MIMO Indication field 4403 may indicate the index of a subband. When MU MIMO is indicated in the MU Type indication field 4402, the Subband/MIMO Indication field 4403 may indicate a stream index.

FIG. 44 illustrates the MU Type indication field 4402 and the Subband/MIMO Indication field 4403 only in a Resource Indication subfield corresponding to a user position "0.", but such fields may be identically configured even in Resource Indication subfields (if any) corresponding to user positions "1" to "7."

It is assumed that as in FIG. 44(a), a user position "3" is allocated to an STA 1, a user position "1" is allocated to an STA 2, a user position "0" is allocated to an STA 3, and a user position "2" is allocated to an STA 4 based on a group ID management frame.

Furthermore, if OFDMA is indicated in the MU Type indication field of the Resource Indication subfield 0 of an allocation frame and an index 1 is indicated in the Subband/MIMO Indication field of the Resource Indication subfield 0, OFDMA is indicated in the MU Type indication field of the Resource Indication subfield 1 of the allocation frame and indices 2~4 are indicated in the Subband/MIMO Indication field of the Resource Indication subfield 1, MU MIMO is indicated in the MU Type indication field of the Resource Indication subfield 2 of the allocation frame and the index 1 is indicated in the Subband/MIMO Indication field of the Resource Indication subfield 2, and MU MIMO is indicated in the MU Type indication field of the Resource Indication subfield 3 of the allocation frame and the index 2 is indicated in the Subband/MIMO Indication field of the Resource Indication subfield 3, resources allocated to the STAs are as follows.

The Resource Indication subfields are sequentially configured according to the user positions indicated by the group ID management frame. Accordingly, if user position information indicated by the group ID management frame and the resource allocation sequence (i.e., the sequence of the Resource Indication fields) in the allocation frame are mapped, frequencies/spatial resources allocated to the respective STAs may be identified.

Since the user position 0 for the STA 3 has been indicated in the group ID management frame, a "subband 1" is allocated to the STA 3 based on the Resource Indication subfield 0 of the allocation frame.

Since the user position 1 for the STA 2 has been indicated in the group ID management frame, "subbands 2~4" are allocated to the STA 2 based on the Resource Indication subfield 1 of the allocation frame.

Since the user position 2 for the STA 4 has been indicated in the group ID management frame, a "spatial stream 1" is allocated to the STA 4 based on the Resource Indication subfield 2 of the allocation frame.

Since the user position 3 for the STA 1 has been indicated in the group ID management frame, a "spatial stream 2" is allocated to the STA 1 based on the Resource Indication subfield 3 of the allocation frame. Furthermore, two user positions may be allocated to one STA as in Option A-5) before both the frequency resource and the spatial resource are allocated to the one STA. Furthermore, a frequency resource may be indicated in a Resource Indication subfield corresponding to a first user position, and a spatial resource may be indicated in a Resource Indication subfield corresponding to a second user position.

For example, it is assumed that user positions "0" and "1" have been allocated to an STA 1 based on a group ID management frame, user positions "2" and "3" have been allocated to an STA 2 based on a group ID management frame, and a user position "4" has been allocated to an STA 3 based on a group ID management frame.

Furthermore, if OFDMA is indicated in the MU Type indication field of the Resource Indication subfield 0 of an allocation frame and indices 1~4 are indicated in the Subband/MIMO Indication field of the Resource Indication subfield 0, MU MIMO is indicated in the MU Type indication field of the Resource Indication subfield 1 of the allocation frame and an index 1 is indicated in the Subband/MIMO Indication field of the Resource Indication subfield 1, OFDMA is indicated in the MU Type indication field of the Resource Indication subfield 2 of the allocation frame and the indices 1~4 are indicated in the Subband/MIMO Indication field of the Resource Indication subfield 2, MU MIMO is indicated in the MU Type indication field of the Resource Indication subfield 3 of the allocation frame and the index 2 is indicated in the Subband/MIMO Indication field of the Resource Indication subfield 3, and OFDMA is indicated in the MU Type indication field of the Resource Indication subfield 4 of the allocation frame and indices 5~9 are indicated in the Subband/MIMO Indication field of the Resource Indication subfield 4, resources allocated to the STAs are as follows.

Since the user positions 0 and 1 have been indicated to the STA 1 based on the group ID management frame, the "subbands 1~4 of a spatial stream 1" are allocated to the STA 1 based on the Resource Indication subfield 0 and Resource Indication subfield 1 of the allocation frame.

Since the user positions 2 and 3 have been indicated to the STA 2 based on the group ID management frame, the "subbands 1~4 of a spatial stream 2" are allocated to the STA 2 based on the Resource Indication subfield 2 and Resource Indication subfield 3 of the allocation frame.

Since the user position 4 has been indicated to the STA 3 based on the group ID management frame, "subbands 5~9" are allocated to the STA 3 based on the Resource Indication subfield 4 of the allocation frame. In the example of FIG. 44, the Subband/MIMO Indication field 4403 may be configured in 3 or 4 bits and thus indicate one resource. However, in order to allocate multiple subbands or streams to one STA as described above, each Subband/MIMO Indication field 4403 may be configured in the form of a bitmap (e.g., 8 bits or 9 bits).

One or more of the embodiments within the configuration (A Option) of the group ID management frame and/or one or more of the embodiments within the configuration (B Option) of the allocation frame may be combined and implemented.

Furthermore, the aforementioned embodiments of the present invention may be applied when a group ID management frame and/or an allocation frame is configured in a full bandwidth. Furthermore, the group ID management frame and/or the allocation frame may be configured in a 20 MHz unit. If the group ID management frame and/or the allocation frame are configured in a 20 MHz unit as described above, the embodiment of the present invention may be repeatedly applied in a full bandwidth in the 20 MHz unit. Furthermore, if the group ID management frame and/or the allocation frame are configured in the 20 MHz unit, they may be used for SU transmission in some bands and may be used to transmit another frame in some bands.

If each of pieces of STA information is carried on a group ID management frame or allocation frame and transmitted without a GID, many resources are required.

In order to transmit resource allocation information for each STA in an allocation frame, resources corresponding to an "STA address (i.e., 48 bits)*the number of MU STAs+ allocation information for each STA" are required. For example, if 4 bits are required to indicate allocation information for each STA and a maximum number of MU STAs are 8, 48 bits (STA address)*8 bits (the number of MU STAs)+4 bits (resource allocation indication)*8 bits (the number of MU STAs)=52 bytes are required.

Furthermore, assuming that BSSs are classified by color bit in an allocation frame and an AID is unique, resources corresponding to "AID (14 bits)*the number of MU STAs+ allocation information for each STA" are required. For example, assuming that 4 bits are required to indicate allocation information for each STA and a maximum number of MU STAs are 8, 14 bits (AID)*8 bits (the number of MU STAs)+4 bits (resource allocation indication)*8 bits (the number of MU STAs)=18 bytes are required.

In contrast, in accordance with an embodiment of the present invention, assuming that 4 bits (an MU Indication field of 1 bit and a Subband/MIMO Indication field of 3 bits) are required to indicate allocation information for each STA and a maximum number of MU STAs are 8, only 6 bits (GID)+4 bits (resource allocation indication)*8 bits (the number of MU STAs)=38 bits are sufficient. Accordingly, there is an advantage in that resources can be used more efficiently because information for UL/DL MU transmission can be delivered using smaller resources.

General Apparatus to which an Embodiment of the Present Invention May be Applied FIG. 45 is a block diagram illustrating a wireless apparatus according to an embodiment of the present invention.

Referring to FIG. 45, the apparatus 4510 according to an embodiment of the present invention may include a processor 4511, memory 4512, and a radio frequency (RF) unit 4513. The apparatus 4510 may be an AP or non-AP STA for implementing the embodiments of the present invention.

The RF unit 4513 is connected to the processor 4511 and may transmit/receive a radio signal. For example, the RF unit 4513 may implement the physical layer according to the iEEE 802.11 system.

The processor 4511 is connected to the RF unit 4513 and may implement the physical layer and/or the MAC layer according to the IEEE 802.11 system. The processor 4511 may be configured to perform operations according to the various embodiments of the present invention shown in FIGS. 1 to 44. Furthermore, a module for implementing the operations of the AP and/or STA according to the various embodiments of the present invention shown in FIGS. 1 to 44 may be stored in the memory 4512 and may be executed by the processor 4511.

The memory 4512 is connected to the processor 4511 and stores various types of information for driving the processor 4511. The memory 4512 may be included in the processor 4511 or disposed outside the processor 4511 and may be connected to the processor 4511 by known means.

Furthermore, the apparatus 4510 may have a single antenna or multiple antennas.

The detailed configuration of the apparatus 4510 may be implemented so that the contents described in the various embodiments of the present invention are independently applied or two or more of the embodiments are simultaneously applied to the detailed configuration of the apparatus 4510.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment of the present invention may be implemented by various means, for example, hardware, firmware, software or a combination of them. In the case of implementations by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The MU transmission methods in the wireless communication system according to an embodiment of the present invention have been illustrated as being applied to an IEEE 802.11 system, but may be applied to various wireless communication systems in addition to the IEEE 802.11 system.

What is claimed is:

1. A method for multi-user (MU) transmission in a wireless communication system, the method performed by a station (STA) and comprising:
receiving an allocation frame from an access point (AP), the allocation frame comprising resource allocation information for the MU transmission and an indication of whether the resource allocation information indicates a frequency resource for orthogonal frequency division multiple access (OFDMA) transmission or a spatial resource for MU multi-input multi-output (MIMO) transmission; and
receiving a group identifier (ID) management frame from the AP, the group ID management frame comprising a single group identifier that identifies a group of STAs participating in the MU transmission,
wherein a different single group ID is allocated for each partial band of an entire band,
wherein a plurality of group ID management frames are transmitted through the entire band simultaneously, and
wherein each of the plurality of group ID management frames is transmitted via each partial band in which the received single group identifier is allocated.

2. The method of claim 1, wherein the indication is configured for each of the identified group of STAs.

3. The method of claim 1, wherein the resource allocation information is configured in a bitmap form.

4. The method of claim 1, wherein the single group identifier is determined based on a different group identifier set depending on whether the OFDMA method or the MU MIMO method is applied to the MU transmission.

5. The method of claim 1, wherein the received group ID management frame further comprises a user position configured in a bitmap form.

6. A station (STA) apparatus for multi-user (MU) transmission in a wireless communication system, the STA apparatus comprising:
a radio frequency (RF) unit configured to transmit and receive a radio signal; and
a processor configured to:
control the RF unit to receive an allocation frame from an access point (AP), the allocation frame comprising resource allocation information for the MU transmission and an indication of whether the resource allocation information indicates a frequency resource for orthogonal frequency division multiple access (OFDMA) transmission or a spatial resource for MU multi-input multi-output (MIMO) transmission; and
control the RF unit to receive a group identifier (ID) management frame from the AP, the group ID management frame comprising a single group identifier that identifies a group of STAs participating in the MU transmission,
wherein a different single group ID is allocated for each partial band of an entire band,
wherein a plurality of group ID management frames are transmitted through the entire band simultaneously, and
wherein each of the plurality of group ID management frames is transmitted via each partial band in which the received single group identifier is allocated.

7. The STA of claim 6, wherein the indication is configured for each of the identified group of STAs.

8. The STA of claim 6, wherein the resource allocation information is configured in a bitmap form.

9. The STA of claim 6, wherein the single group identifier is determined based on a different group identifier set depending on whether the OFDMA method or the MU MIMO method is applied to the MU transmission.

10. The STA of claim 6, wherein the received group ID management frame further comprises a user position configured in a bitmap form.

11. A method for multi-user (MU) transmission in a wireless communication system, the method performed by an access point (AP) and comprising:
transmitting an allocation frame to a station (STA), the allocation frame comprising resource allocation information for the MU transmission and an indication of whether the resource allocation information indicates a frequency resource for orthogonal frequency division multiple access (OFDMA) transmission or a spatial resource for MU multi-input multi-output (MIMO) transmission; and
transmitting a group identifier (ID) management frame to the STA, the group ID management frame comprising a single group identifier that identifies a group of STAs participating in the MU transmission,
wherein a different single group ID is allocated for each partial band of an entire band,
wherein a plurality of group ID management frames are transmitted through the entire band simultaneously, and wherein each of the plurality of group ID management frames is transmitted via each partial band in which the received single group identifier is allocated.

12. The Method of claim 11, wherein the indication is configured for each of the identified group of STAs.

13. The Method of claim 11, wherein the resource allocation information is configured in a bitmap form.

14. The Method of claim 11, wherein the single group identifier is determined based on a different group identifier set depending on whether the OFDMA method or the MU MIMO method is applied to the MU transmission.

15. The Method of claim 11, wherein the received group ID management frame further comprises a user position configured in a bitmap form.

16. An access point (AP) apparatus for multi-user (MU) transmission in a wireless communication system, the AP apparatus comprising:
 a radio frequency (RF) unit configured to transmit and receive a radio signal; and
 a processor configured to:
  control the RF unit to transmit an allocation frame to a station (STA), the allocation frame comprising resource allocation information for the MU transmission and an indication of whether the resource allocation information indicates a frequency resource for orthogonal frequency division multiple access (OFDMA) transmission or a spatial resource for MU multi-input multi-output (MIMO) transmission; and
  control the RF unit to transmit a group identifier (ID) management frame to the STA, the group ID management frame comprising a single group identifier that identifies a group of STAs participating in the MU transmission,
 wherein a different single group ID is allocated for each partial band of an entire band,
 wherein a plurality of group ID management frames are transmitted through the entire band simultaneously, and
 wherein each of the plurality of group ID management frames is transmitted via each partial band in which the received single group identifier is allocated.

17. The AP apparatus of claim 16, wherein the indication is configured for each of the identified group of STAs.

18. The AP apparatus of claim 16, wherein the resource allocation information is configured in a bitmap form.

19. The AP apparatus of claim 16, wherein the single group identifier is determined based on a different group identifier set depending on whether the OFDMA method or the MU MIMO method is applied to the MU transmission.

20. The AP apparatus of claim 16, wherein the received group ID management frame further comprises a user position configured in a bitmap form.

* * * * *